(12) United States Patent
Ihara et al.

(10) Patent No.: US 10,841,585 B2
(45) Date of Patent: Nov. 17, 2020

(54) IMAGE PROCESSING APPARATUS AND METHOD

(71) Applicant: SONY CORPORATION, Tokyo (JP)

(72) Inventors: Toshinori Ihara, Tokyo (JP); Takefumi Nagumo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 123 days.

(21) Appl. No.: 16/074,018

(22) PCT Filed: Feb. 24, 2017

(86) PCT No.: PCT/JP2017/006990
§ 371 (c)(1),
(2) Date: Jul. 30, 2018

(87) PCT Pub. No.: WO2017/154608
PCT Pub. Date: Sep. 14, 2017

(65) Prior Publication Data
US 2019/0045189 A1 Feb. 7, 2019

(30) Foreign Application Priority Data
Mar. 10, 2016 (JP) .................... 2016-047327

(51) Int. Cl.
*H04N 19/13* (2014.01)
*H04N 19/176* (2014.01)
(Continued)

(52) U.S. Cl.
CPC ............ *H04N 19/13* (2014.11); *H04N 1/41* (2013.01); *H04N 19/132* (2014.11);
(Continued)

(58) Field of Classification Search
CPC .... H04N 19/13; H04N 19/132; H04N 19/146; H04N 19/176; H04N 19/46; H04N 1/41
See application file for complete search history.

(56) References Cited

U.S. PATENT DOCUMENTS

2010/0119167 A1 5/2010 Ikeda et al.
2011/0142132 A1* 6/2011 Tourapis .............. H04N 19/139
375/240.16
(Continued)

FOREIGN PATENT DOCUMENTS

CN 101742309 A 6/2010
CN 102651815 A 8/2012
(Continued)

OTHER PUBLICATIONS

International Search Report and Written Opinion of PCT Application No. PCT/JP2017/006990, dated May 30, 2017, 08 pages of ISRWO.

*Primary Examiner* — David F Dunphy
(74) *Attorney, Agent, or Firm* — Chip Law Group

(57) ABSTRACT

The present disclosure relates to image processing apparatus and method that can suppress a reduction in image quality. An addition order of candidate data that is a candidate for additional data to be added to encoded data including encoded image data in blocks is set on a block-by-block basis in order to set the encoded data to a fixed length. In this case, pseudo-random numbers may be used to set the addition order of the candidate data, or table information indicating the addition order of the candidate data may be used to set the addition order of the candidate data. The present disclosure can be applied to, for example, an image processing apparatus, an image encoding apparatus, an image decoding apparatus, or the like.

23 Claims, 33 Drawing Sheets

(51) Int. Cl.
*H04N 19/132* (2014.01)
*H04N 19/146* (2014.01)
*H04N 1/41* (2006.01)
*H04N 19/46* (2014.01)

(52) U.S. Cl.
CPC ......... *H04N 19/146* (2014.11); *H04N 19/176* (2014.11); *H04N 19/46* (2014.11)

(56) References Cited

U.S. PATENT DOCUMENTS

| | | |
|---|---|---|
| 2012/0219231 A1 | 8/2012 | Gharavi-Alkhansari et al. |
| 2013/0195352 A1* | 8/2013 | Nystad ................. H04N 19/197 382/166 |
| 2015/0154006 A1* | 6/2015 | Yang ....................... G06F 7/588 708/251 |

FOREIGN PATENT DOCUMENTS

| | | |
|---|---|---|
| JP | 2004-80815 A | 3/2004 |
| JP | 2010-118729 A | 5/2010 |
| JP | 2012-124837 A | 6/2012 |
| RU | 2012104815 A | 8/2013 |

* cited by examiner

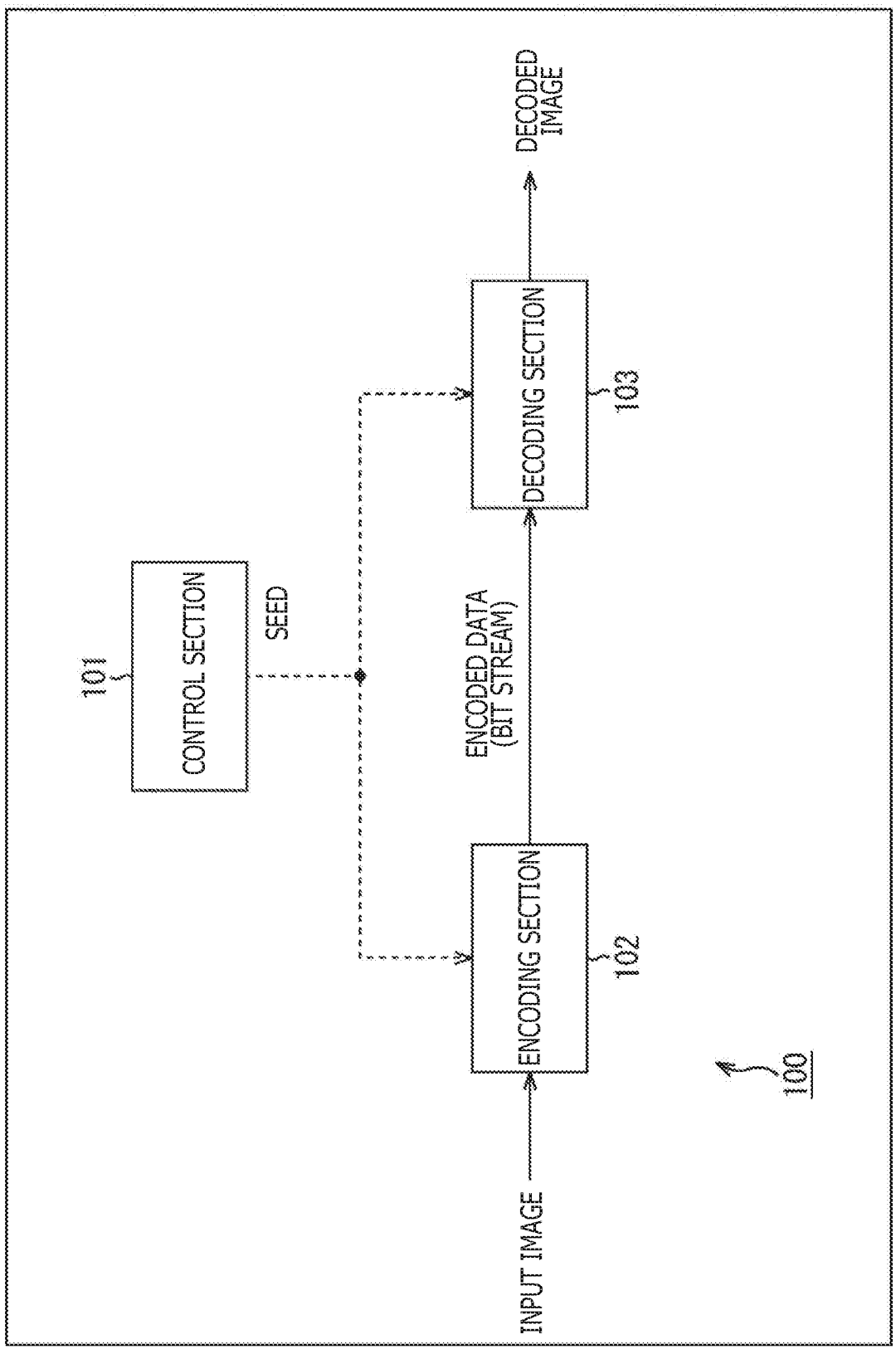

FIG. 10

PATTERN 0 (141-1)

| 5 | 26 | 31 | 2 | 9 | 15 | 7 | 19 |
|---|---|---|---|---|---|---|---|
| 23 | 12 | 8 | 1 | 17 | 21 | 3 | 4 |
| 22 | 13 | 20 | 27 | 32 | 11 | 18 | 6 |
| 25 | 10 | 24 | 14 | 29 | 16 | 28 | 30 |

PATTERN 1 (141-2)

| 22 | 11 | 26 | 10 | 6 | 20 | 25 | 24 |
|---|---|---|---|---|---|---|---|
| 31 | 1 | 30 | 19 | 9 | 5 | 7 | 12 |
| 21 | 28 | 15 | 32 | 13 | 8 | 4 | 27 |
| 29 | 16 | 23 | 17 | 2 | 14 | 18 | 3 |

PATTERN 2 (141-3)

| 5 | 6 | 26 | 13 | 15 | 9 | 18 | 11 |
|---|---|---|---|---|---|---|---|
| 25 | 10 | 17 | 29 | 32 | 19 | 4 | 27 |
| 31 | 28 | 23 | 21 | 12 | 2 | 3 | 24 |
| 1 | 16 | 22 | 30 | 14 | 7 | 8 | 20 |

PATTERN 3 (141-4)

| 3 | 14 | 12 | 7 | 5 | 18 | 25 | 9 |
|---|---|---|---|---|---|---|---|
| 10 | 24 | 28 | 1 | 4 | 23 | 32 | 30 |
| 6 | 17 | 29 | 27 | 8 | 15 | 11 | 13 |
| 2 | 16 | 31 | 20 | 21 | 19 | 26 | 22 |

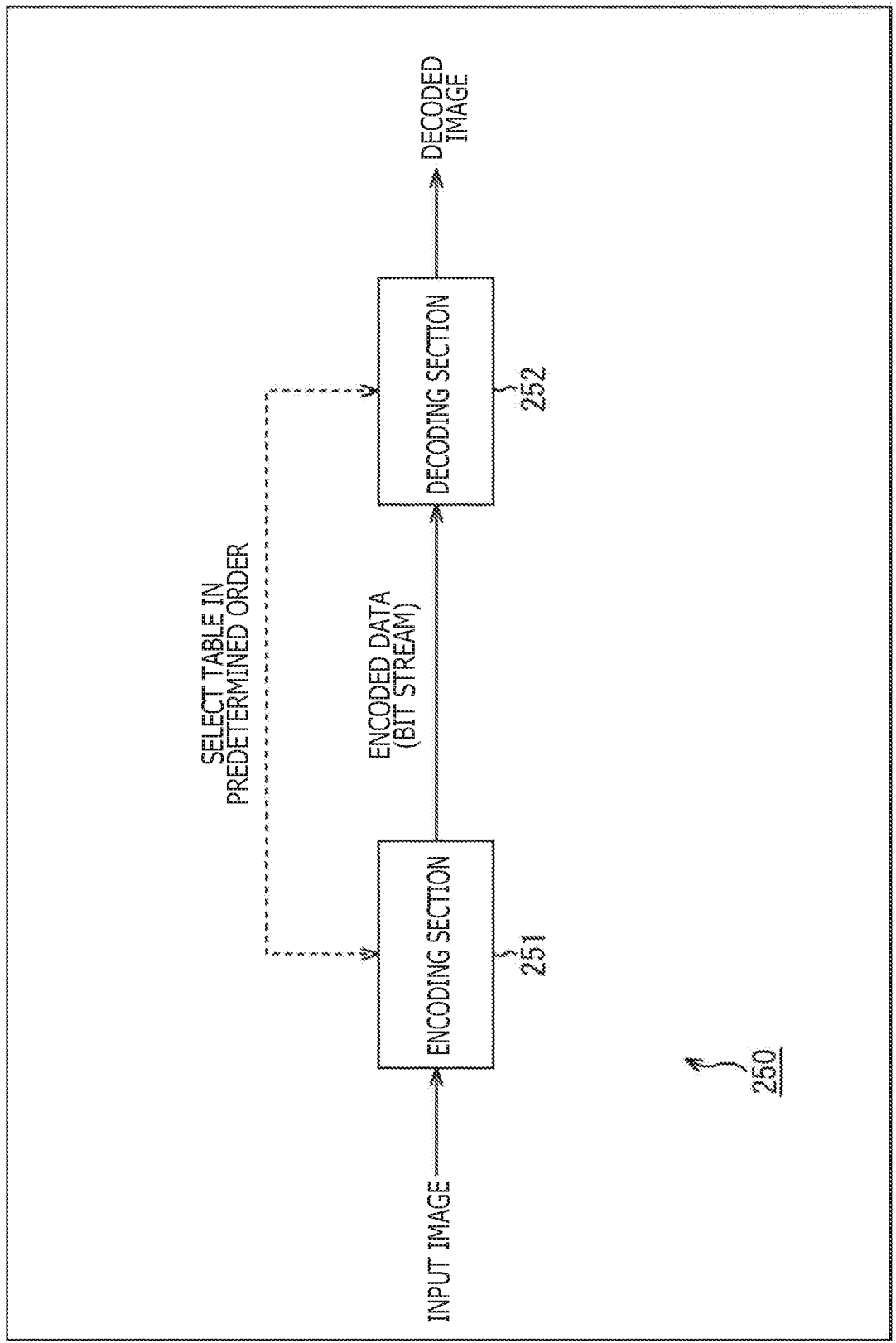

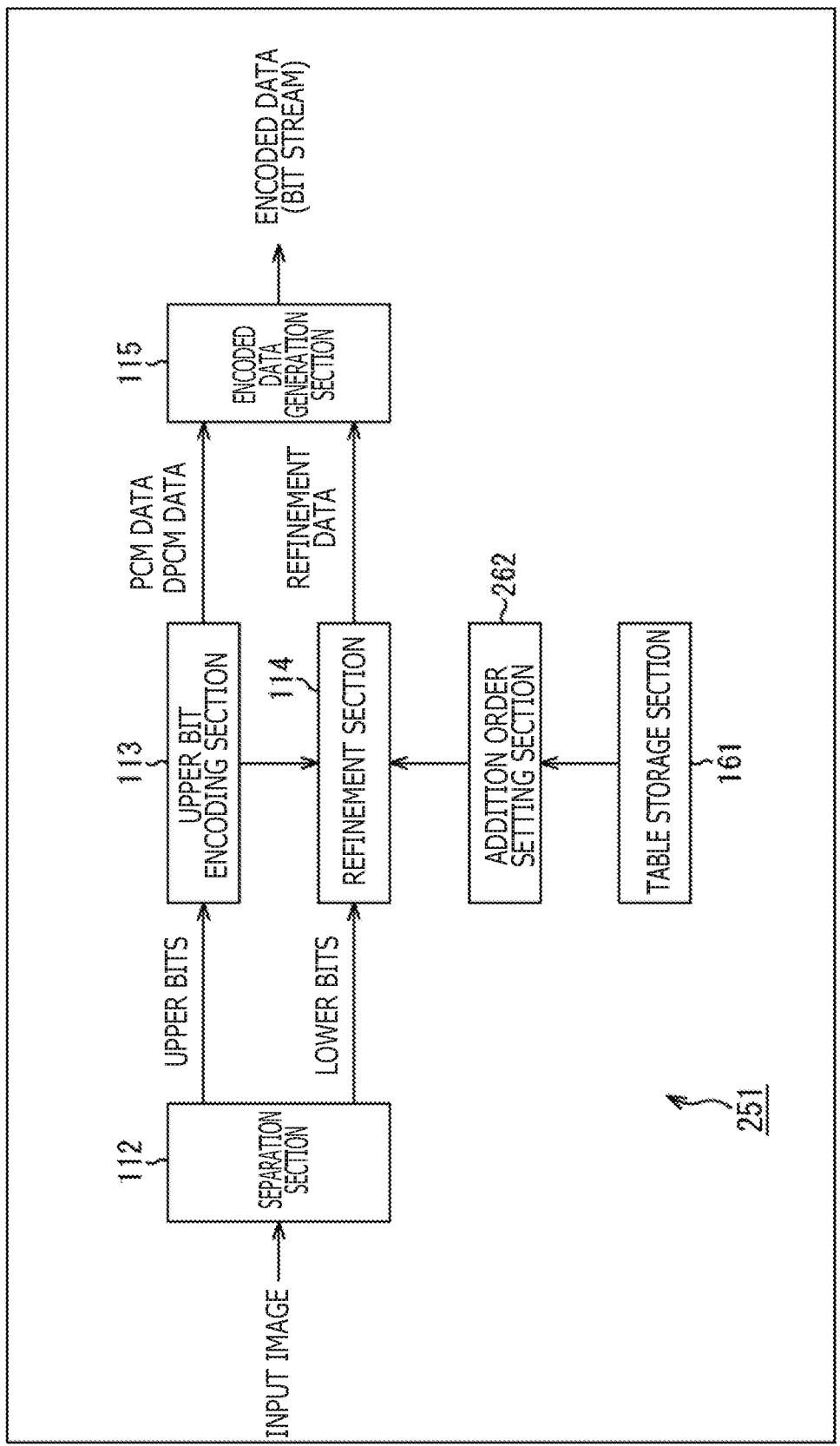
F I G . 2 5

IMAGE PROCESSING APPARATUS AND METHOD

CROSS REFERENCE TO RELATED APPLICATIONS

This application is a U.S. National Phase of International Patent Application No. PCT/JP2017/006990 filed on Feb. 24, 2017, which claims priority benefit of Japanese Patent Application No. JP 2016-047327 filed in the Japan Patent Office on Mar. 10, 2016. Each of the above-referenced applications is hereby incorporated herein by reference in its entirety.

TECHNICAL FIELD

The present disclosure relates to image processing apparatus and method, and particularly, to image processing apparatus and method that can suppress a reduction in image quality.

BACKGROUND ART

Conventionally, various systems are proposed as encoding (compression) and decoding (expansion) systems of an image. For example, a method is proposed, in which image data is encoded (compressed) to a fixed length based on differential pulse code modulation (DPCM) of pixel data and addition of refinement data (for example, see PTL 1).

CITATION LIST

Patent Literature

[PTL 1]
US 2012/0219231

SUMMARY

Technical Problem

However, in the case of the method, an addition order of refinement pixels is fixed (common to all blocks). Therefore, for example, in a case of encoding and decoding an image in a geometric pattern with a little noise such as a CG (Computer Graphics) image, a difference in level of the refinement pixels may appear as a pattern in a decoded image, and the subjective image quality may be reduced.

The present disclosure has been made in view of the circumstances, and the present disclosure can suppress a reduction in the image quality.

Solution to Problem

An aspect of the present technique provides an image processing apparatus including an addition order setting section configured to set, on a block-by-block basis, an addition order of candidate data that is a candidate for additional data to be added to encoded data including encoded image data in blocks in order to set the encoded data to a fixed length.

The addition order setting section can use pseudo-random numbers to set the addition order of the candidate data.

The addition order setting section can acquire seed information and use the acquired seed information to generate the pseudo-random numbers.

The addition order setting section can use table information indicating the addition order of the candidate data to set the addition order of the candidate data.

The addition order setting section can acquire table designation information for designating the table information and use the table information designated in the acquired table designation information to set the addition order of the candidate data.

The addition order setting section can randomly select the table information and use the selected table information to set the addition order of the candidate data.

The addition order setting section can select the table information in a predetermined order and use the selected table information to set the addition order of the candidate data.

The image processing apparatus can further include a fixed length encoded data generation section configured to generate encoded data at a fixed length including the encoded data and the additional data to be added in the addition order set by the addition order setting section.

The fixed length encoded data generation section can generate the encoded data at the fixed length further including information regarding the addition order.

The information regarding the addition order can include the table designation information that is used to set the addition order of the candidate data and that designates the table information indicating the addition order of the candidate data.

The image processing apparatus can further include an additional data generation section configured to generate additional data to be added to the encoded data on the basis of the addition order set by the addition order setting section, in which the fixed length encoded data generation section can be configured to generate the encoded data at the fixed length including the additional data generated by the additional data generation section.

The image processing apparatus can further include an encoding section configured to encode the image data on a block-by-block basis to generate the encoded data, in which the fixed length encoded data generation section can be configured to generate the encoded data at the fixed length including the encoded data generated by the encoding section and the additional data generated by the additional data generation section.

The encoding section can encode upper bits of each piece of pixel data included in the image data in blocks to generate the encoded data, and the additional data generation section can select lower bits of each piece of pixel data included in the image data in blocks in the addition order set by the addition order setting section to generate the additional data.

The encoding section can obtain a difference in the upper bits between pixels to generate the encoded data.

The image processing apparatus can further include: an extraction section configured to extract the additional data from the encoded data at the fixed length; and a decoded image data generation section configured to align the additional data extracted by the extraction section according to the addition order set by the addition order setting section to generate part of decoded image data in blocks.

The extraction section can further extract information regarding the addition order from the encoded data at the fixed length.

The information regarding the addition order can include the table designation information for designating table information indicating the addition order of the candidate data, and the addition order setting section can use the table information designated by the table designation information extracted by the extraction section to set the addition order of the candidate data.

The extraction section can be configured to further extract the encoded data from the encoded data at the fixed length, and the image processing apparatus can further include: a decoding section configured to decode the encoded data extracted by the extraction section from the encoded data at the fixed length to generate other part of the decoded image data in blocks; and a combination section configured to combine the other part of the decoded image data in blocks generated by the decoding section and the part of the decoded image data in blocks.

The decoding section can generate upper bits of each piece of pixel data included in the decoded image data in blocks, and the decoded image data generation section can generate lower bits of each piece of pixel data included in the decoded image data in blocks.

Another aspect of the present technique provides an image processing method including setting, on a block-by-block basis, an addition order of candidate data that is a candidate for additional data to be added to encoded data including encoded image data in blocks in order to set the encoded data to a fixed length.

In the image processing apparatus and method according to the aspects of the present technique, the addition order of the candidate data that is a candidate for the additional data to be added to the encoded data including the encoded image data in blocks in order to set the encoded data to the fixed length is set on a block-by-block basis.

Advantageous Effects of Invention

According to the present disclosure, an image can be processed. Particularly, a reduction in the image quality can be suppressed.

BRIEF DESCRIPTION OF DRAWINGS

FIG. 3 is a block diagram illustrating a main configuration example of an image processing apparatus.

FIG. 10 is a diagram describing an example of table information.

FIG. 24 is a block diagram illustrating a main configuration example of an image processing apparatus.

FIG. 25 is a block diagram illustrating a main configuration example of an encoding section.

DESCRIPTION OF EMBODIMENTS

Hereinafter, modes for carrying out the present disclosure (hereinafter, referred to as embodiments) will be described. Note that the embodiments will be described in the following order.
1. Refinement Addition Order of Simple Encoding and Simple Decoding
2. First Embodiment (Image Processing Apparatus)
3. Second Embodiment (Image Processing Apparatus)
4. Third Embodiment (Image Processing Apparatus)
5. Fourth Embodiment (Image Processing Apparatus)
6. Other Applications 1. Refinement Addition Order of Simple Encoding and Simple Decoding <Simple Encoding and Simple Decoding>

In recent years, encoding and decoding techniques of image data are used in various applications. For example, an encoding and decoding technique as described in PTL 1 is proposed to reduce the capacity and the band of a DRAM (Dynamic Random Access Memory) in an image processing apparatus or the like.

In the case of the encoding system described in PTL 1, an image is encoded (compressed) to a fixed length on a block-by-block basis. That is, the image is encoded such that the code amount of image data of each block is constant (predetermined amount defined in advance). Note that in the present specification, the "block" denotes an arbitrary partial region in a picture, and the size, the shape, the characteristics, and the like of the "block" are not limited. For example, the "block" may denote a data unit, such as TU (Transform Unit), PU (Prediction Unit), SCU (Smallest Coding Unit), CU (Coding Unit), LCU (Largest Coding Unit) (CTB (Coding Tree Block)), sub-block, macro block, tile, and slice, used in MPEG (Moving Picture Experts Group), AVC (Advanced Video Coding), HEVC (High Efficiency Video Coding), and the like, or the "block" may denote an original data unit of the encoding system.

Figure 1A:
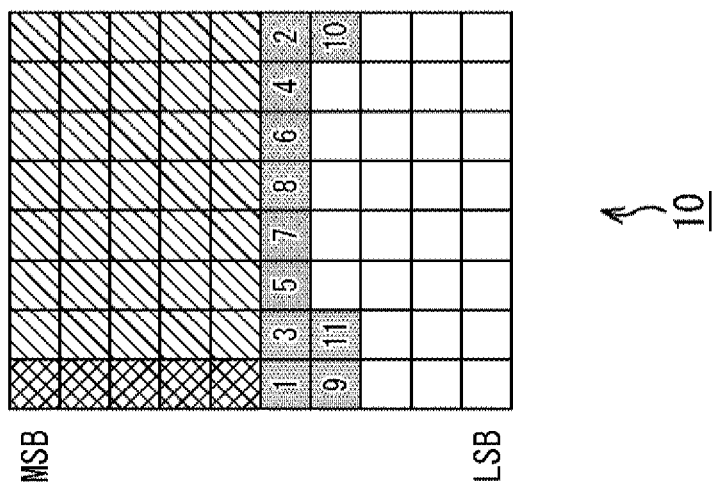
FIGS. 1A, 1B, and 1C are diagrams for describing an example of a state of simple encoding and simple decoding.

The encoding described in PTL 1 is performed in a state as illustrated for example in FIG. 1A. FIG. 1A illustrates image data of a block 10 to be processed. One vertical column of rectangles of the block 10 to be processed indicates pixel data. That is, the block 10 to be processed includes eight pixels. In addition, each rectangle indicates a bit. The rectangles at the top in FIGS. 1A, 1B, and 1C indicates most significant bits (MSBs), and the rectangles at the bottom indicate least significant bits (LSBs).

Figure 1B:
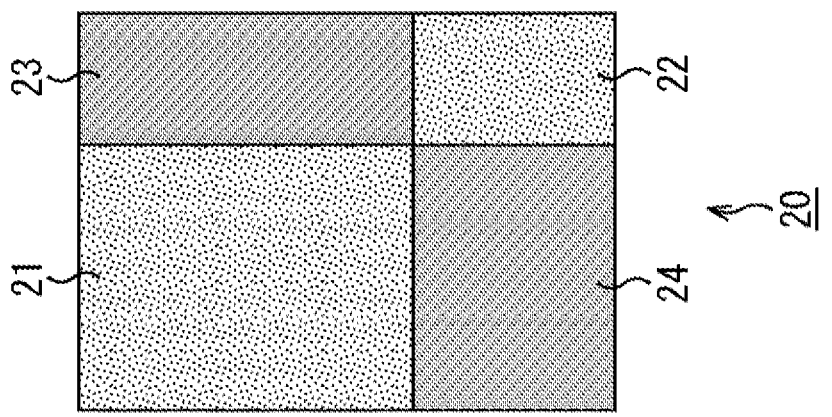
Figure 1C:
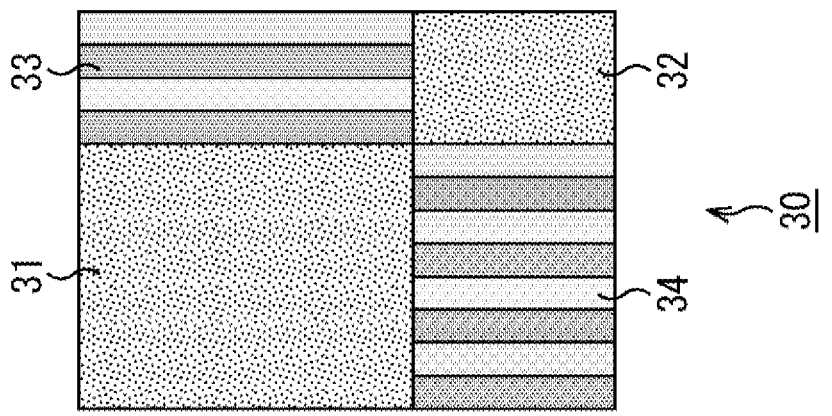

Each piece of pixel data of the block 10 to be processed is sequentially processed from the left to the right in FIGS. 1A, 1B, and 1C. PCM (Pulse Code Modulation) encoding is applied to upper 5 bits (5 bits from MSB) of the pixel data (one column at the left end in FIGS. 1A, 1B, and 1C) of the block 10 to be processed that is processed first. That is, the upper 5 bits (bits in a mesh pattern) of the first pixel data are output as uncompressed encoded data. DPCM (Differential Pulse Code Modulation) encoding is applied to the pixel data of the block 10 to be processed that is processed in the second and subsequent processing. That is, the upper 5 bits (bits in a diagonal line pattern) of the second and subsequent pixel data are subtracted from the upper 5 bits of the pixel data processed immediately before (adjacent on the left in FIGS. 1A, 1B, and 1C), and the difference values are output as encoded data.

Furthermore, part or all of lower 5 bits are added and output as additional data (also referred to as refinement data) as necessary to set the code amount of the block 10 to be processed to a fixed length (predetermined code amount). In the case of the example of FIG. 1A, gray bits of the block 10 to be processed are the refinement data. That is, eleven pieces of refinement data are added to the encoded data of the block 10 to be processed.

In addition, white parts of the block 10 to be processed are data (bits) not included in the encoded data.

In this way, in the case of the method described in PTL 1, the image data is encoded and decoded by a method simpler than in the case of the encoding and decoding system such as AVC and HEVC. Therefore, the method described in PTL 1 can further reduce the load of encoding and decoding compared to AVC, HEVC, and the like, and the encoding and the decoding can be performed faster. In addition, downsizing is easy, and the method can be realized at a lower cost.

The encoding will also be referred to as simple encoding (will also be referred to as simple compression). In addition, decoding corresponding to the simple encoding will also be referred to as simple decoding (will also be referred to as simple expansion). The simple encoding is an image encoding technique for reducing the data transfer rate and the memory bandwidth. In the simple encoding, the data is encoded (compressed) to maintain the subjective image quality at an equal level. In general, the compression ratio of the simple encoding (for example, approximately 50%) is lower than in general encoding, such as AVC, to maintain the subjective image quality at an equal level.

In the case of the simple encoding (simple compression) and the simple decoding (simple expansion), the code amount is set to a fixed length. Therefore, the management of the encoded data is easier than in a case where the code amount is variable. Therefore, the encoded data can be more easily managed in, for example, a DRAM or the like for storing the encoded data. As a result, the process, such as reading and writing, can be executed faster, and the process can be realized at a lower cost.

In addition, in the case of the simple encoding (simple compression) and the simple decoding (simple expansion), the image data is independently encoded and decoded on a block-by-block basis. Therefore, not only the encoding and the decoding of the entire picture, but also the encoding and the decoding of only part of the picture can be performed. That is, in the case where only part of the picture is encoded and decoded, encoding and decoding of unnecessary data can be suppressed, and the encoding and the decoding can be performed more efficiently. That is, this can suppress an unnecessary increase in the load of the encoding and the decoding and can realize an increase in the speed of the process and a reduction in the cost.

However, in the case of the method described in PTL 1, the addition order of the refinement data is common to all blocks. For example, the numbers provided to the gray bits (refinement data) in FIG. 1A indicate an addition order. In the case of the method described in PTL 1, the addition order common to all blocks is allocated to the lower 5 bits (5 bits from LSB) of each piece of pixel data, and the lower 5 bits are added according to the addition order until the code amount of the encoded data of the entire block reaches the fixed length (until the code amount reaches the predetermined amount of data).

By the way, in an image 20 illustrated in FIG. 1B, images of a region 21 and a region 22 are random images, and images of a region 23 and a region 24 are plain (gray) images. That is, the images of the region 23 and the region 24 are geometric patterns without noise, such as CG (Computer Graphics) images. When the method described in PTL 1 is used to encode and decode the image 20, a decoded image 30 as illustrated in FIG. 1C is obtained.

Regions 31 to 34 of the decoded image 30 are regions corresponding to the regions 21 to 24 of the image 20, respectively. The images of the blocks are common in the region 23 and the region 24 including the plain (gray) images. Therefore, the code amount of the upper 5 bits is the same in each block, and the added refinement data is also similar. Therefore, in the region 33 and the region 34 of the decoded image 30, differences in level of the refinement data between the pixel data appear as vertical stripe patterns.

In this way, when the method described in PTL 1 is used to perform the simple encoding and the simple decoding, the difference in level of the refinement data appears as a pattern in the decoded image, and the subjective image quality of the decoded image may be reduced. Particularly, when the method described in PTL 1 is used to apply the simple encoding and the simple decoding to the image in a geometric pattern without noise, such as a CG (Computer Graphics) image, the pattern of the decoded image becomes more conspicuous, and the subjective image quality may be significantly reduced.

<Making Addition Order Variable>

Figure 2A:
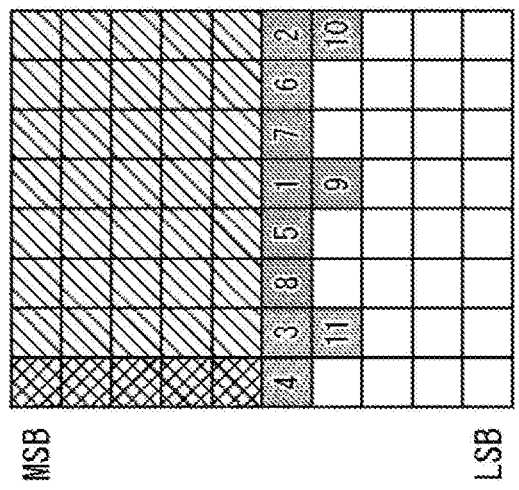
FIGS. 2A, 2B, and 2C are diagrams describing an example of control of an addition order of refinement pixels.
Figure 2B:
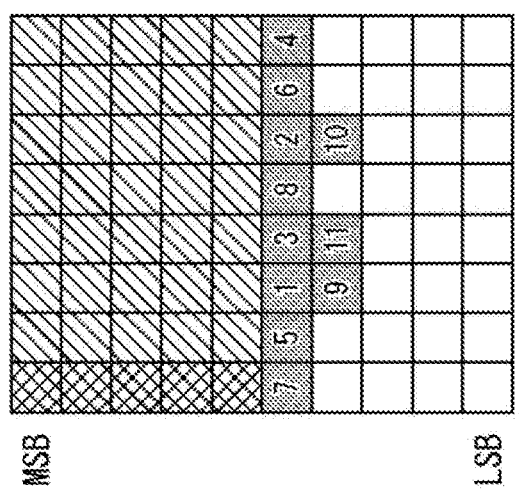
Figure 2C:
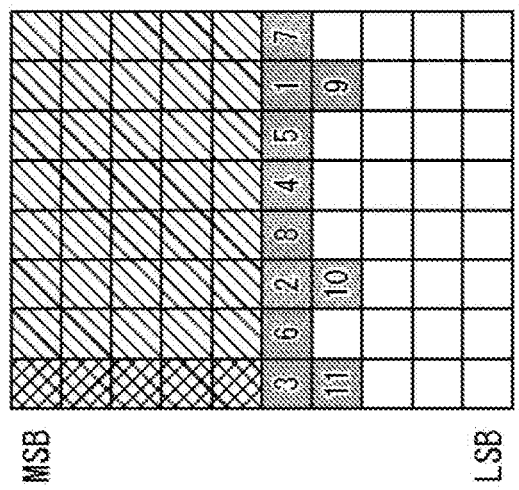

Therefore, the addition order of the refinement data is made variable. That is, to set the encoded data including the encoded image data in blocks to the fixed length, the addition order of candidate data that is a candidate for the additional data to be added to the encoded data is set on a block-by-block basis. For example, the addition order of the refinement data may be changed on a block-by-block basis. For example, the addition order of the refinement data of a block 50 (block N) in an Nth (N is an arbitrary natural number) process is an order as illustrated in FIG. 2A. The addition order of the refinement data of a block 60 (block (N+1)) processed next is an order as illustrated in FIG. 2B. The addition order of the refinement data of a block 70 (block (N+2)) processed next is an order as illustrated in FIG. 2C. In this way, as a result of making the addition order of the refinement data variable instead of fixing the addition order, the difference in level of the refinement data is not uniform, and the pattern caused by the difference in level of the refinement data is unlikely to appear in the decoded image. This can suppress the reduction in the image quality of the decoded image.

2. First Embodiment

<Image Processing Apparatus>

FIG. 3 is a block diagram illustrating an example of a configuration according to an aspect of an image processing apparatus in which the present technique is applied. An image processing apparatus 100 illustrated in FIG. 3 is an apparatus that applies simple encoding (simple compression) according to the present technique to an input image (input data) to generate encoded data and that applies simple decoding (simple expansion) to the encoded data to generate a decoded image (decoded image data). Although the present technique is actually realized in combination with other components, such as, for example, a DRAM, as described later, only the configuration regarding the encoding and the decoding is illustrated in the image processing apparatus 100 of FIG. 3 to describe the encoding and the decoding.

As illustrated in FIG. 3, the image processing apparatus 100 includes a control section 101, an encoding section 102, and a decoding section 103. The control section 101 executes a process regarding control of the encoding section 102 and the decoding section 103 (control regarding encoding and decoding). The encoding section 102 applies simple encoding (simple compression) to an input image (image data) input to the image processing apparatus 100 and generates, for example, a bit stream or the like of the encoded data. The encoding section 102 supplies the generated encoded data (bit stream) to the decoding section 103. The decoding section 103 applies, to the encoded data, simple decoding (simple expansion) as a decoding system corresponding to the simple encoding (simple compression) of the encoding section 102 and generates a decoded image (decoded image data). The decoding section 103 outputs the generated decoded image (decoded image data) to the outside of the image processing apparatus 100.

The image processing apparatus 100 uses pseudo-random numbers to set the addition order of the refinement data on a block-by-block basis. For example, the control section 101 generates a seed (also referred to as seed information) for generating the pseudo-random numbers and supplies the seed to the encoding section 102 and the decoding section 103. The encoding section 102 uses the seed supplied from the control section 101 to generate pseudo-random numbers and sets the addition order of the refinement data on the basis of the pseudo-random numbers. The decoding section 103 similarly uses the seed supplied from the control section 101 to generate pseudo-random numbers and sets the addition order of the refinement data on the basis of the pseudo-random numbers. The encoding section 102 and the decoding section 103 use the same method to generate the pseudo-random numbers based on the same seed, and the same addition order can be set.

The components from the control section 101 to the decoding section 103 execute the process on a block-by-block basis. That is, the seed is generated on a block-by-block basis, and the pseudo-random numbers are generated from the seed. The addition order of the refinement data is set on the basis of the pseudo-random numbers. Therefore, the image processing apparatus 100 can change the addition order of the refinement data on a block-by-block basis. As a result, a reduction in the image quality, such as a pattern not included in the input image appearing in the decoded image, can be suppressed.

<Encoding Section>

Figure 4:
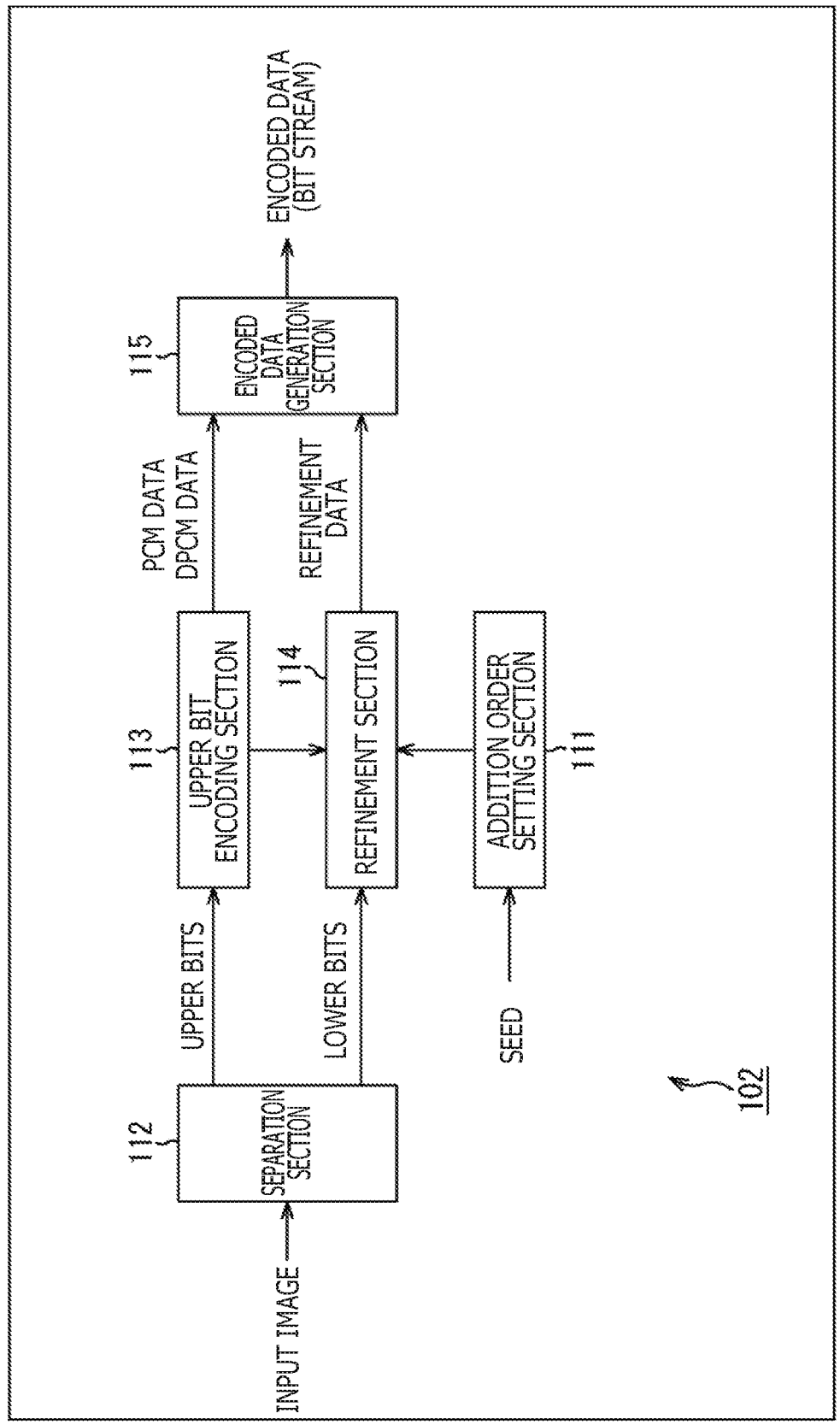
FIG. 4 is a block diagram illustrating a main configuration example of an encoding section.

FIG. 4 is a block diagram illustrating a main configuration example of the encoding section 102. As illustrated in FIG. 4, the encoding section 102 includes an addition order setting section 111, a separation section 112, an upper bit encoding section 113, a refinement section 114, and an encoded data generation section 115.

The addition order setting section 111 executes a process regarding setting of the addition order. For example, the addition order setting section 111 sets, on a block-by-block basis, the addition order of candidate data that is a candidate for the additional data to be added to the encoded data including the encoded image data in blocks in order to set the encoded data to the fixed length. In this case, the addition order setting section 111 acquires the seed information (seed) supplied from the control section 101, uses the acquired seed to generate pseudo-random numbers, and uses the generated pseudo-random numbers to set the addition order of the candidate data. The addition order setting section 111 supplies information indicating the addition order to the refinement section 114. In this way, the addition order setting section 111 can set the addition order so as to suppress the generation of the pattern caused by the difference in level of the refinement data in the decoded image.

The separation section 112 executes a process regarding separation of the input image (image data). For example, the separation section 112 separates each piece of pixel data of the input image into upper bits and lower bits in a bit length direction at a predetermined bit position. The bit position for the separation into the upper bits and the lower bits is arbitrary. For example, the separation section 112 separates the pixel data of 10 bits into upper 5 bits (5 bits from MSB) and lower 5 bits (5 bits from LSB). The separation section 112 supplies the separated upper bits to the upper bit encoding section 113 and the separated lower bits to the refinement section 114.

Note that the method of separating the input image (image data) by the separation section 112 is arbitrary, and the method is not limited to the example of the upper bits and the lower bits. In addition, the number of types of bits after the separation is not limited to two described above, and the number is arbitrary. For example, the separation section 112 may separate the input image into three types of bits, that is, upper bits, middle bits, and lower bits, or may separate the input image into four or more types of bits. Furthermore, the input image (image data) may be supplied to each of sections including the upper bit encoding section 113 and the refinement section 114 without separating the input image. That is, the separation section 112 may be eliminated in that case. In addition, the separation section 112 may be able to change the method of separating the input image according to the situation (for example, on a block-by-block basis).

The upper bit encoding section 113 executes a process regarding encoding of the image data supplied from the separation section 112. For example, the upper bit encoding section 113 encodes, on a block-by-block basis, the image data supplied from the separation section 112 to generate encoded data. For example, the upper bit encoding section 113 encodes the upper bits of each piece of pixel data included in the image data in blocks to generate encoded data. For example, the upper bit encoding section 113 obtains differences in the upper bits between the pixels to generate encoded data.

For example, the upper bit encoding section 113 supplies, to the encoded data generation section 115, PCM data including the upper bits of the first pixel data of the block to be processed. Next, the upper bit encoding section 113 obtains differences between the upper bits of the first pixel data of the block to be processed and the upper bits of the second pixel data of the block to be processed and supplies DPCM data including the difference values to the encoded data generation section 115. The upper bit encoding section 113 similarly processes the upper bits of the third and subsequent pixel data to obtain differences from the upper bits of the pixel data immediately before and supplies DPCM data including the difference values to the encoded data generation section 115. In this way, the upper bit encoding section 113 can use a simple method to encode (compress) the input image. When the encoding of the block to be processed is finished, the upper bit encoding section 113 supplies information indicating the code amount of the generated encoded data to the refinement section 114. Note that the method of encoding by the upper bit encoding section 113 is arbitrary, and the method is not limited to the examples (PCM and DPCM).

The refinement section 114 executes a process regarding generation of the refinement data. For example, the refinement section 114 generates additional data to be added to the encoded data generated by the upper bit encoding section 113 on the basis of the addition order set by the addition order setting section 111. For example, the refinement section 114 selects, in the addition order set by the addition order setting section 111, the lower bits of each piece of pixel data included in the image data in blocks and sets the lower bits as the additional data.

For example, the refinement section 114 acquires the information supplied from the upper bit encoding section 113 indicating the code amount of the encoded data of the block to be processed generated by the upper bit encoding section 113. In addition, for example, the refinement section 114 acquires the lower bits of each piece of pixel data of the block to be processed supplied from the separation section 112. Furthermore, for example, the refinement section 114 acquires the information indicating the addition order supplied from the addition order setting section 111. The refinement section 114 sets the amount of data (the number of bits) of the refinement data to be added to the encoded data on the basis of the information indicating the code amount of the encoded data of the block to be processed. That is, the refinement section 114 sets the amount of data of the refinement data so as to set the code amount of the encoded data of the block to be processed to a predetermined value (fixed length). The refinement section 114 then selects the lower bits of each piece of pixel data of the block to be processed equivalent to the set amount of data according to the addition order indicated in the information indicating the addition order. The refinement section 114 supplies the selected bits as refinement data to the encoded data generation section 115. In this way, the refinement section 114 can set the encoded data of each block to the fixed length. In addition, the refinement section 114 can generate the refinement data according to the addition order set by the addition order setting section 111 so as to suppress the generation of the pattern caused by the difference in level of the refinement data in the decoded image.

The encoded data generation section 115 executes a process regarding generation of encoded data including the input image subjected to simple encoding (simple compression). For example, the encoded data generation section 115 generates encoded data at the fixed length including the encoded data and the additional data added in the addition order set by the addition order setting section 111.

For example, the encoded data generation section 115 acquires the PCM data and the DPCM data supplied from the upper bit encoding section 113 and the refinement data supplied from the refinement section 114 and generates encoded data of the block to be processed including the data. The encoded data generation section 115 supplies, for example, a bit stream or the like of the encoded data to the decoding section 103. In this way, the encoded data generation section 115 can generate encoded data at the fixed length on a block-by-block basis.

In this way, the encoding section 102 can apply the simple encoding to the input image to generate the encoded data at the fixed length on a block-by-block basis. In this case, the encoding section 102 can perform the simple encoding so as to suppress the generation of the pattern caused by the difference in level of the refinement data in the decoded image. Therefore, the encoding section 102 can suppress the reduction in the image quality.

<Encoded Data>

Figure 5:
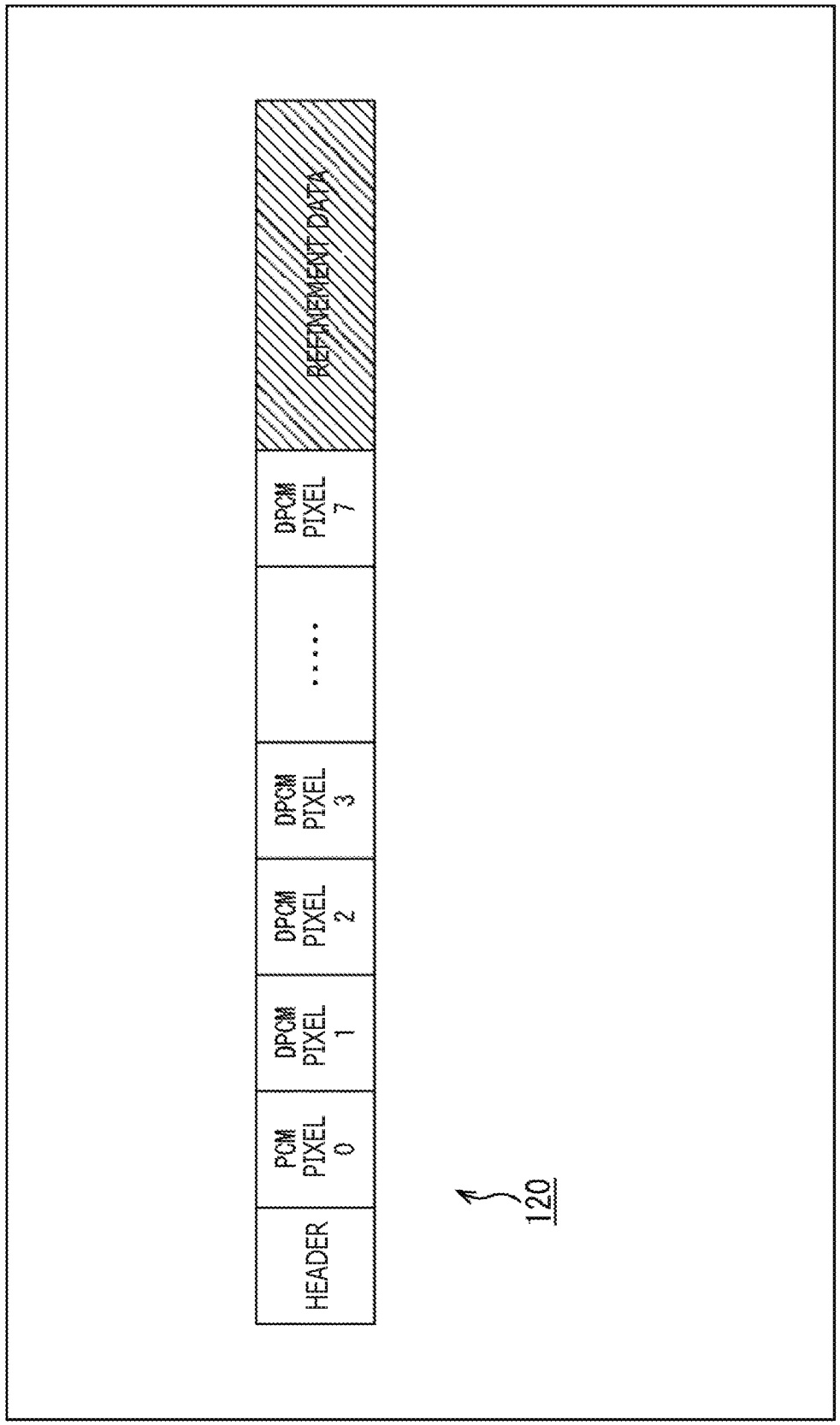
FIG. 5 is a schematic diagram describing a main configuration example of encoded data.

FIG. 5 is a schematic diagram illustrating a main configuration example of the encoded data generated by the encoding section 102. As illustrated in FIG. 5, encoded data 120 in this case includes a header as well as PCM data (PCM pixel 0) of a top pixel (pixel 0), DPCM data (DPCM pixel 1) of a second pixel (pixel 1), . . . , DPCM data (DPCM pixel 7) of an eighth pixel (pixel 7), and refinement data. In this way, the refinement data can be added, in other words, the amount of bit of the refinement data to be added can be adjusted, to set the encoded data 120 to the fixed length.

<Decoding Section>

Figure 6:
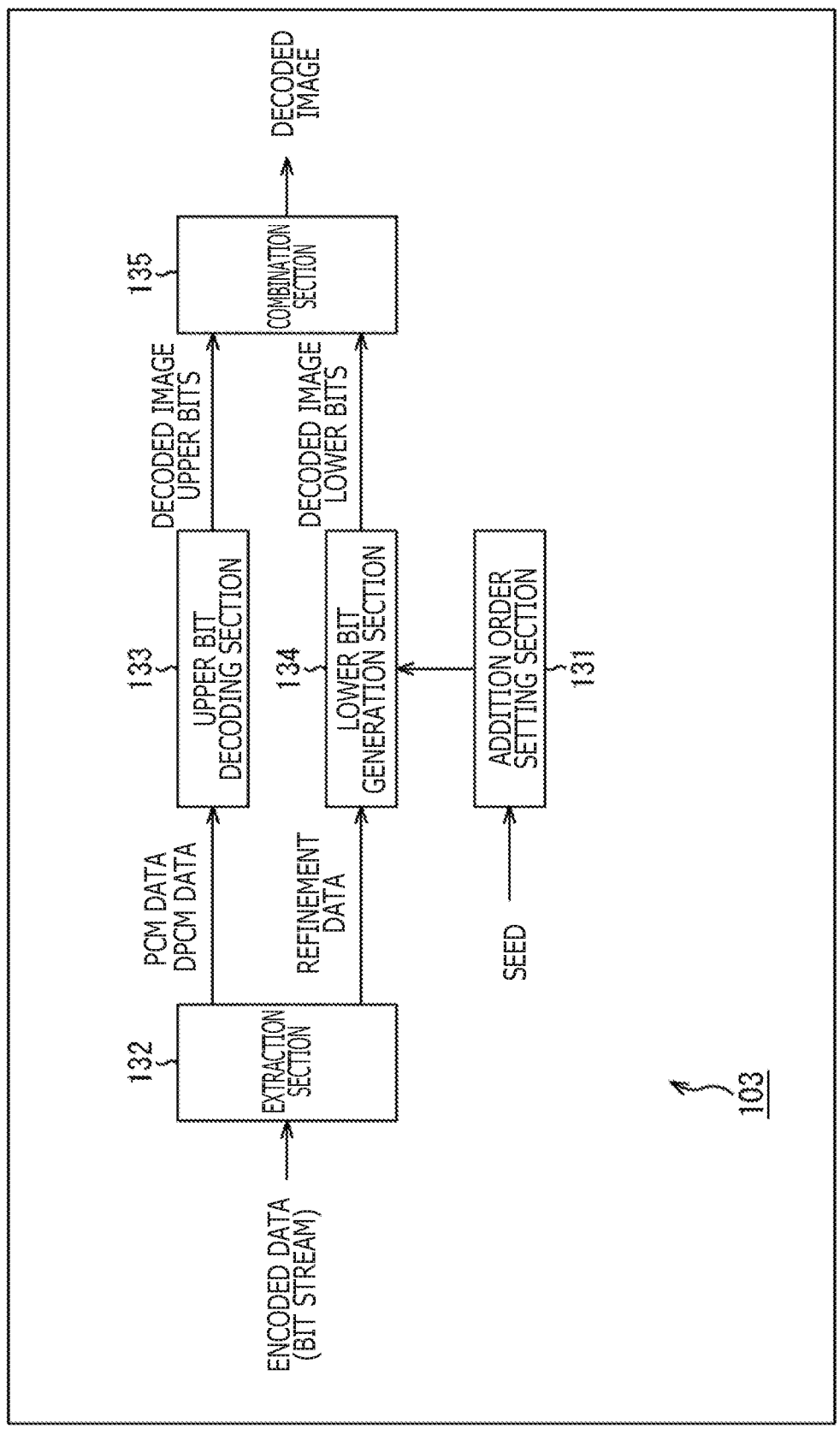
FIG. 6 is a block diagram illustrating a main configuration example of a decoding section.

FIG. 6 is a block diagram illustrating a main configuration example of the decoding section 103. As illustrated in FIG. 6, the decoding section 103 includes an addition order setting section 131, an extraction section 132, an upper bit decoding section 133, a lower bit generation section 134, and a combination section 135.

The addition order setting section 131 is a processing section similar to the addition order setting section 111. That is, the addition order setting section 131 executes a process regarding setting of the addition order. For example, the addition order setting section 131 sets, on a block-by-block basis, the addition order of the candidate data that is a candidate for the additional data to be added to the encoded data including the encoded image data in blocks in order to set the encoded data to the fixed length. In this case, the addition order setting section 131 acquires the seed information (seed) supplied from the control section 101, uses the acquired seed to generate pseudo-random numbers, and uses the generated pseudo-random numbers to set the addition order of the candidate data. The addition order setting section 131 supplies the information indicating the addition order to the lower bit generation section 134. In this way, the addition order setting section 131 can set the same addition order as in the case of the addition order setting section 111.

That is, the addition order setting section 131 can set the addition order to suppress the generation of the pattern caused by the difference in level of the refinement data in the decoded image.

The extraction section 132 executes a process regarding data extraction from the encoded data (bit stream) at the fixed length supplied to the decoding section 103. For example, the extraction section 132 extracts, from the encoded data at the fixed length, the additional data (refinement data) generated by the refinement section 114 and the encoded data (PCM data and DPCM data) of the upper bits generated by the upper bit encoding section 113. The extraction section 132 supplies the extracted PCM data and DPCM data to the upper bit decoding section 133. The extraction section 132 also supplies the extracted refinement data to the lower bit generation section 134. As a result, the decoding section 103 can properly decode the encoded data at the fixed length generated by the encoding section 102.

The upper bit decoding section 133 executes a process regarding decoding of the upper bits. For example, the upper bit decoding section 133 decodes the encoded data extracted by the extraction section 132 from the encoded data at the fixed length to generate part (other part) of the decoded image data in blocks. For example, the upper bit decoding section 133 generates upper bits of each piece of pixel data included in the decoded image data in blocks. For example, the upper bit decoding section 133 adds, to the difference values of upper bits between the pixels, the upper bits of one piece of pixel data to generate the upper bits of another piece of pixel data and performs the addition for each difference value to generate the upper bits of each piece of pixel data included in the decoded image data in blocks.

For example, the upper bit decoding section 133 supplies the PCM data of the first pixel of the block to be processed as upper bits of the first pixel data (decoded image upper bits) to the combination section 135. Next, the upper bit decoding section 133 subtracts the DPCM data of the second pixel from the upper bits of the first pixel data of the block to be processed and supplies the difference values as decoded image upper bits of the second pixel to the combination section 135. The upper bit decoding section 133 similarly processes the DPCM data of the third and subsequent pixels to obtain the differences from the upper bits of the pixel data immediately before and supplies the difference values as decoded image upper bits of the pixel to the combination section 135. In this way, the upper bit decoding section 133 can use a simple method corresponding to the upper bit encoding section 113 to decode (expand) the data.

The lower bit generation section 134 executes a process regarding generation of the lower bits. For example, the lower bit generation section 134 aligns the additional data (refinement data) extracted by the extraction section 132 according to the addition order set by the addition order setting section 131 to generate part of the decoded image data in blocks. For example, the lower bit generation section 134 generates the lower bits of each piece of pixel data included in the decoded image data in blocks.

For example, the lower bit generation section 134 performs an operation, such as rearranging the refinement data extracted by the extraction section 132 as necessary, according to the addition order set by the addition order setting section 131 to generate data (decoded image lower bits) equivalent to the lower bits (for example, lower 5 bits) of the input image. After generating the decoded image lower bits of each pixel of the block to be processed, the lower bit generation section 134 supplies the decoded image lower bits to the combination section 135. In this way, the lower bit generation section 134 can use a simple method corresponding to the refinement section 114 to decode (expand) the data.

The combination section 135 combines the other part of the decoded image data in blocks generated by the upper bit decoding section 133 and the part of the decoded image data in blocks generated by the lower bit generation section 134. For example, for the block to be processed, the combination section 135 combines the decoded image upper bits supplied from the upper bit decoding section 133 and the decoded image lower bits supplied from the lower bit generation section 134 to generate each piece of pixel data of the decoded image. The combination section 135 outputs the pixel data of each pixel of the block to be processed as a decoded image (decoded image data) to the outside of the decoding section 103 (image processing apparatus 100). In this way, the combination section 135 can generate the decoded image data on a block-by-block basis.

In this way, the decoding section 103 can obtain the decoded image by applying, on a block-by-block basis, the simple decoding to the encoded data at the fixed length obtained by the encoding section 102 applying the simple encoding to the input image. In this case, the decoding section 103 can decode the data as described above to perform the simple decoding so as to suppress the generation of the pattern caused by the difference in level of the refinement data in the decoded image. Therefore, the decoding section 103 can suppress the reduction in the image quality.

Note that the method of each process executed by each processing section of the decoding section 103 may be any method as long as the method corresponds to the encoding section 102.

<Flow of Control Process>

Figure 7:
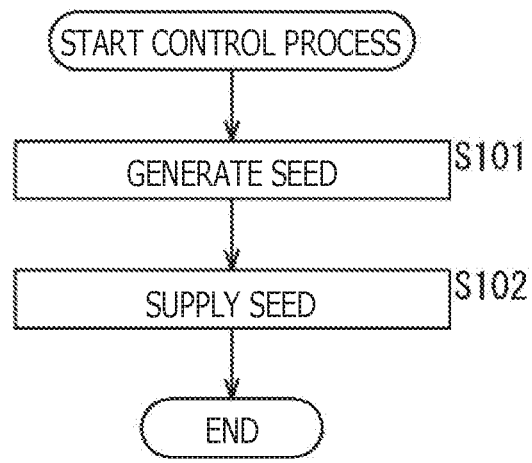
FIG. 7 is a flow chart describing an example of a flow of a control process.

Next, flows of processes executed by the respective processing sections of the image processing apparatus 100 configured as described above will be described. First, an example of a flow of a control process executed by the control section 101 will be described with reference to a flow chart of FIG. 7.

Once the control process is started, the control section 101 generates a seed (seed information) in step S101. The generation method of the seed is arbitrary. The seed may be generated on the basis of some information or may be set by the user or the like. In addition, the generation method of the seed may be switchable.

Once the seed is generated, the control section 101 supplies the generated seed to the encoding section 102 and the decoding section 103 in step S102.

Once the seed is supplied, the control process ends. As a result of the execution of the control process by the control section 101, the encoding section 102 and the decoding section 103 can switch the addition order of the refinement data. The control section 101 can execute the control process at an arbitrary timing. For example, the control section 101 may execute the control process on a block-by-block basis. In this way, the encoding section 102 and the decoding section 103 can switch the addition order of the refinement data on a block-by-block basis.

<Flow of Encoding Process>

Next, an example of a flow of an encoding process executed by the encoding section 102 will be described with reference to a flow chart of FIG. 8.

Once the encoding process is started, the addition order setting section 111 of the encoding section 102 acquires the seed supplied from the control section 101 in step S111.

In step S112, the addition order setting section 111 uses the seed to generate pseudo-random numbers and sets the addition order of the refinement data on the basis of the pseudo-random numbers.

In step S113, the separation section 112 acquires the block to be processed of the input image. In step S114, the separation section 112 separates each piece of pixel data of the block to be processed of the input image into upper bits and lower bits.

In step S115, the upper bit encoding section 113 encodes the upper bits of each pixel.

In step S116, the refinement section 114 sets the candidate data including the lower bits extracted in step S114 as the refinement data to be added to the encoded data of the upper bits of each pixel obtained in step S115 according to the addition order set in step S112 until the code amount of the encoded data of the block to be processed reaches the predetermined code amount (fixed length).

In step S117, the encoded data generation section 115 uses the encoded data of the upper bits generated in step S115 and the refinement data set in step S116 to generate encoded data at the fixed length of the block to be processed. The encoded data generation section 115 outputs a bit stream or the like of the generated encoded data to the outside of the encoding section 102.

When the process of step S117 is finished, the encoding process ends. The encoding section 102 can execute the encoding process at an arbitrary timing. For example, the encoding section 102 may execute the encoding process on a block-by-block basis.

<Flow of Decoding Process>

Next, an example of a flow of a decoding process executed by the decoding section 103 will be described with reference to a flow chart of FIG. 9.

Once the decoding process is started, the addition order setting section 131 of the decoding section 103 acquires the seed supplied from the control section 101 in step S121.

In step S122, the addition order setting section 131 uses the seed to generate pseudo-random numbers and sets the addition order of the refinement data on the basis of the pseudo-random numbers.

In step S123, the extraction section 132 acquires encoded data of the block to be processed. In step S124, the extraction section 132 extracts PCM data, DPCM data, and refinement data from the encoded data.

In step S125, the upper bit decoding section 133 uses the PCM data and the DPCM data to decode upper bits of each pixel of the block to be processed.

In step S126, the lower bit generation section 134 performs an operation, such as aligning the refinement data extracted in step S124 according to the addition order set in step S122, to generate lower bits of each pixel of the encoded data of the block to be processed.

In step S127, the combination section 135 combines the decoded image upper bits of each pixel of the block to be processed obtained in step S125 and the decoded image lower bits of each pixel of the block to be processed obtained in step S126 to generate decoded image data. The combination section 135 outputs the generated decoded image data to the outside of the decoding section 103 (image processing apparatus 100).

When the process of step S127 is finished, the decoding process ends. The decoding section 103 can execute the decoding process at an arbitrary timing. For example, the decoding section 103 may execute the decoding process on a block-by-block basis.

The image processing apparatus 100 can execute each process as described above to suppress the reduction in the subjective image quality of the decoded image. In addition, each of sections including the encoding section 102 and the decoding section 103 sets the addition order of the refinement data in this case. Therefore, the information regarding the addition order of the refinement data does not have to be included in the encoded data (bit stream), and the reduction in the encoding efficiency can be suppressed.

<Modifications>

Note that the control section 101 may supply the pseudo-random numbers to the encoding section 102 and the decoding section 103 instead of the seed. In that case, the control section 101 generates the pseudo-random numbers. The other processes are as described above.

In addition, the control section 101 may supply seeds (or pseudo-random numbers) of a plurality of blocks to the encoding section 102 and the decoding section 103 all at once. In this way, the number of times that the information is provided from the control section 101 to the encoding section 102 and the decoding section 103 can be reduced. Furthermore, the information can be provided without being synchronized with the block-based process, and the control process can be more easily executed.

3. Second Embodiment

<Setting of Addition Order Based on Table>

The pseudo-random numbers are used to set the addition order of the candidate data that is a candidate for the additional data (refinement data) in the description of the first embodiment. Alternatively, table information may be used to set the addition order of the candidate data, for example.

For example, in the case of the first embodiment, the upper 5 bits of each piece of pixel data of 10 bits are encoded by the DPCM or the like, and part or all of the lower 5 bits are set as the refinement data and added to the encoded data of the upper 5 bits. Table information for allocating the addition order to each of the lower 5 bits (that is, candidate data) of each piece of pixel data is generated, and the refinement data is added according to the table information. In other words, the addition order of each piece of candidate data is managed as the table information.

In this way, the addition order of the candidate data can be referenced without generating the pseudo-random numbers, and the addition order of the candidate data can be easily managed.

Then, the table information may be switched to switch the addition order of the candidate data. For example, a plurality of pieces of table information based on different manners of allocating the addition order to each piece of candidate data (allocation patterns of addition order) may be prepared, and the table information to be adopted as the addition order of the candidate data may be selected from the table information.

For example, in a case of FIG. 10, four pieces of table information, that is, table information 141-1, table information 141-2, table information 141-3, and table information 141-4, are prepared in advance. Hereinafter, the table information 141-1 to 141-4 will be referred to as table information 141 in the case where the distinction is not necessary in the description. Each piece of the table information 141 illustrated in FIG. 10 indicates the allocation pattern of the addition order for 4 bits of each piece of pixel data in the block to be processed including 8 pixels. That is, each rectangle of the table information 141 indicates a bit, and a vertical column indicates each piece of pixel data (4 bits of the pixel data) in the block to be processed. The numbers allocated to the rectangles indicate the addition order allocated to the bits. That is, in this case, there are 32 pieces of candidate data, that is, 8 pixels×4 bits, and the additional order of one of 1 to 32 is allocated to each. As illustrated in FIG. 10, the manner of allocating the addition order to each piece of candidate data (allocation pattern) is different in each piece of table information 141.

Therefore, in this case, the addition order of the candidate data can be easily updated just by updating the table information 141 to be used.

<Image Processing Apparatus>

Figure 11:
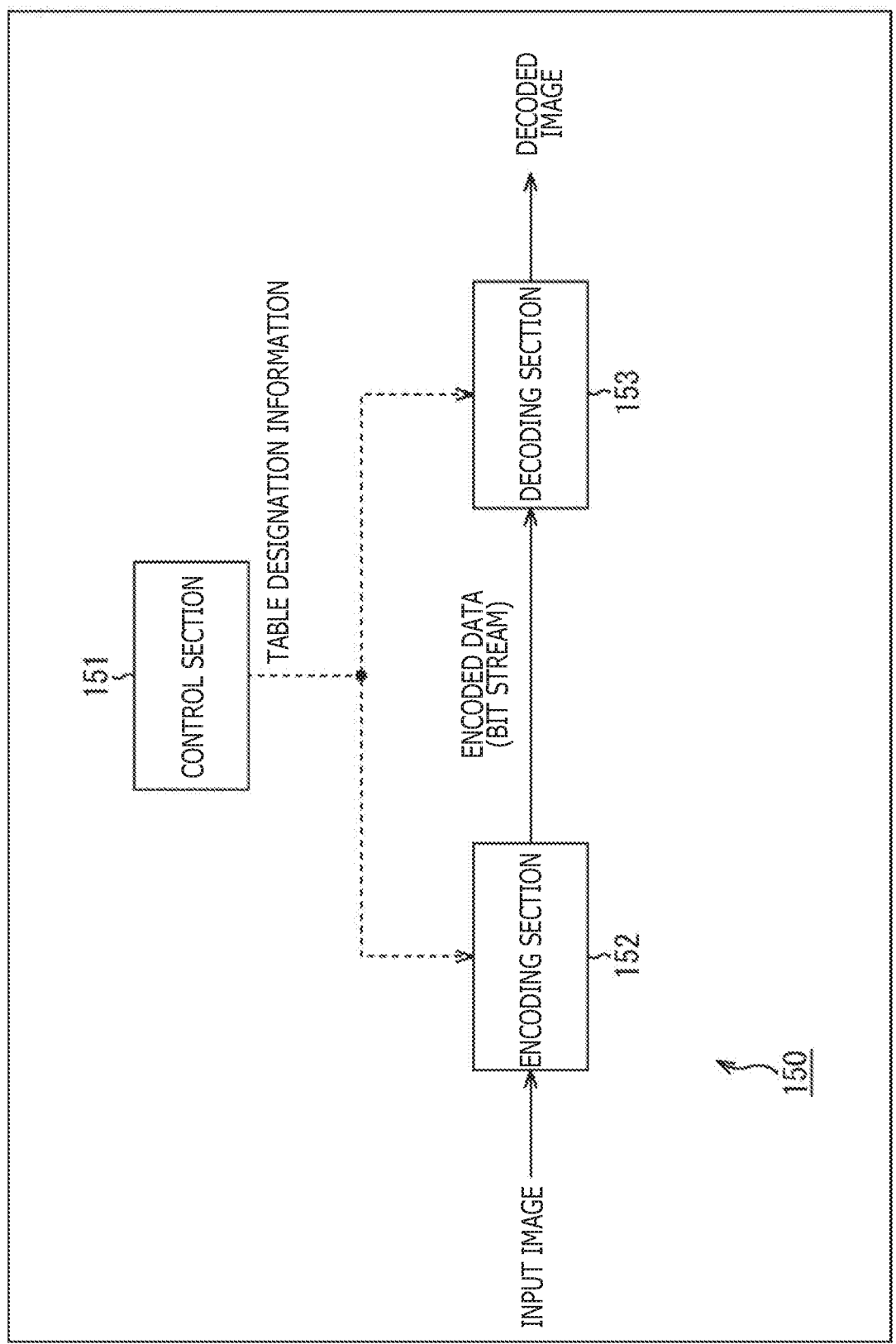
FIG. 11 is a block diagram illustrating a main configuration example of an image processing apparatus.

FIG. 11 is a block diagram illustrating an example of a configuration according to an aspect of the image processing apparatus in this case. An image processing apparatus 150 illustrated in FIG. 11 is an apparatus that applies the simple encoding (simple compression) according to the present technique to an input image (image data) to generate encoded data and applies the simple decoding (simple expansion) to the encoded data to generate a decoded image (decoded image data), just like the image processing apparatus 100 of FIG. 3. Although the present technique is actually realized in combination with other components, such as, for example, a DRAM, as described later, only the configuration regarding the encoding and the decoding is illustrated in the image processing apparatus 150 of FIG. 11 to describe the encoding and the decoding.

As illustrated in FIG. 11, the image processing apparatus 150 includes a control section 151, an encoding section 152, and a decoding section 153. The control section 151 is a processing section basically similar to the control section 101 and is configured to execute a process regarding control of the encoding section 152 and the decoding section 153 (perform control regarding the encoding and the decoding). However, the control section 151 supplies table designation information for designating the table information indicating the addition order of the candidate data to the encoding section 152 and the decoding section 153 instead of the seed.

The encoding section 152 is a processing section basically similar to the encoding section 102 and is configured to apply the simple encoding (simple compression) to the input image (image data) input to the image processing apparatus 150 and generate, for example, a bit stream or the like of the encoded data. However, the encoding section 152 uses the table information to set the addition order of the candidate data. In this case, the encoding section 152 selects the table information to be used on the basis of the table designation information supplied from the control section 151. The encoding section 152 supplies the generated encoded data (bit stream) to the decoding section 153.

The decoding section 153 is a processing section basically similar to the decoding section 103 and is configured to apply the simple decoding (simple expansion) as a decoding system corresponding to the simple encoding (simple compression) of the encoding section 152 to the encoded data to generate a decoded image (decoded image data). However, the decoding section 153 uses the table information to set the addition order of the candidate data, just like the encoding section 152. In this case, the decoding section 153 selects the table information to be used on the basis of the table designation information supplied from the control section 151. The decoding section 153 outputs the generated decoded image (decoded image data) to the outside of the image processing apparatus 150.

The encoding section 152 and the decoding section 153 include the same table information (a plurality of pieces of table information) and can select the same table information on the basis of the common table designation information supplied from the control section 151. That is, the encoding section 152 and the decoding section 153 can set the same addition order.

The components from the control section 151 to the decoding section 153 execute the process on a block-by-block basis. That is, the table designation information is generated on a block-by-block basis, and the table information is selected from the table designation information. The addition order of the refinement data is set on the basis of the selected table information. Therefore, the image processing apparatus 150 can change the addition order of the refinement data on a block-by-block basis. As a result, a reduction in the image quality, such as a pattern not included in the input image appearing in the decoded image, can be suppressed.

<Encoding Section>

Figure 12:
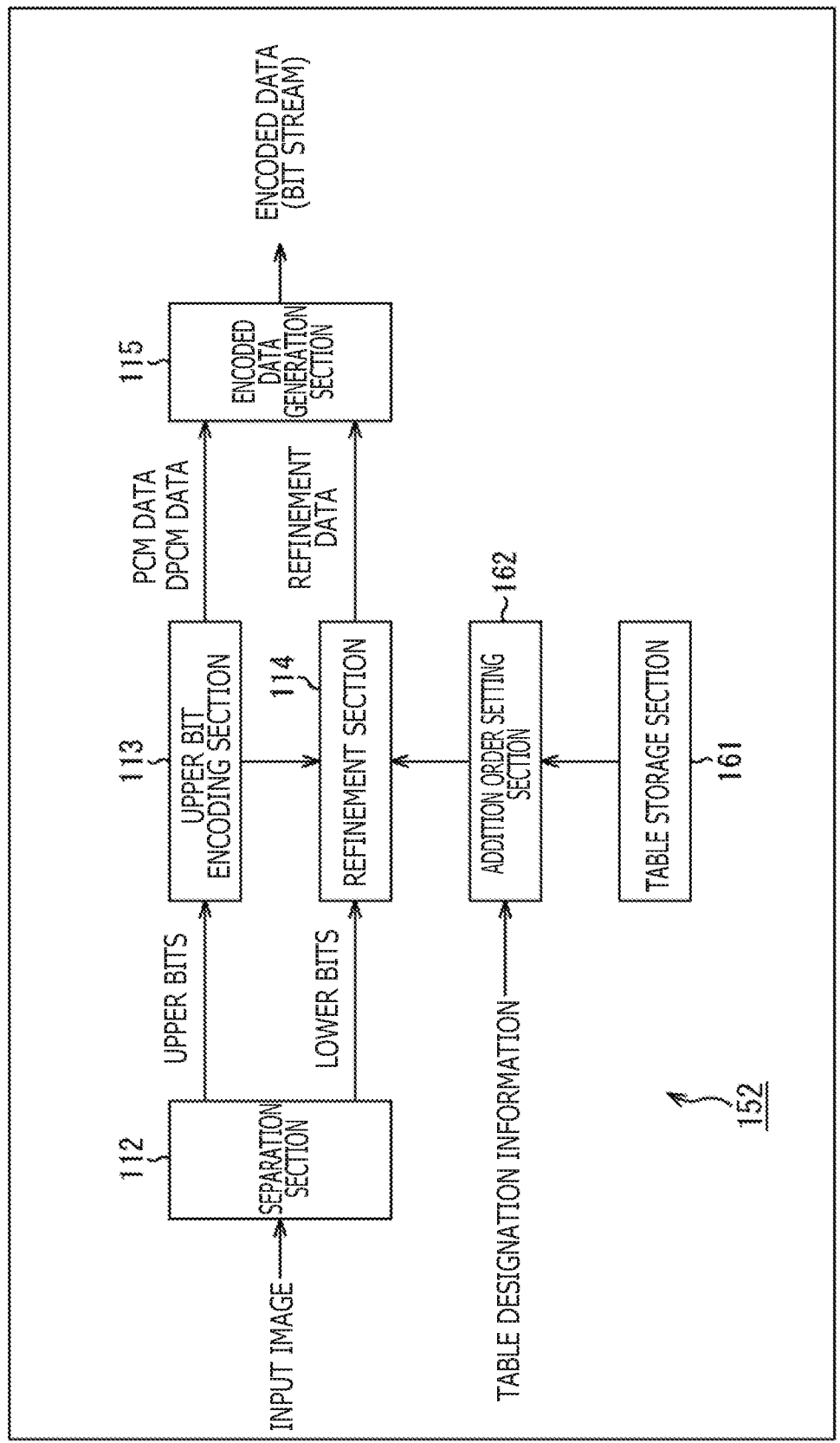
FIG. 12 is a block diagram illustrating a main configuration example of an encoding section.

FIG. 12 is a block diagram illustrating a main configuration example of the encoding section 152. As illustrated in FIG. 12, the encoding section 152 includes a table storage section 161, an addition order setting section 162, the separation section 112, the upper bit encoding section 113, the refinement section 114, and the encoded data generation section 115.

The table storage section 161 includes a storage area including, for example, a DRAM or the like and stores a plurality of pieces of table information based on different manners of allocating the addition order as illustrated for example in FIG. 10. Note that the number of pieces of table information stored in the table storage section 161 is arbitrary. The smaller the number of pieces of table information stored, the smaller the capacity of the table storage section 161 can be. This can suppress the increase in the cost and the circuit scale. However, if the number of pieces of table information as candidates is too small, it may be difficult to suppress the reduction in the image quality of the decoded image. How many pieces of table information need to be prepared depends on the environment of the system or the apparatus, the input image, and the like. In other words, with an increase in the number of pieces of table information stored, more diverse systems and apparatuses can more easily suppress the reduction in the image quality of the decoded image in more diverse input images. That is, the reduction in the image quality of the decoded image can be more surely suppressed.

The addition order setting section 162 is a processing section basically similar to the addition order setting section 111 and is configured to execute a process regarding setting of the addition order. For example, the addition order setting section 162 sets, on a block-by-block basis, the addition order of the candidate data that is a candidate for the additional data to be added to the encoded data including the encoded image data in blocks in order to set the encoded data to the fixed length. In this case, the addition order setting section 162 acquires the table designation information supplied from the control section 151, acquires the table information designated in the acquired table designation information from the table storage section 161, and uses the acquired table information to set the addition order of the candidate data. The addition order setting section 162 supplies the information indicating the addition order to the refinement section 114. In this way, the addition order setting section 162 can set the addition order to suppress the generation of the pattern caused by the difference in level of the refinement data in the decoded image.

Basically, as in the case of the first embodiment, the refinement section 114 selects the bits as refinement data (additional data) to be added to the encoded data generated by the upper bit encoding section 113 from the lower bit (candidate data) group of each piece of pixel data on the basis of the addition order set by the addition order setting section 162 and supplies the selected bits as refinement data to the encoded data generation section 115.

In this way, the encoding section 152 can apply the simple encoding to the input image to generate the encoded data at the fixed length on a block-by-block basis. In this case, the encoding section 152 can perform the simple encoding so as to suppress the generation of the pattern caused by the difference in level of the refinement data in the decoded image. Therefore, the encoding section 152 can suppress the reduction in the image quality.

<Encoded Data>

Note that the encoded data generated by the encoding section 152 is similar to the encoded data in the case of the first embodiment (FIG. 5). That is, in this case, the information regarding the addition order of the refinement data does not have to be included in the encoded data (bit stream), and the reduction in the encoding efficiency can be suppressed.

<Decoding Section>

Figure 13:
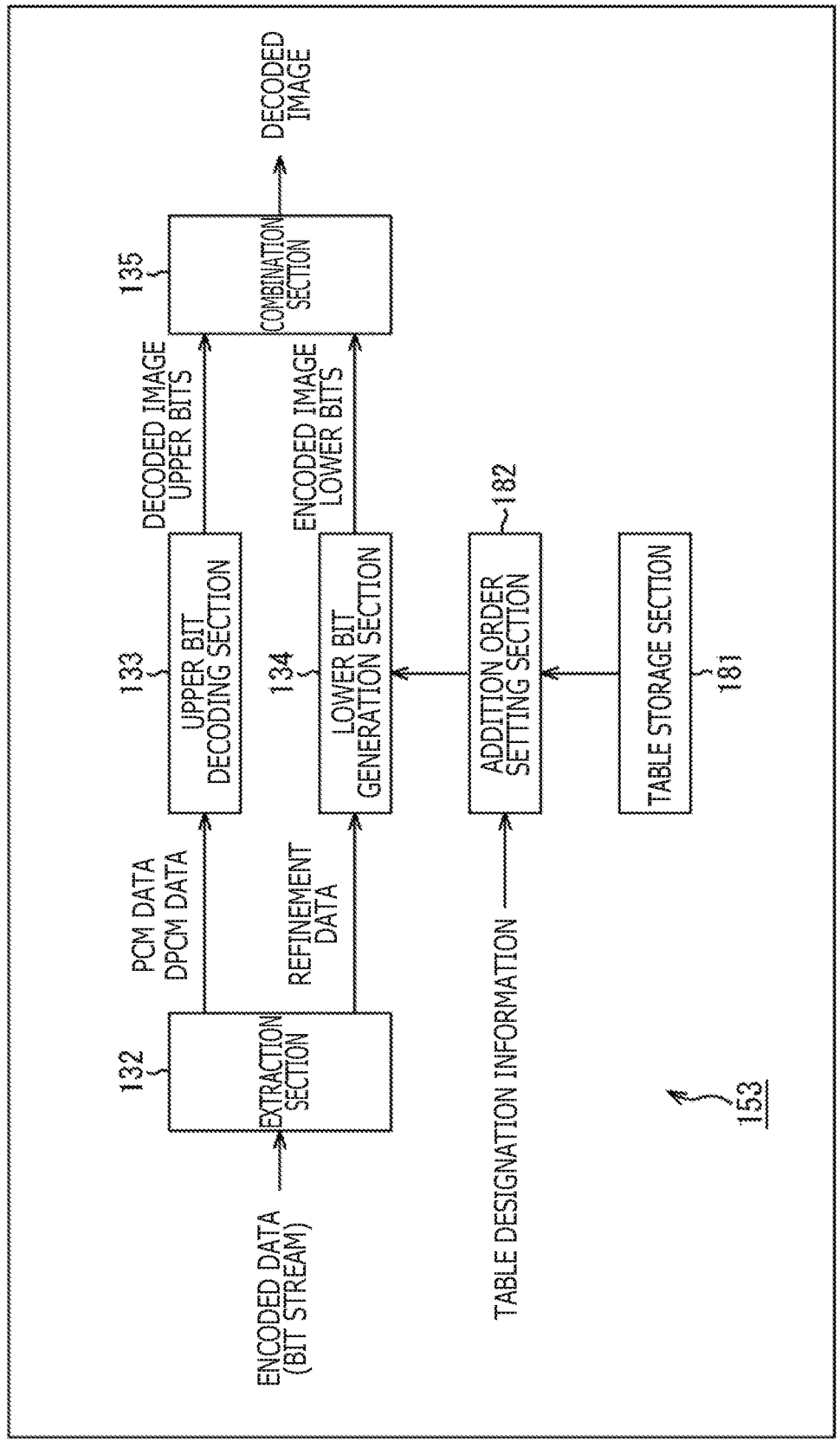
FIG. 13 is a block diagram illustrating a main configuration example of a decoding section.

FIG. 13 is a block diagram illustrating a main configuration example of the decoding section 153. As illustrated in FIG. 13, the decoding section 153 includes a table storage section 181, an addition order setting section 182, the extraction section 132, the upper bit decoding section 133, the lower bit generation section 134, and the combination section 135.

The table storage section 181 includes a storage area including, for example, a DRAM and stores a plurality of pieces of table information based on different manners of allocating the addition order as illustrated for example in FIG. 10. The table storage section 181 stores the same table information as the table information stored in the table storage section 161.

The addition order setting section 182 is a processing section basically similar to the addition order setting section 131 and is configured to execute a process regarding setting of the addition order. For example, the addition order setting section 182 sets, on a block-by-block basis, the addition order of the candidate data that is a candidate for the additional data to be added to the encoded data including the encoded image data in blocks in order to set the encoded data to the fixed length. In this case, the addition order setting section 182 acquires the table designation information supplied from the control section 151, acquires the table information designated in the acquired table designation information from the table storage section 181, and uses the acquired table information to set the addition order of the candidate data. The addition order setting section 182 supplies the information indicating the addition order to the lower bit generation section 134. In this way, the addition order setting section 182 can set the same addition order as in the case of the addition order setting section 162. That is, the addition order setting section 182 can set the addition order so as to suppress the generation of the pattern caused by the difference in level of the refinement data in the decoded image.

Basically, as in the case of the first embodiment, the lower bit generation section 134 aligns the additional data (refinement data) extracted by the extraction section 132 according to the addition order set by the addition order setting section 182 and generates part of the decoded image data in blocks.

In this way, the decoding section 153 can obtain the decoded image by applying, on a block-by-block basis, the simple decoding to the encoded data at the fixed length obtained by the encoding section 152 applying the simple encoding to the input image. In this case, the decoding section 153 can decode the data as described above to perform the simple decoding so as to suppress the generation of the pattern caused by the difference in level of the refinement data in the decoded image. Therefore, the decoding section 153 can suppress the reduction in the image quality.

Note that the method of each process executed by each processing section of the decoding section 153 may be any method as long as the method corresponds to the encoding section 152.

<Flow of Control Process>

Figure 14:
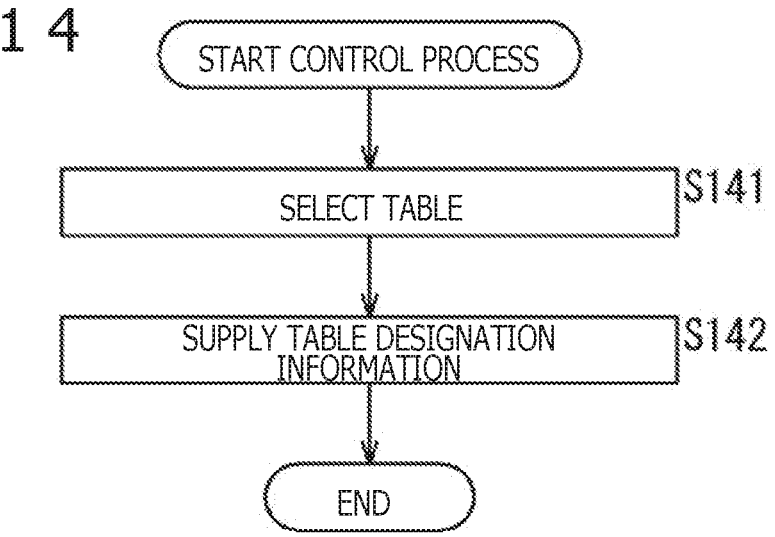
FIG. 14 is a flow chart describing an example of a flow of a control process.

Next, flows of processes executed by the respective processing sections of the image processing apparatus 150 configured as described above will be described. First, an example of a flow of a control process executed by the control section 151 will be described with reference to a flow chart of FIG. 14.

Once the control process is started, the control section 151 selects table information to be used and generates table designation information in step S141. The selection method of the table information (generation method of the table designation information) is arbitrary. The table designation information may be generated on the basis of some information, may be set by the user or the like, or may be randomly set. In addition, the generation method of the table designation information may be switchable.

Once the table designation information is generated, the control section 151 supplies the generated table designation information to the encoding section 152 and the decoding section 153 in step S142.

Once the table designation information is supplied, the control process ends. As a result of the execution of the control process by the control section 151, the encoding section 152 and the decoding section 153 can switch the addition order of the refinement data. The control section 151 can execute the control process at an arbitrary timing. For example, the control section 151 may execute the control process on a block-by-block basis. In this way, the encoding section 152 and the decoding section 153 can switch the addition order of the refinement data on a block-by-block basis.

<Flow of Encoding Process>

Figure 15:
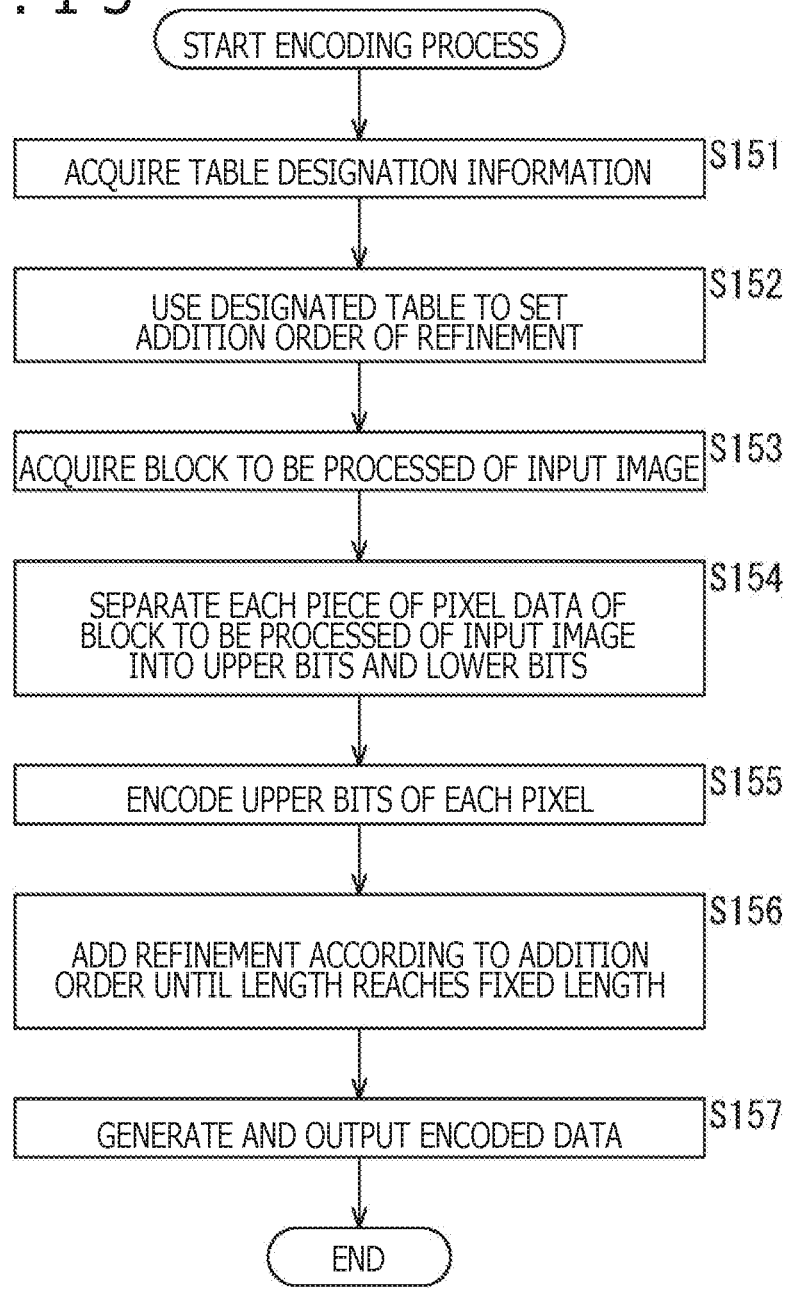
FIG. 15 is a flow chart describing an example of a flow of an encoding process.

Next, an example of a flow of an encoding process executed by the encoding section 152 will be described with reference to a flow chart of FIG. 15.

Once the encoding process is started, the addition order setting section 162 of the encoding section 152 acquires the table designation information supplied from the control section 151 in step S151.

In step S152, the addition order setting section 162 acquires the table information designated in the table designation information from the table storage section 161. The addition order setting section 162 uses the acquired table information to set the addition order of the refinement data.

Figure 8:
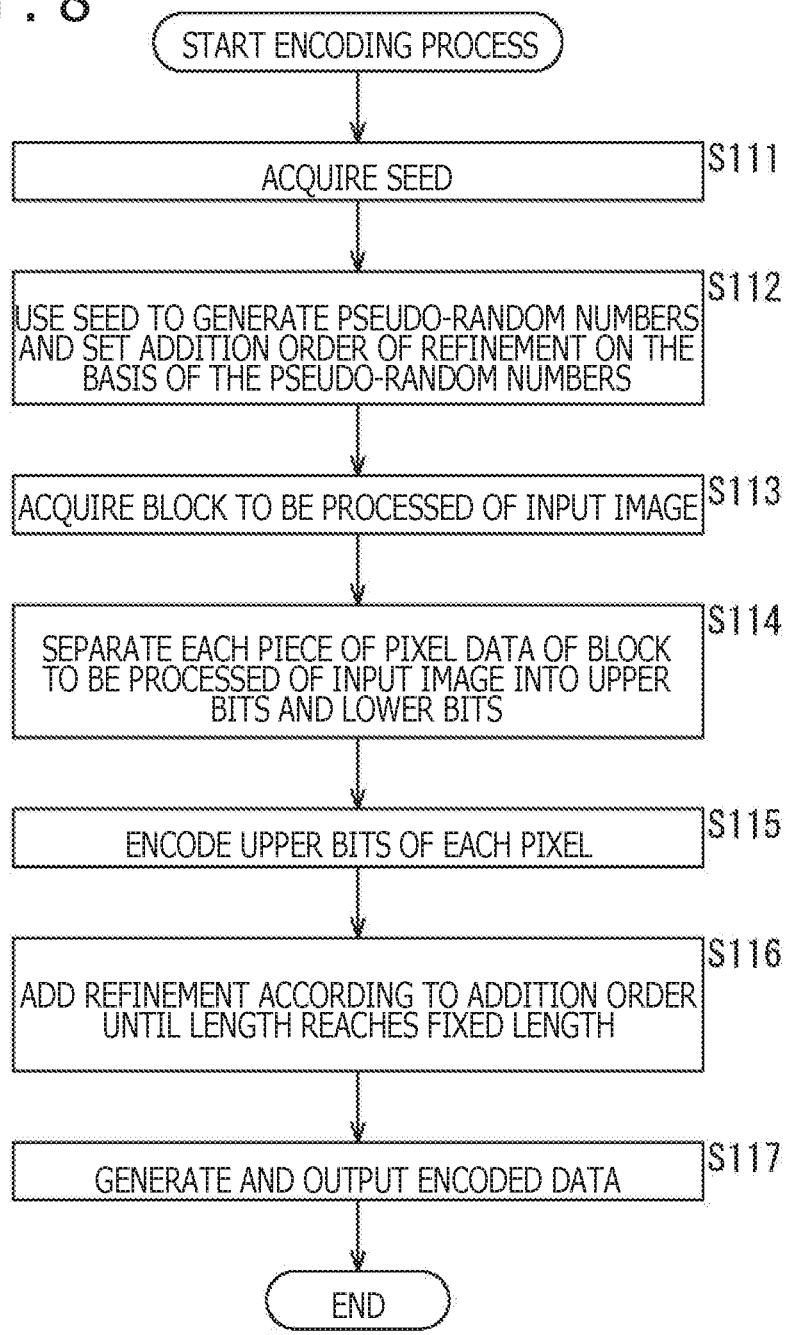
FIG. 8 is a flow chart describing an example of a flow of an encoding process.

The respective processes of steps S153 to S157 are executed similarly to the respective processes of steps S113 to S117 in FIG. 8.

When the process of step S157 is finished, the encoding process ends. The encoding section 152 can execute the encoding process at an arbitrary timing. For example, the encoding section 152 may execute the encoding process on a block-by-block basis.

<Flow of Decoding Process>

Figure 16:
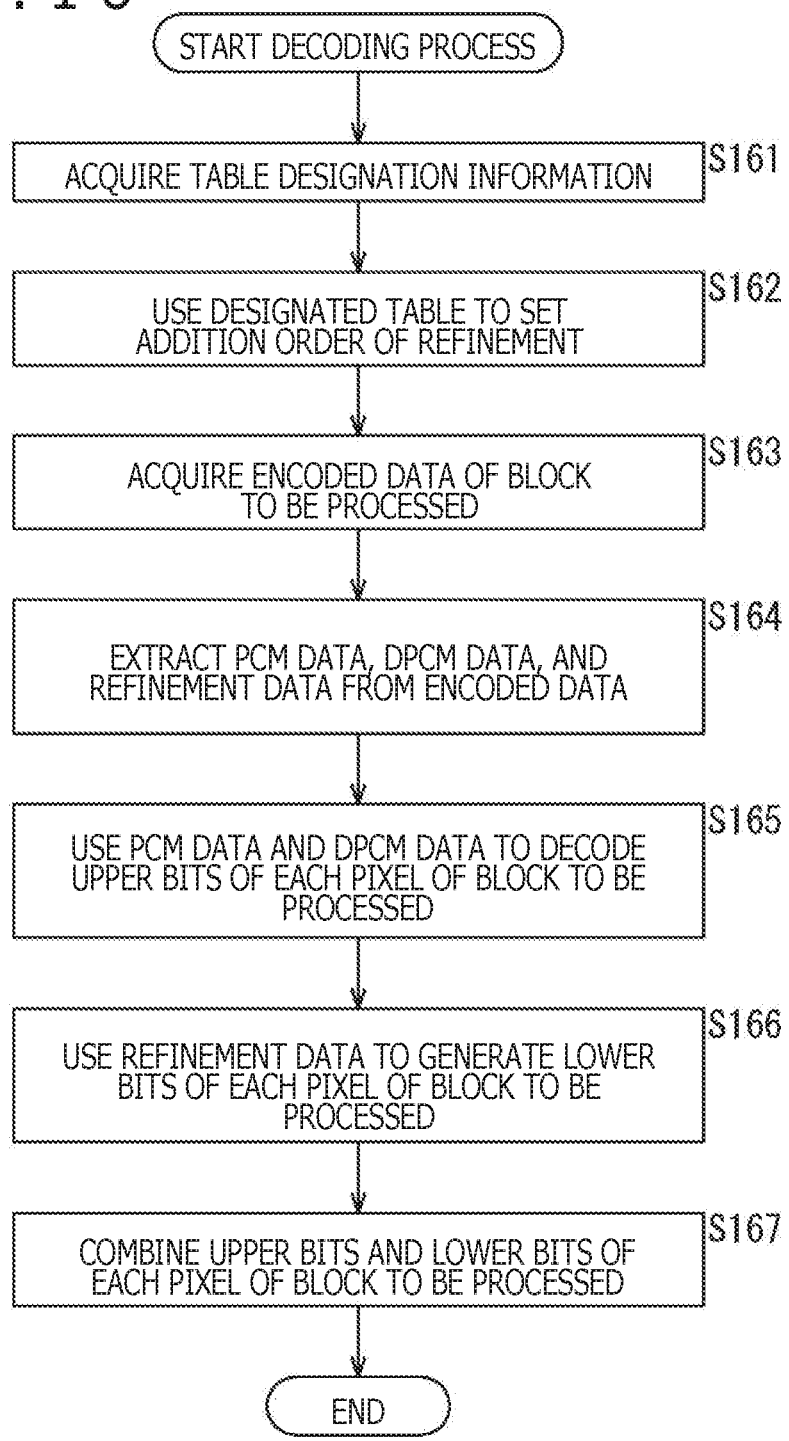
FIG. 16 is a flow chart describing an example of a flow of a decoding process.

Next, an example of a flow of a decoding process executed by the decoding section 153 will be described with reference to a flow chart of FIG. 16.

Once the decoding process is started, the addition order setting section 182 of the decoding section 153 acquires the seed supplied from the control section 151 in step S161.

In step S162, the addition order setting section 182 acquires the table information designated in the table designation information from the table storage section 181. The addition order setting section 182 uses the acquired table information to set the addition order of the refinement data.

Figure 9:
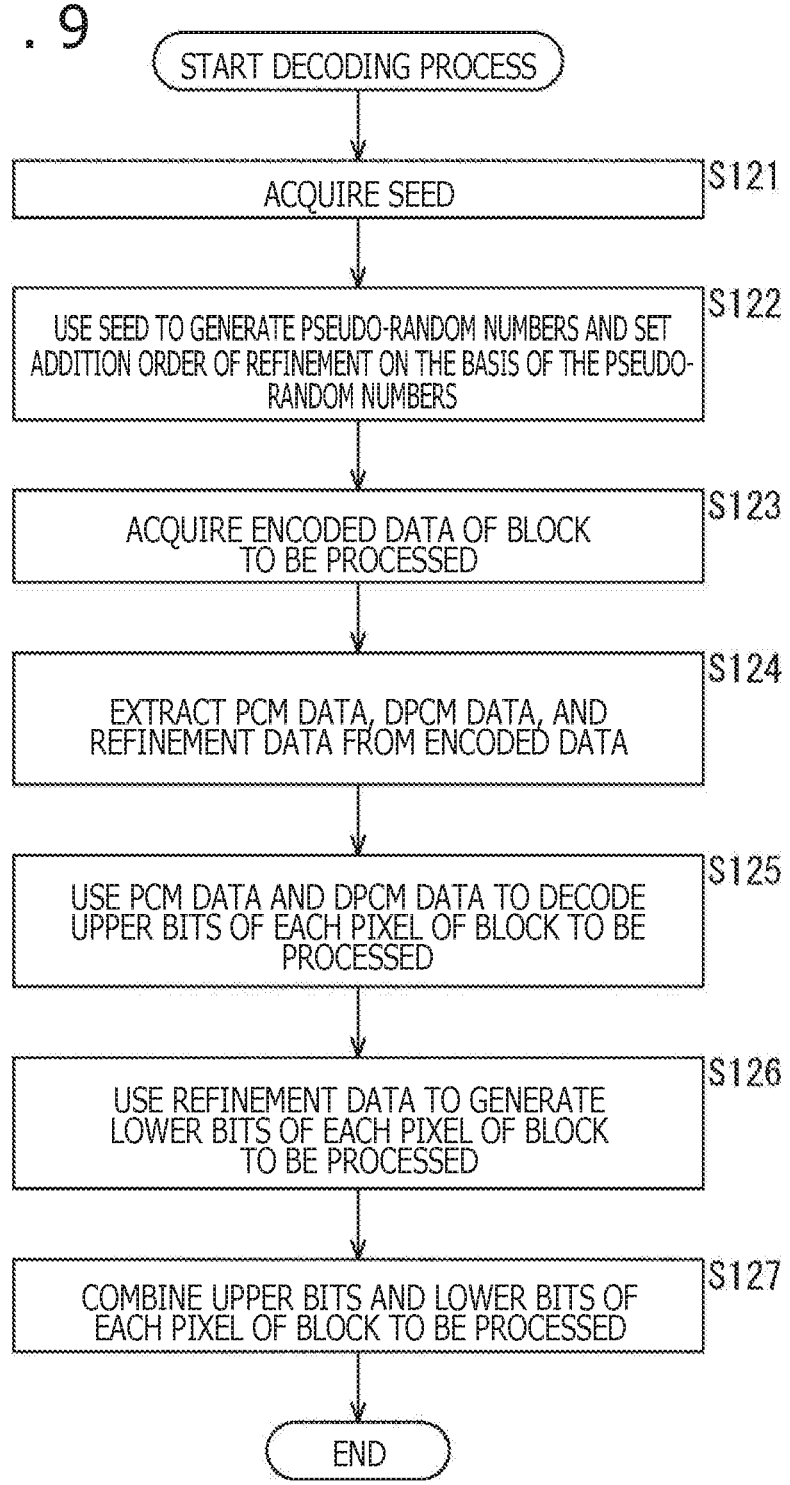
FIG. 9 is a flow chart describing an example of a flow of a decoding process.

The respective processes of steps S163 to S167 are executed similarly to the processes of steps S123 to S127 in FIG. 9.

When the process of step S167 is finished, the decoding process ends. The decoding section 153 can execute the decoding process at an arbitrary timing. For example, the decoding section 153 may execute the decoding process on a block-by-block basis.

The image processing apparatus 150 can execute each process as described above to suppress the reduction in the subjective image quality of the decoded image. In addition, each of sections including the encoding section 152 and the decoding section 153 sets the addition order of the refinement data in this case. Therefore, the information regarding the addition order of the refinement data does not have to be included in the encoded data (bit stream), and the reduction in the encoding efficiency can be suppressed.

<Modifications>

Note that the control section 151 may supply the table information to the encoding section 152 and the decoding section 153 instead of the table designation information. That is, the control section 151 generates the table information to be used by the encoding section 152 and the decoding section 153 and supplies the table information to the encoding section 152 and the decoding section 153. The other processes are as described above. Note that in this case, the table storage section 161 can be eliminated in the encoding section 152, and the table storage section 181 can be eliminated in the decoding section 153.

In addition, the control section 151 may supply the table designation information (or table information) of a plurality of blocks to the encoding section 152 and the decoding section 153 all at once. In this way, the number of times that the information is provided from the control section 151 to the encoding section 152 and the decoding section 153 can be reduced. Furthermore, the information can be provided without being synchronized with the block-based process, and the control process can be more easily executed.

4. Third Embodiment

<Transmission of Information Regarding Addition Order>

Although the control section controls the addition order in the description above, the control section may be eliminated, and the encoding section may control the addition order. That is, for example, the encoding section may set the addition order and supply the information regarding the addition order to the decoding section. The decoding section may set the addition order as in the encoding section on the basis of the information regarding the addition order.

As a result, the control section and the transmission of information from the control section to the encoding section or the decoding section can be eliminated. This increases the versatility of the image processing apparatus, and the present technique can be applied to more diverse systems and apparatuses.

<Image Processing Apparatus>

Figure 17:
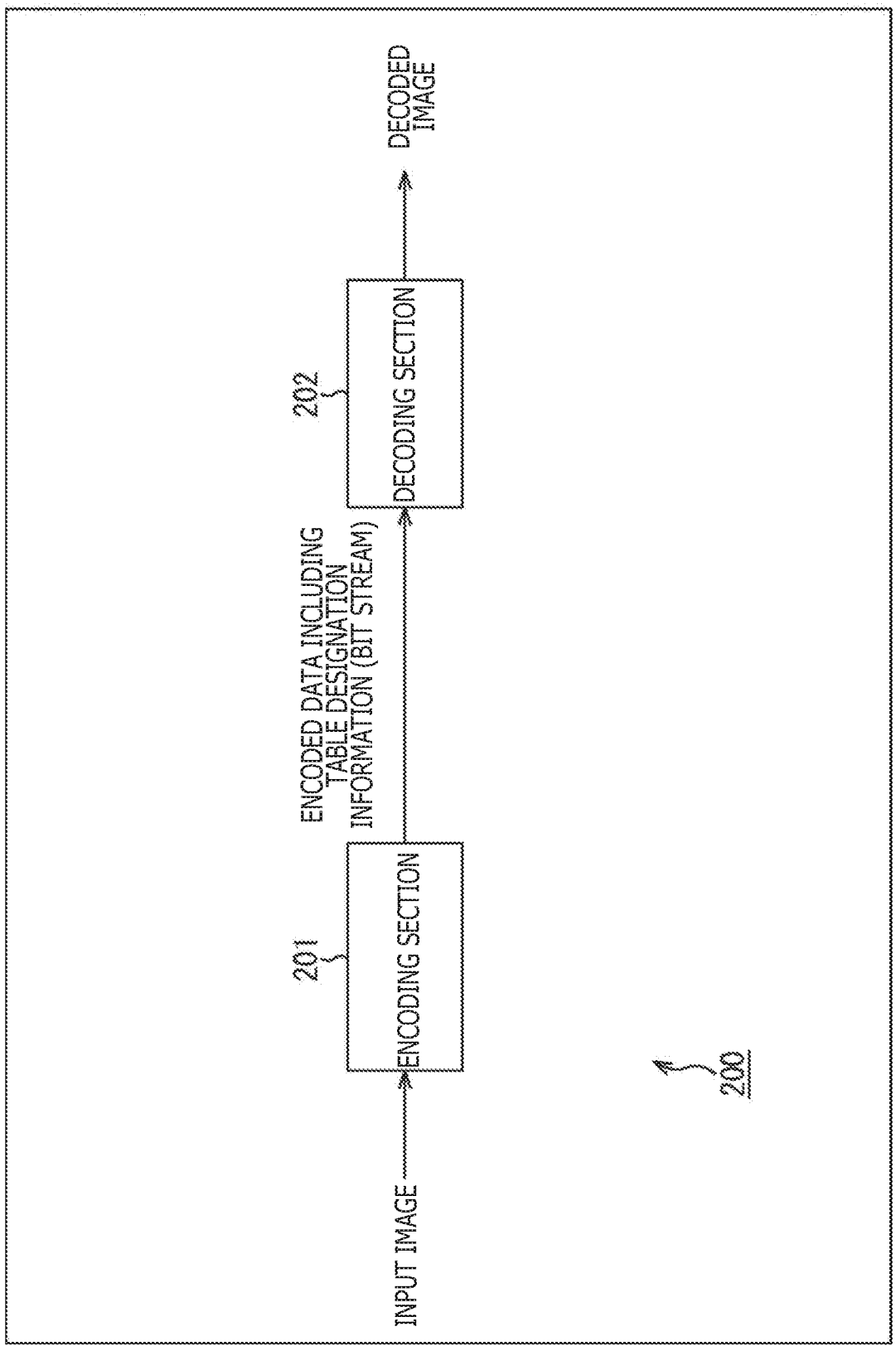
FIG. 17 is a block diagram illustrating a main configuration example of an image processing apparatus.

FIG. 17 is a block diagram illustrating an example of a configuration according to an aspect of the image processing apparatus in this case. Just like the image processing apparatus 100 of FIG. 3, an image processing apparatus 200 illustrated in FIG. 17 is an apparatus that applies the simple encoding (simple compression) according to the present technique to the input image (image data) to generate encoded data and that applies the simple decoding (simple expansion) to the encoded data to generate a decoded image (decoded image data). Although the present technique is actually realized in combination with other components, such as, for example, a DRAM, as described later, only the configuration regarding the encoding and the decoding is illustrated in the image processing apparatus 200 of FIG. 17 to describe the encoding and the decoding.

As illustrated in FIG. 17, the image processing apparatus 200 includes an encoding section 201 and a decoding section 202.

The encoding section 201 is a processing section basically similar to the encoding section 102 and is configured to apply the simple encoding (simple compression) to the input image (image data) input to the image processing apparatus 200 and generate, for example, a bit stream or the like of the encoded data. However, the encoding section 201 uses the table information to set the addition order of the candidate data. In this case, the encoding section 201 selects the table information to be used. The encoding section 201 then encodes the input image to generate encoded data and adds, to the encoded data, information regarding the addition order that is table designation information indicating the used table information. The encoding section 201 supplies the generated encoded data (bit stream) to the decoding section 202.

The decoding section 202 is a processing section basically similar to the decoding section 103 and is configured to generate a decoded image (decoded image data) by applying, to the encoded data, the simple decoding (simple expansion) that is a decoding system corresponding to the simple encoding (simple compression) of the encoding section 201. However, the decoding section 202 uses the table information to set the addition order of the candidate data, just like the encoding section 201. In this case, the decoding section 202 extracts the information regarding the addition order (that is, the table designation information) from the encoded data supplied from the encoding section 201 and selects the table information to be used on the basis of the extracted table designation information. The decoding section 202 outputs the generated decoded image (decoded image data) to the outside of the image processing apparatus 200.

The encoding section 201 and the decoding section 202 include the same table information (a plurality of pieces of table information). Therefore, the decoding section 202 can select the same table information as the encoding section 201 on the basis of the table designation information supplied from the encoding section 201. That is, the encoding section 201 and the decoding section 202 can set the same addition order.

The encoding section 201 and the decoding section 202 execute the process on a block-by-block basis. That is, the table information is selected on a block-by-block basis, and the addition order of the refinement data is set on the basis of the selected table information. Therefore, the image processing apparatus 200 can change the addition order of the refinement data on a block-by-block basis. As a result, a reduction in the image quality, such as a pattern not included in the input image appearing in the decoded image, can be suppressed.

<Encoding Section>

Figure 18:
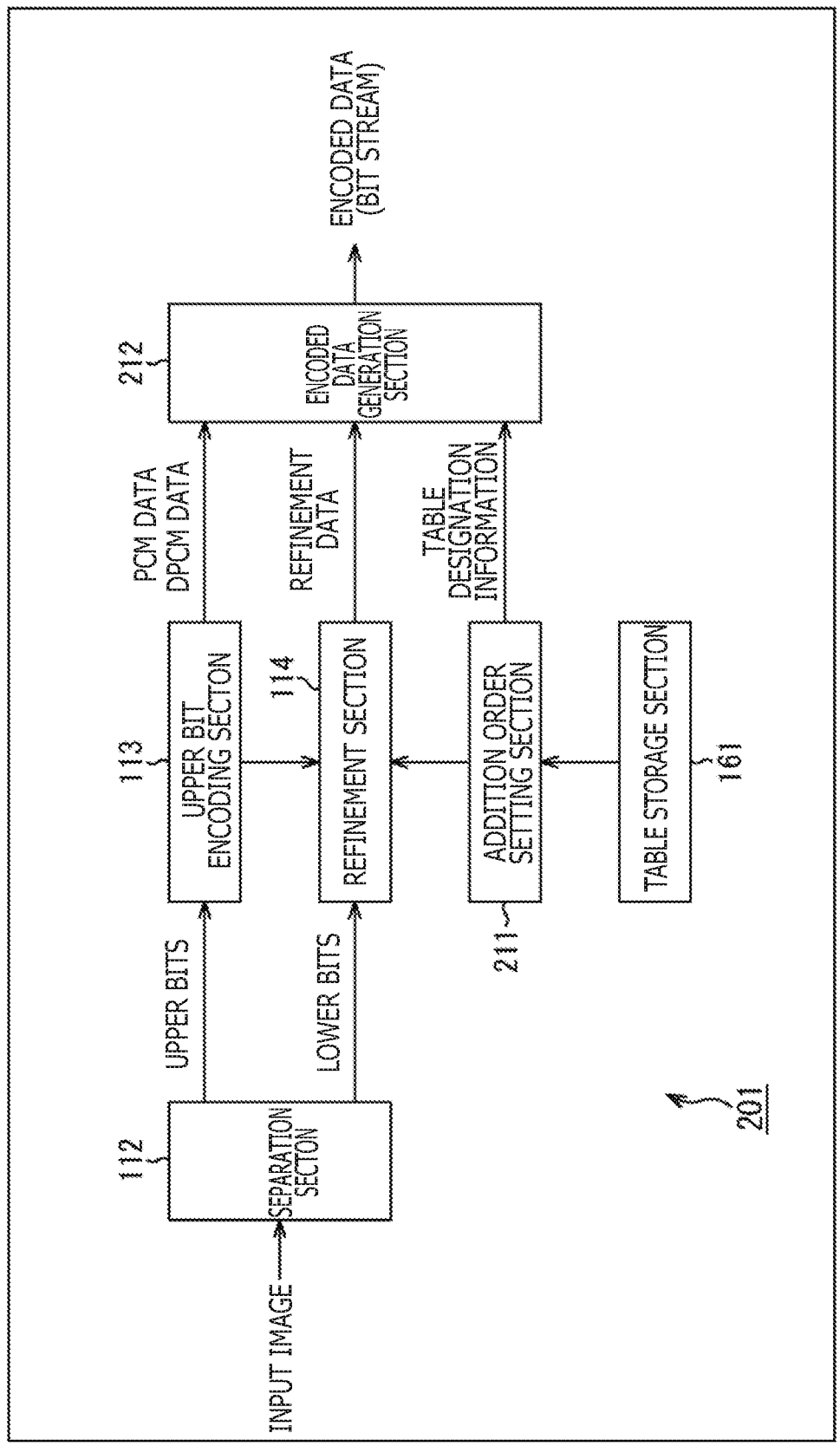
FIG. 18 is a block diagram illustrating a main configuration example of an encoding section.

FIG. 18 is a block diagram illustrating a main configuration example of the encoding section 201. As illustrated in FIG. 18, the encoding section 201 includes the table storage section 161, an addition order setting section 211, the separation section 112, the upper bit encoding section 113, the refinement section 114, and an encoded data generation section 212.

The addition order setting section 211 is a processing section basically similar to the addition order setting section 111 and is configured to execute a process regarding setting of the addition order. For example, the addition order setting section 211 sets, on a block-by-block basis, an addition order of candidate data that is a candidate for the additional data to be added to the encoded data including the encoded image data in blocks in order to set the encoded data to the fixed length.

In this case, the addition order setting section 211 selects, from the table information stored in the table storage section 161, table information to be used for setting the addition order of the candidate data. The selection method is arbitrary as long as the method suppresses the generation of the pattern caused by the difference in level of the refinement data in the decoded image. For example, the addition order setting section 211 may randomly select the table information.

After selecting the table information, the addition order setting section 211 requests the table storage section 161 for the table information and acquires the table information. The addition order setting section 211 then uses the acquired table information to set the addition order of the candidate data.

In this way, the addition order setting section 211 can set the addition order so as to suppress the generation of the pattern caused by the difference in level of the refinement data in the decoded image.

The addition order setting section 211 supplies the information indicating the addition order to the refinement section 114. The addition order setting section 211 also generates table designation information indicating the selected table information and supplies the table designation information to the encoded data generation section 212.

Basically, as in the case of the first embodiment, the refinement section 114 selects the bits as refinement data (additional data) to be added to the encoded data generated by the upper bit encoding section 113 from the lower bit (candidate data) group of each piece of pixel data on the basis of the addition order set by the addition order setting section 211 and supplies the selected bits as refinement data to the encoded data generation section 212.

The encoded data generation section 212 is a processing section basically similar to the encoded data generation section 115 and is configured to execute a process regarding generation of encoded data including the input image subjected to the simple encoding (simple compression). For example, the encoded data generation section 212 generates encoded data at the fixed length including the encoded data and the additional data added in the addition order set by the addition order setting section 111.

For example, the encoded data generation section 212 acquires the PCM data and the DPCM data supplied from the upper bit encoding section 113 and the refinement data supplied from the refinement section 114. The encoded data generation section 212 further acquires the table designation information supplied from the addition order setting section 211. The encoded data generation section 212 generates encoded data of the block to be processed including the information. The encoded data generation section 212 supplies, for example, a bit stream or the like of the encoded data to the decoding section 202.

In this way, the encoding section 201 can apply the simple encoding to the input image to generate the encoded data at the fixed length on a block-by-block basis. In this case, the encoding section 201 can perform the simple encoding so as to suppress the generation of the pattern caused by the difference in level of the refinement data in the decoded image. Therefore, the encoding section 201 can suppress the reduction in the image quality.

<Encoded Data>

Figure 19:
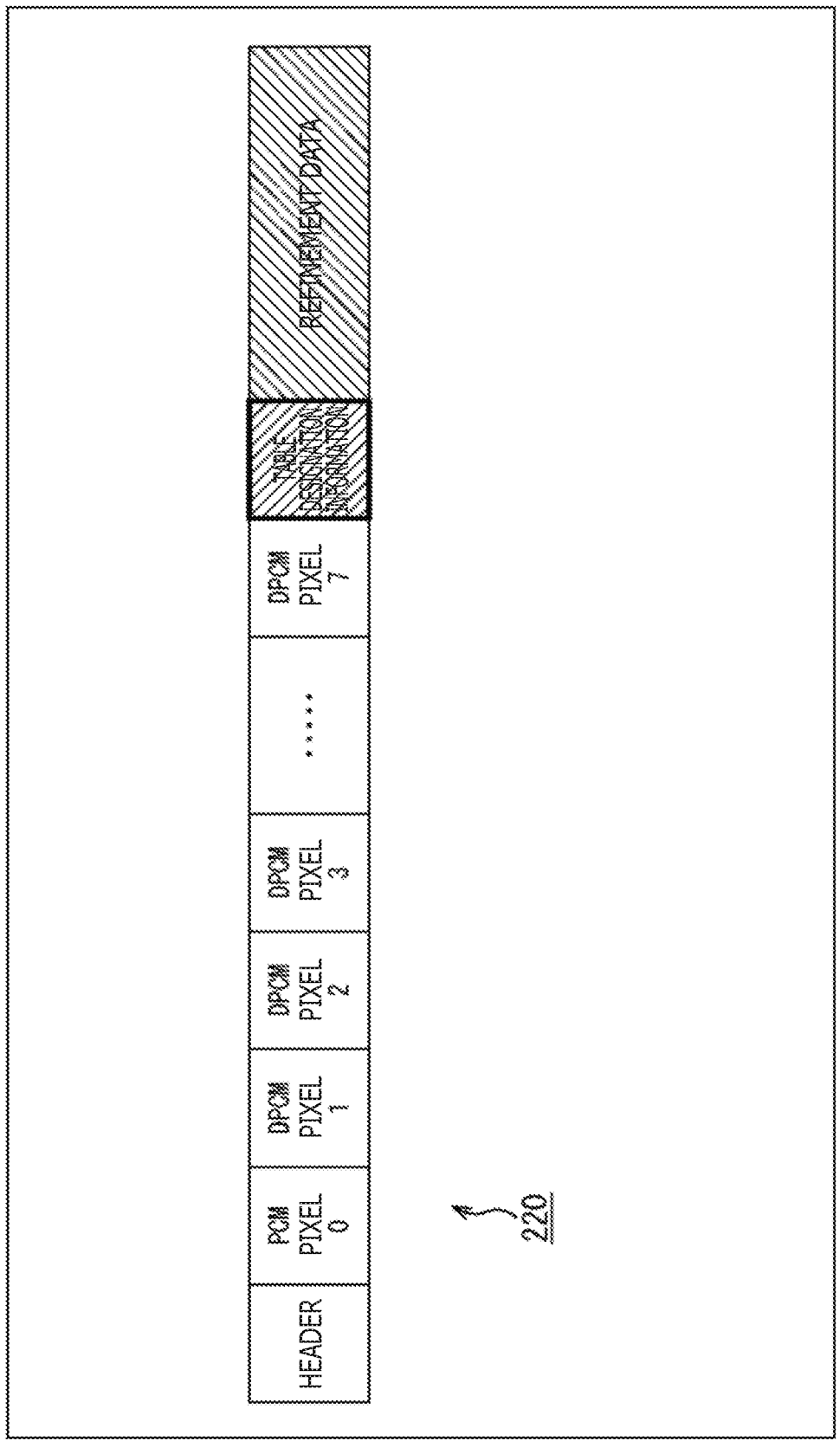
FIG. 19 is a schematic diagram describing a main configuration example of encoded data.

FIG. 19 is a schematic diagram illustrating a main configuration example of the encoded data generated by the encoding section 201. As illustrated in FIG. 19, encoded data 220 in this case includes the table designation information (part surrounded by thick lines) in addition to the configuration of the encoded data 120 (FIG. 5). By adding the table designation information in this way, the decoding section 202 can reproduce the addition order set by the encoding section 201. That is, the decoding section 202 can adopt the same addition order as the encoding section 201 and can properly decode the encoded data.

<Decoding Section>

Figure 20:
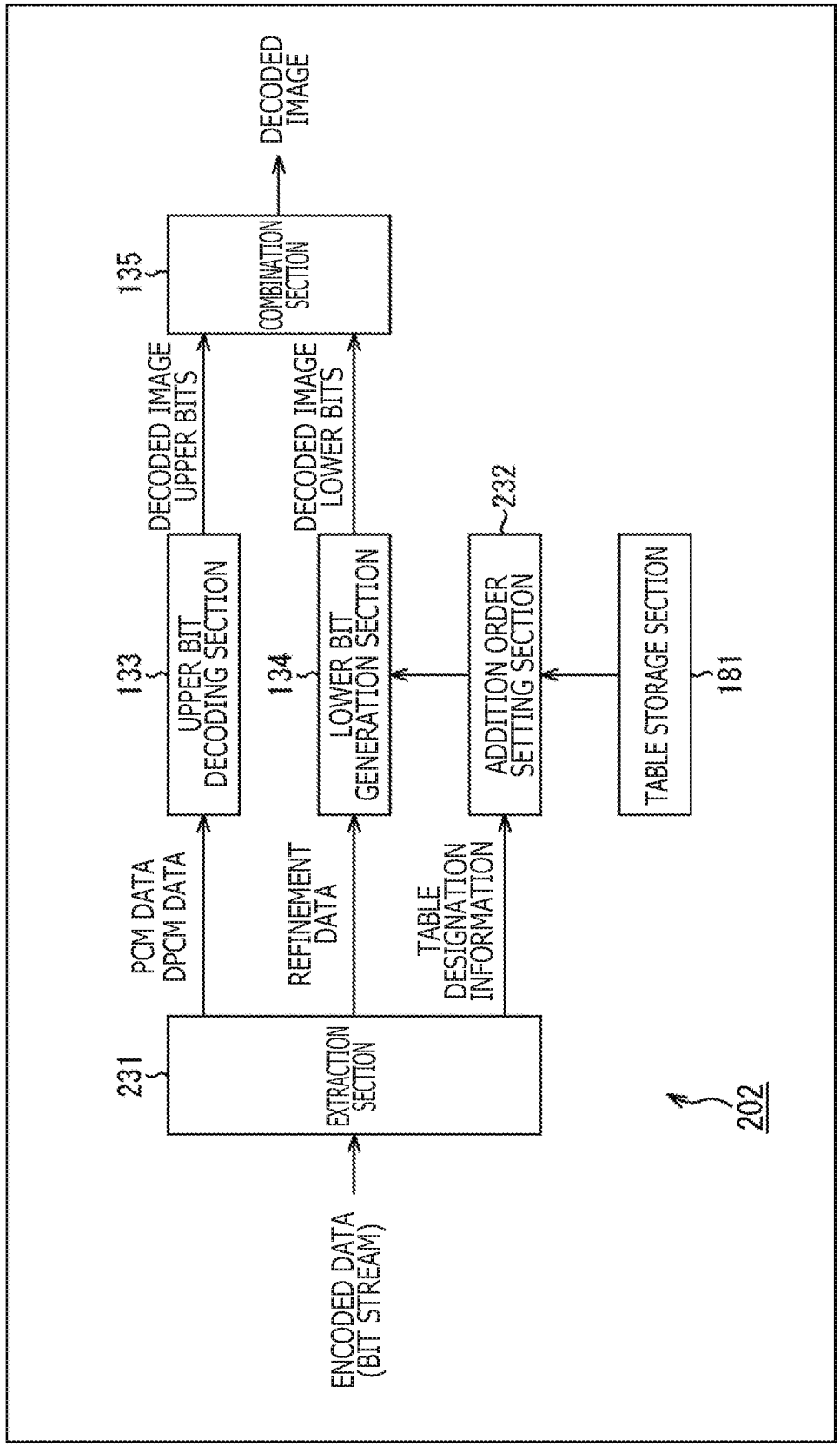
FIG. 20 is a block diagram illustrating a main configuration example of a decoding section.

FIG. 20 is a block diagram illustrating a main configuration example of the decoding section 202. As illustrated in FIG. 20, the decoding section 202 includes an extraction section 231, the table storage section 181, an addition order setting section 232, the upper bit decoding section 133, the lower bit generation section 134, and the combination section 135.

The extraction section 231 executes a process regarding extraction of data from the encoded data (bit stream) at the fixed length supplied to the decoding section 202. For example, the extraction section 231 extracts, from the encoded data at the fixed length, the additional data (refinement data) generated by the refinement section 114 and the encoded data (PCM data and DPCM data) of the upper bits generated by the upper bit encoding section 113. The extraction section 231 further extracts, from the encoded data at the fixed length, the table designation information as information regarding the addition order.

The extraction section 231 supplies the extracted PCM data and DPCM data to the upper bit decoding section 133. In addition, the extraction section 231 supplies the extracted refinement data to the lower bit generation section 134. Furthermore, the extraction section 231 supplies the extracted table designation information to the addition order setting section 232.

The addition order setting section 232 is a processing section basically similar to the addition order setting section 211. That is, the addition order setting section 232 executes a process regarding setting of the addition order. However, the addition order setting section 232 sets the addition order of the candidate data on the basis of the table information designated in the table designation information supplied from the extraction section 231. The addition order setting section 232 supplies the information indicating the addition order to the lower bit generation section 134. In this way, the addition order setting section 232 can set the same addition order as in the case of the addition order setting section 211. That is, the addition order setting section 232 can set the addition order so as to suppress the generation of the pattern caused by the difference in level of the refinement data in the decoded image.

Basically, as in the case of the first embodiment, the lower bit generation section 134 aligns the additional data (refinement data) extracted by the extraction section 231 according to the addition order set by the addition order setting section 232 and generates part of the decoded image data in blocks.

In this way, the decoding section 202 can obtain the decoded image by applying, on a block-by-block basis, the simple decoding to the encoded data at the fixed length obtained by the encoding section 201 applying the simple encoding to the input image. In this case, the decoding section 202 can decode the data as described above to perform the simple decoding so as to suppress the generation of the pattern caused by the difference in level of the refinement data in the decoded image. Therefore, the decoding section 202 can suppress the reduction in the image quality.

Note that the method of each process executed by each processing section of the decoding section 202 may be any method as long as the method corresponds to the encoding section 201.

<Flow of Encoding Process>

Figure 21:
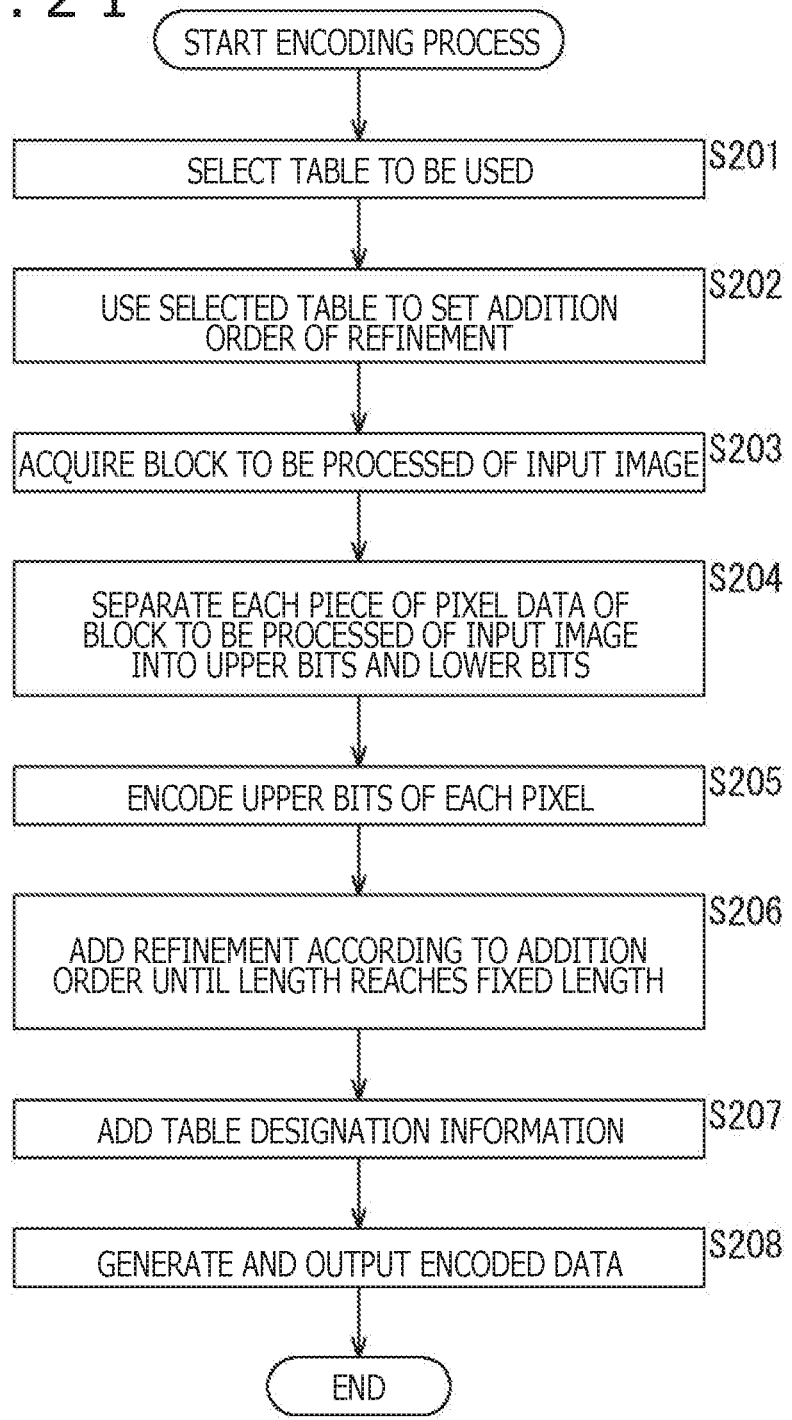
FIG. 21 is a flow chart describing an example of a flow of an encoding process.

Next, flows of processes executed by the respective processing sections of the image processing apparatus 200 configured as described above will be described. First, an example of a flow of an encoding process executed by the encoding section 201 will be described with reference to the flow chart of FIG. 21.

Once the encoding process is started, the addition order setting section 211 of the encoding section 201 selects table information to be used in step S201. The selection method of the table information (generation method of the table designation information) is arbitrary. The table designation information may be generated on the basis of some information, may be set by the user or the like, or may be randomly set. In addition, the generation method of the table designation information may also be switchable.

In step S202, the addition order setting section 211 acquires the selected table information from the table storage section 161. The addition order setting section 211 uses the acquired table information to set the addition order of the refinement data.

The respective processes of steps S203 to S206 are executed similarly to the respective processes of steps S113 to S116 in FIG. 8.

In step S207, the addition order setting section 211 generates table designation information for designating the table information selected in step S201.

In step S208, the encoded data generation section 212 uses the encoded data of the upper bits generated in step S205, the refinement data set in step S206, and the table designation information generated in step S207 to generate encoded data at the fixed length of the block to be processed. The encoded data generation section 212 outputs a bit stream or the like of the generated encoded data to the outside of the encoding section 201.

When the process of step S208 is finished, the encoding process ends. The encoding section 201 can execute the encoding process at an arbitrary timing. For example, the encoding section 201 may execute the encoding process on a block-by-block basis.

<Flow of Decoding Process>

Figure 22:
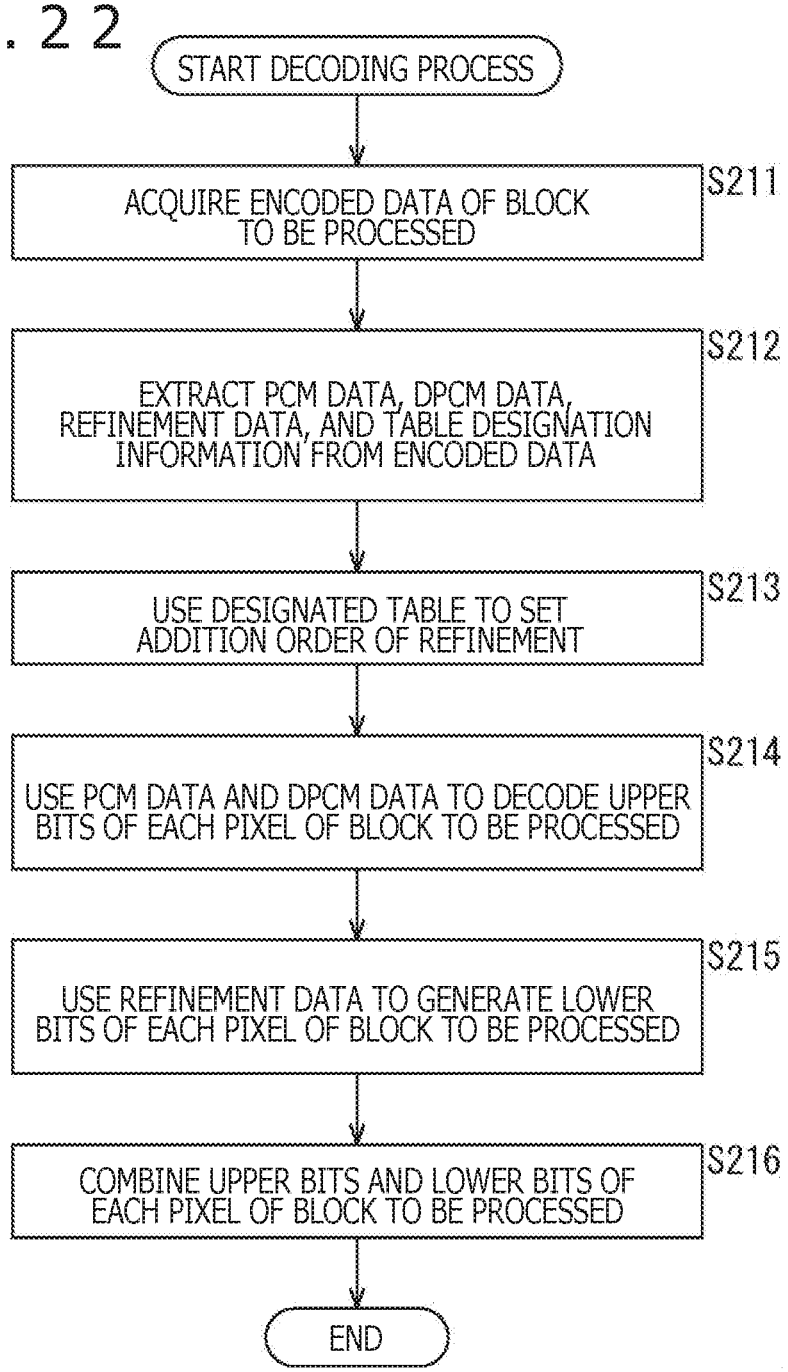
FIG. 22 is a flow chart describing an example of a flow of a decoding process.

Next, an example of a flow of a decoding process executed by the decoding section 202 will be described with reference to a flow chart of FIG. 22.

Once the decoding process is started, the extraction section 231 of the decoding section 202 acquires the encoded data of the block to be processed in step S211. In step S212, the extraction section 231 extracts the PCM data, the DPCM data, the refinement data, and the table designation information from the encoded data.

In step S213, the addition order setting section 232 acquires the table information designated in the table designation information from the table storage section 181. The addition order setting section 232 uses the acquired table information to set the addition order of the refinement data.

The respective processes of steps S214 to S216 are executed similarly to the respective processes of steps S125 to S127 in FIG. 9.

The image processing apparatus 200 can execute the respective processes as described above to suppress the reduction in the subjective image quality of the decoded image. In addition, the control section and the transmission of information from the control section to the encoding section or the decoding section are not necessary in this case, and the required configuration is more simplified. This increases the versatility of the image processing apparatus, and the present technique can be applied to more diverse systems and apparatuses.

Note that in this case, the table designation information as information regarding the addition order is included in the encoded data and transmitted. Therefore, the smaller the number of pieces of table information (that is, the number of pieces of table information as candidates) stored in the table storage section 161 (table storage section 181), the more the increase in the amount of information (the number of bits) of the table designation information can be suppressed. This can suppress the reduction in the encoding efficiency of the encoded data.

<Modifications>

Note that the table designation information may be transmitted from the encoding section 201 to the decoding section 202 as data different from the encoded data. In that case, the table designation information and the encoded data can be associated to allow the decoding section 202 to specify the table designation information corresponding to the encoded data.

In addition, instead of the table designation information, the table information used to set the addition order may be transmitted as the information regarding the addition order from the encoding section 201 to the decoding section 202. In addition, instead of the table designation information, the seed described in the first embodiment may be transmitted as the information regarding the addition order from the encoding section 201 to the decoding section 202. In that case, the encoding section 201 and the decoding section 202 can generate the pseudo-random numbers on the basis of the seed and use the pseudo-random numbers to set the addition order as in the case of the first embodiment. Furthermore, instead of the seed, the pseudo-random numbers may be transmitted as the information regarding the addition order from the encoding section 201 to the decoding section 202. In addition, instead of the pseudo-random numbers, the information indicating the position (information indicating the bit) of each piece of refinement data may be transmitted as the information regarding the addition order from the encoding section 201 to the decoding section 202.

Obviously, the encoding section 201 may transmit the information to the decoding section 202 as data different from the encoded data in these cases. That is, the encoding section 201 may transmit the information regarding the addition order to the decoding section 202 as data different from the encoded data.

Note that the information regarding the addition order may include any information. For example, the information regarding the addition order may include information other than the table designation information, the table information, the seed, the pseudo-random numbers, and the like described above. In addition, for example, the information regarding the addition order may include a plurality of pieces of the information. Furthermore, the information regarding the addition order of a plurality of blocks may be transmitted all at once from the encoding section 152 to the decoding section 153.

5. Fourth Embodiment

<Selection Order of Table>

The table information used to set the addition order of the refinement data may be selected in a predetermined order defined in advance. For example, as illustrated in FIG. 23, blocks for encoding may be set for an input image 241, and one piece of prepared table information may be sequentially allocated to each block.

Figure 23:
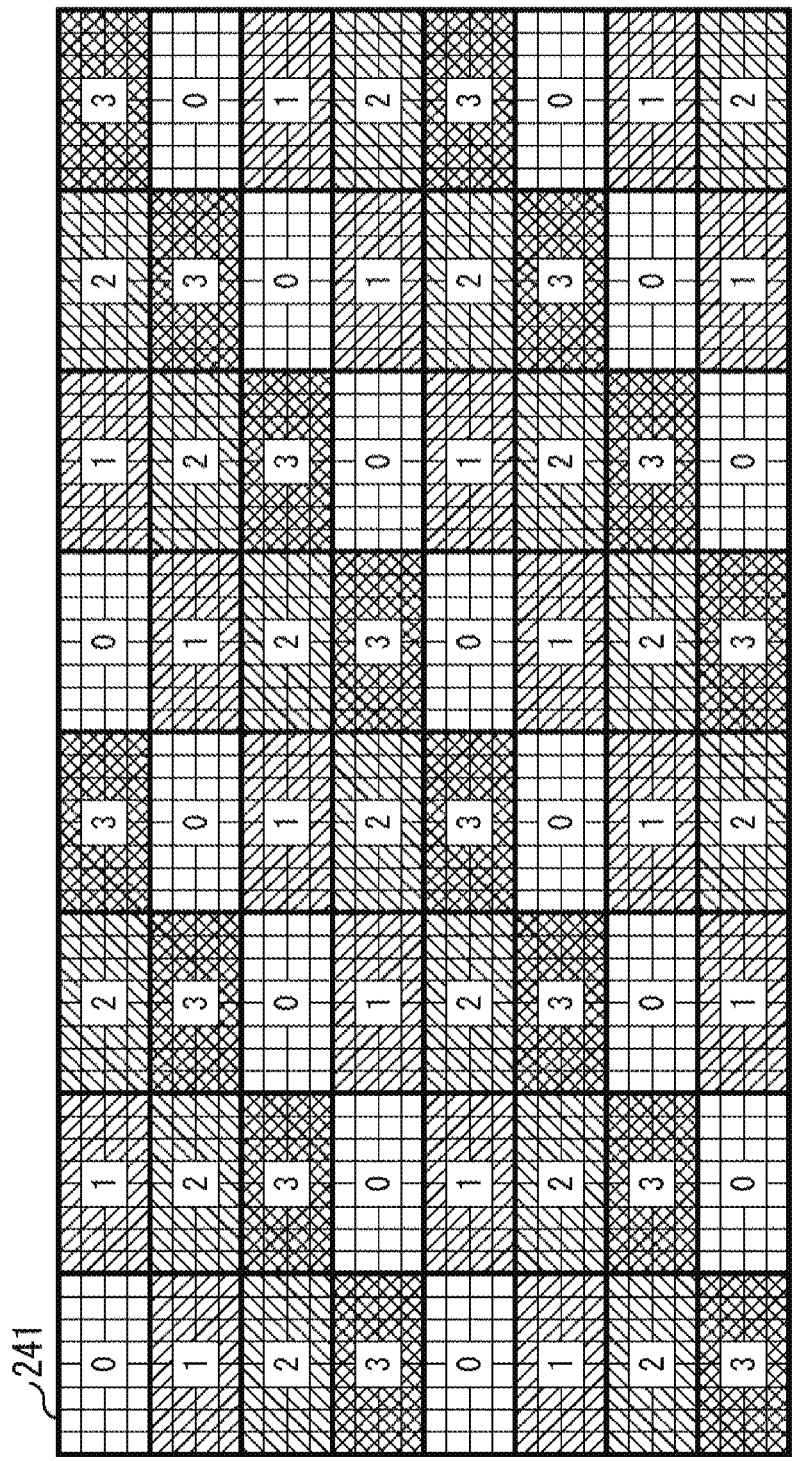
FIG. 23 is a diagram describing an example of a table selection order.

In the case of the example of FIG. 23, the input image 241 is divided into a total of 64 blocks including 8 blocks in the horizontal direction and 8 blocks in the vertical direction. Each block includes a total of 32 pixels including 8 pixels in the horizontal direction and 4 pixels in the vertical direction. In addition, it is assumed that four types of table information (table numbers "0" to "3") are prepared.

Each block is counted from "0" in the order of raster scan, the number of blocks is divided by the number of pieces of table information, and the table information is selected such that the remainder of the division is the table number. In this way, as in the example of FIG. 23, the table information with table number "0," the table information with table number "1," the table information with table number "2," and the table information with table number "3" are sequentially allocated to the respective blocks.

By selecting the table information in this way, the addition of the same refinement data to consecutive blocks can be suppressed, and a reduction in the image quality, such as a pattern not included in the input image appearing in the decoded image, can be suppressed.

Note that the selection order of the table information is arbitrary as long as the order can suppress the addition of the same refinement data to consecutive blocks, and the selection order is not limited to the example of FIG. 23.

<Image Processing Apparatus>

FIG. 24 is a block diagram illustrating an example of a configuration according to an aspect of the image processing apparatus in this case. Just like the image processing apparatus 100 of FIG. 3, an image processing apparatus 250 illustrated in FIG. 24 is an apparatus that applies the simple encoding (simple compression) according to the present technique to the input image (image data) to generate encoded data and that applies the simple decoding (simple expansion) to the encoded data to generate a decoded image (decoded image data). Although the present technique is actually realized in combination with other components, such as a DRAM, as described later, only the configuration regarding the encoding and the decoding is illustrated in the image processing apparatus 250 of FIG. 24 to describe the encoding and the decoding.

As illustrated in FIG. 24, the image processing apparatus 250 includes an encoding section 251 and a decoding section 252.

The encoding section 251 is a processing section basically similar to the encoding section 201 and is configured to apply the simple encoding (simple compression) to the input image (image data) input to the image processing apparatus 250 to generate, for example, a bit stream or the like of the encoded data and supply the bit stream or the like to the decoding section 202.

The decoding section 252 is a processing section basically similar to the decoding section 202 and is configured to apply the simple decoding (simple expansion) as a decoding system corresponding to the simple encoding (simple compression) of the encoding section 251 to the encoded data to generate a decoded image (decoded image data) and output the generated decoded image (decoded image data) to the outside of the image processing apparatus 250.

The encoding section 251 and the decoding section 252 select the table information and use the table information to set the addition order of the candidate data as in the case of the encoding section 201 and the decoding section 202. However, the encoding section 251 and the decoding section 252 select the table information in the predetermined order defined in advance. In this case, the table designation information is not transmitted from the encoding section 251 to the decoding section 252.

The encoding section 251 and the decoding section 252 include the same table information (a plurality of pieces of table information) and can select the table information in the same order to select the same table information. That is, the encoding section 201 and the decoding section 202 can set the same addition order.

The encoding section 251 and the decoding section 252 execute the process on a block-by-block basis. That is, the table information is selected on a block-by-block basis, and the addition order of the refinement data is set on the basis of the selected table information. Therefore, the image processing apparatus 250 can change the addition order of the refinement data on a block-by-block basis. As a result, a reduction in the image quality, such as a pattern not included in the input image appearing in the decoded image, can be suppressed.

<Encoding Section>

FIG. 25 is a block diagram illustrating a main configuration example of the encoding section 251. As illustrated in FIG. 25, the encoding section 251 includes the table storage section 161, an addition order setting section 261, the separation section 112, the upper bit encoding section 113, the refinement section 114, and the encoded data generation section 212.

The addition order setting section 261 is a processing section basically similar to the addition order setting section 211 and is configured to execute a process regarding setting of the addition order. For example, the addition order setting section 261 sets, on a block-by-block basis, the addition order of the candidate data that is a candidate for the additional data to be added to the encoded data including the encoded image data in blocks in order to set the encoded data to the fixed length.

In this case, the addition order setting section 261 selects the table information to be used for setting the addition order of the candidate data in a predetermined order defined in advance. That is, the addition order setting section 261 selects each piece of the table information stored in the table storage section 161 according to the predetermined order. The addition order setting section 261 requests the table storage section 161 for the table information and acquires the table information. The addition order setting section 261 then uses the acquired table information to set the addition order of the candidate data.

In this way, the addition order setting section 261 can suppress the addition of the same refinement data to consecutive blocks and can set the addition order so as to suppress the generation of the pattern caused by the difference in level of the refinement data in the decoded image.

The addition order setting section 261 supplies the information indicating the addition order to the refinement section 114. Unlike in the case of the addition order setting section 211, the addition order setting section 261 does not cause the decoding section 252 to transmit the table designation information.

Basically, as in the case of the first embodiment, the refinement section 114 selects the bits as refinement data (additional data) to be added to the encoded data generated by the upper bit encoding section 113 from the lower bit (candidate data) group of each piece of pixel data on the basis of the addition order set by the addition order setting section 261 and supplies the selected bits as refinement data to the encoded data generation section 115.

In this way, the encoding section 251 can apply the simple encoding to the input image to generate the encoded data at the fixed length on a block-by-block basis. In this case, the encoding section 251 can perform the simple encoding so as to suppress the generation of the pattern caused by the difference in level of the refinement data in the decoded image. Therefore, the encoding section 251 can suppress the reduction in the image quality.

<Encoded Data>

Note that the encoded data generated by the encoding section 251 is similar to the encoded data in the case of the first embodiment (FIG. 5). That is, in this case, the information regarding the addition order of the refinement data does not have to be included in the encoded data (bit stream), and the reduction in the encoding efficiency can be suppressed.

<Decoding Section>

Figure 26:
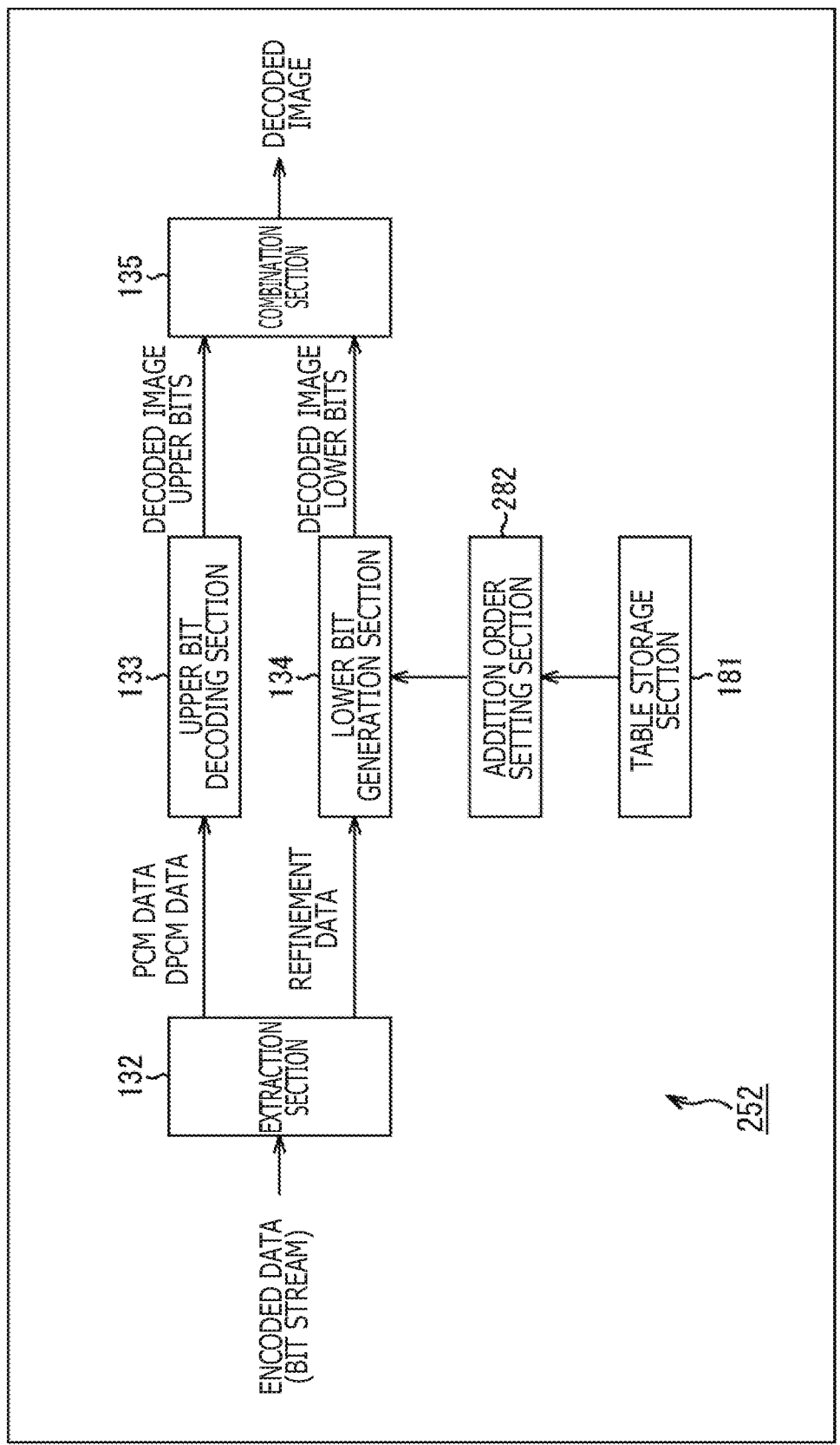
FIG. 26 is a block diagram illustrating a main configuration example of a decoding section.

FIG. 26 is a block diagram illustrating a main configuration example of the decoding section 252. As illustrated in FIG. 26, the decoding section 252 includes the extraction section 132, the table storage section 181, an addition order setting section 281, the upper bit decoding section 133, the lower bit generation section 134, and the combination section 135.

The addition order setting section 281 is a processing section basically similar to the addition order setting section 261. That is, the addition order setting section 232 executes a process regarding setting of the addition order. For example, the addition order setting section 281 sets, on a block-by-block basis, the addition order of the candidate data that is a candidate for the additional data to be added to the encoded data including the encoded image data in blocks in order to set the encoded data to the fixed length.

In this case, the addition order setting section 281 selects the table information to be used for setting the addition order of the candidate data in the predetermined order defined in advance. That is, the addition order setting section 261 selects each piece of the table information stored in the table storage section 181 according to the order. The order is the same as the selection order of the table information selected by the encoding section 251 (addition order setting section 261). The addition order setting section 281 requests the table storage section 181 for the table information and acquires the table information. The addition order setting section 281 then uses the acquired table information to set the addition order of the candidate data. The addition order setting section 281 supplies the information indicating the addition order to the lower bit generation section 134.

In this way, the addition order setting section 281 can set the same addition order as in the case of the addition order setting section 261. That is, the addition order setting section 281 can set the addition order so as to suppress the generation of the pattern caused by the difference in level of the refinement data in the decoded image.

In this way, the decoding section 252 can obtain the decoded image by applying, on a block-by-block basis, the simple decoding to the encoded data at the fixed length obtained by the encoding section 251 applying the simple encoding to the input image. In this case, the decoding section 252 can decode the data as described above to perform the simple decoding so as to suppress the generation of the pattern caused by the difference in level of the refinement data in the decoded image. Therefore, the decoding section 252 can suppress the reduction in the image quality.

Note that the method of each process executed by each processing section of the decoding section 252 may be any method as long as the method corresponds to the encoding section 251.

<Flow of Encoding Process>

Figure 27:
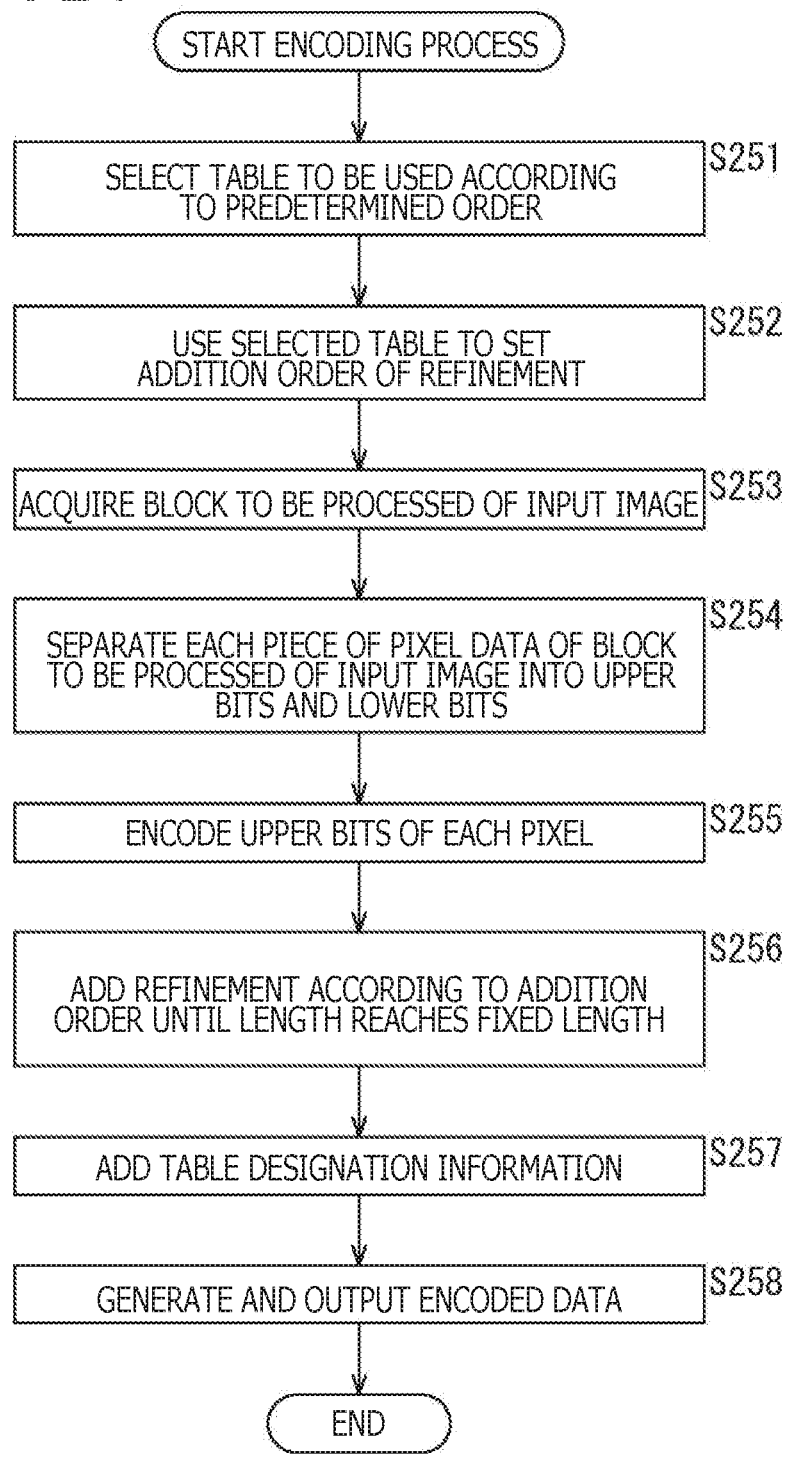
FIG. 27 is a flow chart describing an example of a flow of an encoding process.

Next, flows of processes executed by the respective processing sections of the image processing apparatus 250 configured as described above will be described. First, an example of a flow of an encoding process executed by the encoding section 251 will be described with reference to a flow chart of FIG. 27.

Once the encoding process is started, the addition order setting section 261 of the encoding section 251 selects the table information to be used according to the predetermined order defined in advance in step S251.

In step S252, the addition order setting section 261 acquires the selected table information from the table storage section 161. The addition order setting section 261 uses the acquired table information to set the addition order of the refinement data.

The respective processes of steps S253 to S257 are executed similarly to the respective processes of steps S113 to S117 of FIG. 8.

When the process of step S257 is finished, the encoding process ends. The encoding section 251 can execute the encoding process at an arbitrary timing. For example, the encoding section 251 may execute the encoding process on a block-by-block basis.

<Flow of Decoding Process>

Figure 28:
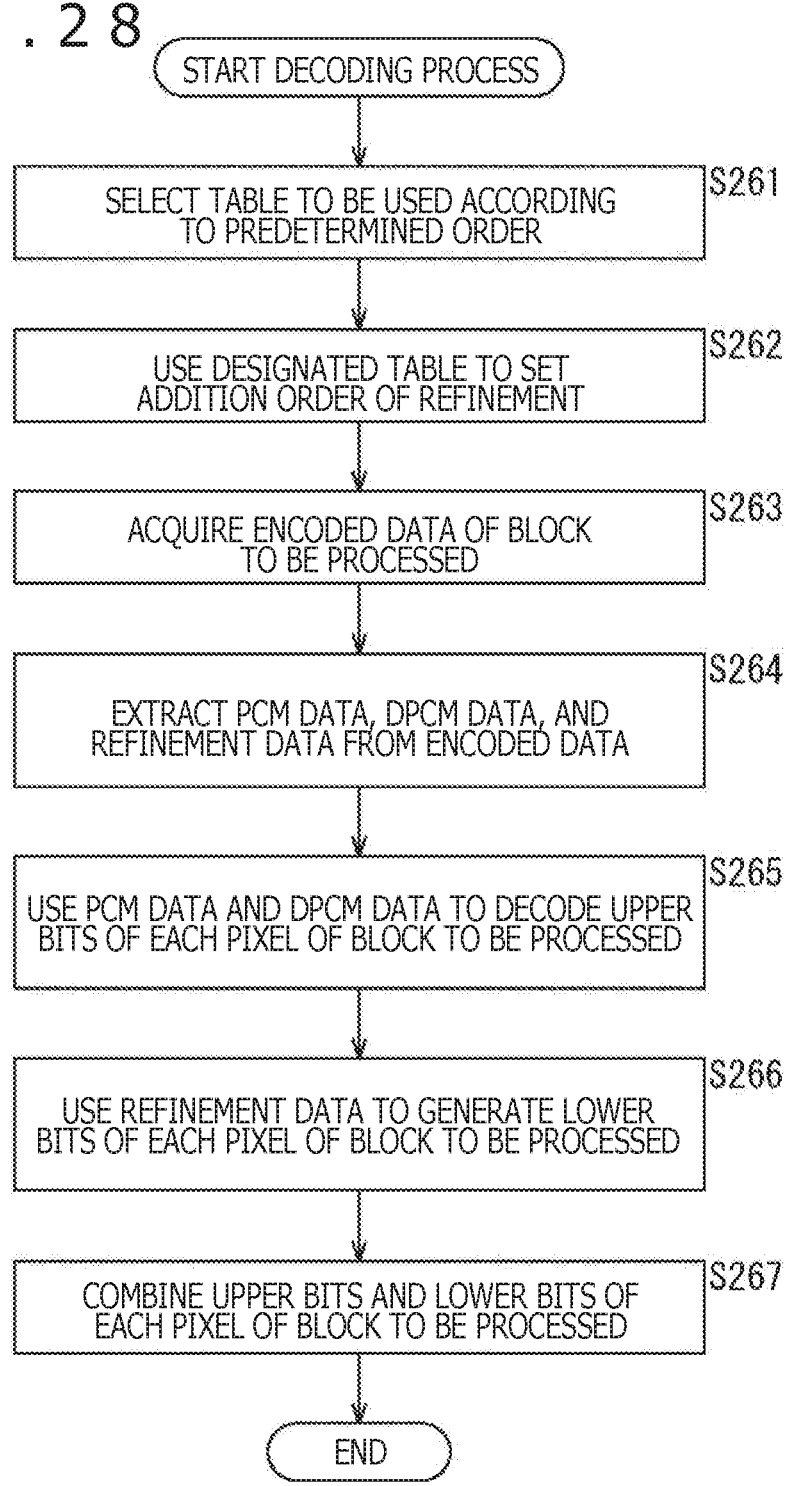
FIG. 28 is a flow chart describing an example of a flow of a decoding process.

Next, an example of a flow of a decoding process executed by the decoding section 252 will be described with reference to a flow chart of FIG. 28.

Once the decoding process is started, the addition order setting section 281 of the decoding section 252 selects the table information to be used according to the predetermined order defined in advance (the same order as in the case of step S251 (FIG. 27)) in step S261.

In step S262, the addition order setting section 281 acquires the selected table information from the table storage section 181. The addition order setting section 281 uses the acquired table information to set the addition order of the refinement data.

The respective processes of steps S263 to S267 are executed similarly to the respective processes of steps S123 to S127 of FIG. 9.

The image processing apparatus 250 can execute the respective processes as described above to suppress the reduction in the subjective image quality of the decoded image. In addition, the control section and the transmission of information from the control section to the encoding section or the decoding section are not necessary in this case, and the required configuration is more simplified. This increases the versatility of the image processing apparatus, and the present technique can be applied to more diverse systems and apparatuses.

In addition, the information regarding the addition order of the refinement data does not have to be added to the encoded data (bit stream) in this case, and the reduction in the encoding efficiency can be suppressed.

<Modifications>

Note that although the lower 5 bits of each piece of pixel data are used as an example of the candidate data in the description above, the candidate data may be any data (bits). For example, part of the lower 5 bits of each piece of pixel data may be the candidate data. For example, the table information may indicate the addition order of the upper 2 bits in the lower 5 bits of each piece of pixel data. In this case, the other bits not provided with the addition order are not set as the refinement data (prohibited from becoming the refinement data).

In addition, although the table information indicates the addition order of the candidate data in the description above, the candidate data provided with the addition order may not be the same throughout the entire table information. For example, some table information may indicate the addition order of the upper 2 bits in the lower 5 bits of each piece of pixel data, and other table information may indicate the addition order of the upper 3 bits of the lower 5 bits of each piece of pixel data. For example, the candidate data (the positions or the number of pieces of candidate data) indicating the addition order may vary between the pieces of table information.

6. Other Applications

Application Example 1 of the Present Technique: Image Projection Apparatus

The present technique can be applied to an arbitrary system, apparatus, processing section, or the like. For example, as illustrated in FIG. 29, the present technique may be applied to a display device such as a so-called projector.

Figure 29:
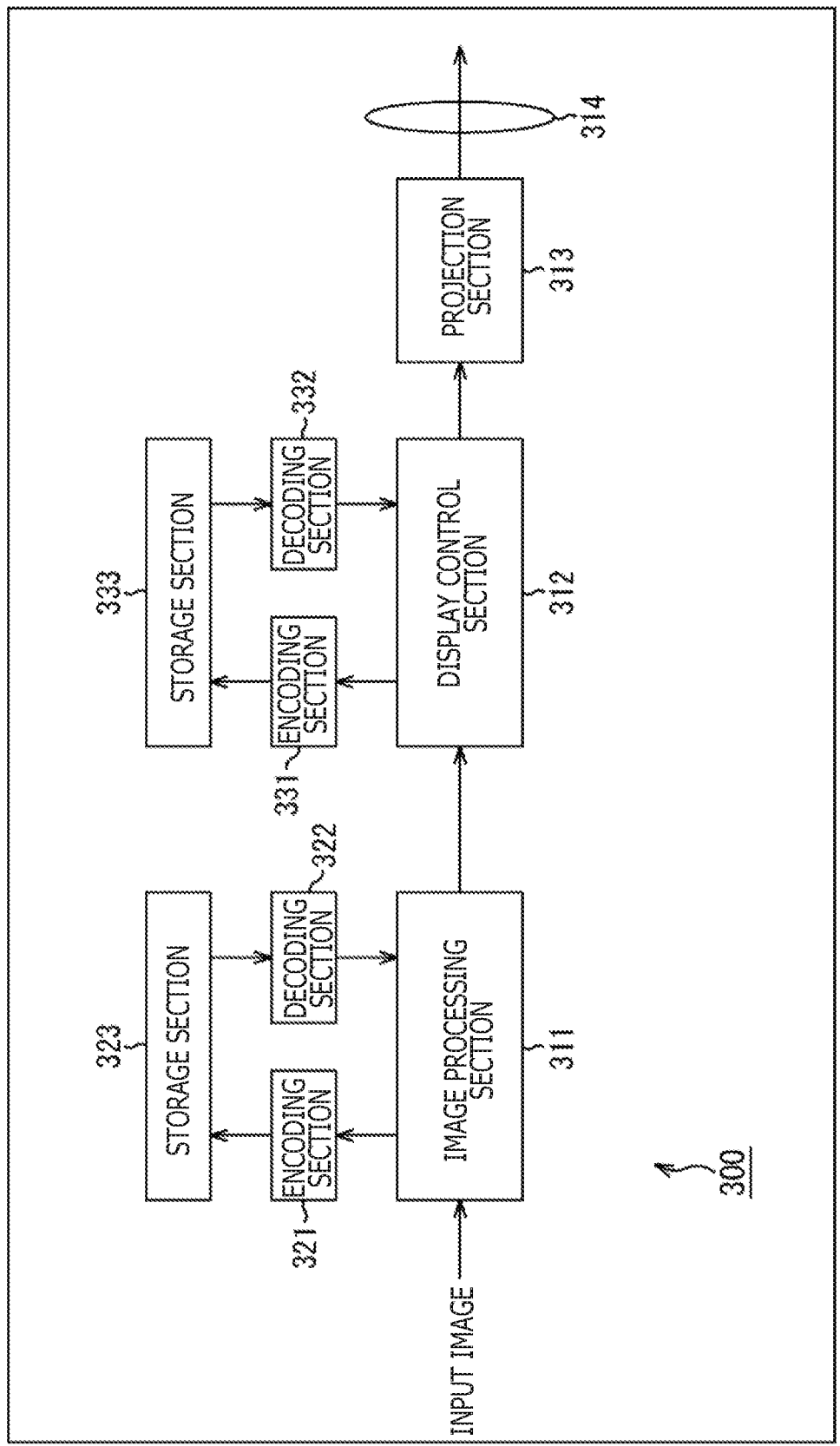
FIG. 29 is a block diagram illustrating a main configuration example of an image projection apparatus.

In FIG. 29, an image projection apparatus 300 is a display device that is a so-called projector, and the image projection apparatus 300 has a function of projecting an image on a projection surface such as a screen. As illustrated in FIG. 29, the image projection apparatus 300 includes, for example, an image processing section 311, a display control section 312, a projection section 313, and an optical section 314.

The image processing section 311 executes a process regarding image processing. For example, the image processing section 311 applies predetermined image processing, such as geometric correction and filtering process, to an input image and supplies the input image to the display control section 312. The display control section 312 executes a process regarding display control of an image. For example, the display control section 312 adjusts the brightness of the image supplied from the image processing section 311 or synchronizes the image with the frame rate and then supplies the image to the projection section 313. The projection section 313 executes a process regarding projection of an image. For example, the projection section 313 projects the image supplied from the display control section 312 to the projection surface of the screen or the like through the optical section 314 including an optical device such as a lens.

<Application of the Present Technique to Image Processing>

The image projection apparatus 300 further includes an encoding section 321, a decoding section 322, and a storage section 323 with respect to the image processing section 311. The storage section 323 includes, for example, a storage medium, such as a DRAM, and stores image data subject to image processing by the image processing section 311. That is, the image processing section 311 causes the storage section 323 to store the image data of the input image and appropriately reads the image data to apply image processing to the image data.

The encoding section 321 encodes (compresses) the image data supplied from the image processing section 311 to generate encoded data and supplies the encoded data to the storage section 323. That is, the encoded data of the image data is stored in the storage section 323. The encoding (compression) can reduce the amount of data of the image data stored in the storage section 323, and the storage area of the storage section 323 can be further effectively used.

The decoding section 322 decodes (expands) the encoded data read from the storage section 323 to generate decoded image data and supplies the decoded image data to the image processing section 311. The decoding (expansion) allows the image processing section 311 to receive uncompressed image data (decoded image data) of the image data stored in the storage section 323. That is, the image processing section 311 can cause the storage section 323 to store the image data by performing an operation similar to the operation in the case of storing uncompressed image data.

The present technique may be applied to the encoding section 321 and the decoding section 322. The image processing may not be applied to the entire image. In a case where the image processing is partially applied to the image, it is only necessary to read the part from the storage section 323. In the case of the encoding and the decoding according to the present technique, the image data can be processed (encoded and decoded) on a block-by-block basis. That is, the present technique can be applied to suppress reading, decoding, encoding, writing, and the like of data unnecessary for the image processing, and an increase in the load, the processing time, the cost, and the like can be suppressed. Furthermore, the present technique can be applied to suppress the reduction in the image quality.

In this way, in the case where the image data subject to image processing is saved in the storage section, such as a DRAM, in the device that executes image processing, the encoding and the decoding according to the present technique can be performed to more effectively use the storage area of the storage section. In addition, an increase in the load, the processing time, the cost, and the like can be suppressed, and furthermore, the reduction in the image quality can be suppressed.

<Application of the Present Technique to Display Control>

The image processing apparatus 300 further includes an encoding section 331, a decoding section 332, and a storage section 333 with respect to the display control section 312. The storage section 333 includes, for example, a storage medium, such as a DRAM, and stores image data subject to display control by the display control section 312. That is, the display control section 312 causes the storage section 333 to store the image data of the image to be projected, reads the image data at a predetermined timing, appropriately makes an adjustment or the like, and supplies the image data to the projection section 313 to project the image data.

The encoding section 331 encodes (compresses) the image data supplied from the display control section 312 to generate encoded data and supplies the encoded data to the storage section 333. That is, the encoded data of the image data is stored in the storage section 333. The encoding (compression) can reduce the amount of data of the image data stored in the storage section 333, and the storage area of the storage section 333 can be more effectively used.

The decoding section 332 decodes (expands) the encoded data read from the storage section 333 to generate decoded image data and supplies the decoded image data to the display control section 312. The decoding (expansion) allows the display control section 312 to receive uncompressed image data (decoded image data) of the image data stored in the storage section 333. That is, the display control section 312 can cause the storage section 333 to store the image data by performing an operation similar to the operation in the case of storing uncompressed image data.

The present technique may be applied to the encoding section 331 and the decoding section 332. In the case of the display control, the image data is basically written and read from the storage section 333 on a frame-by-frame basis. However, the control of timing, such as synchronizing the supply of image data to the projection section 313 with the frame rate, is necessary, and it is desirable to be able to read and write the image data faster. In the case of the present technique, the simple compression (simple encoding) and the simple expansion (simple decoding) are performed that allow fast processing with a low load. Therefore, the process can be executed faster than in a complicated encoding and decoding system, such as AVC and HEVC. That is, an increase in the processing time, the cost, and the like of writing and reading of the image data from the storage section 333 can be suppressed. Furthermore, the present technique can be applied to suppress the reduction in the image quality as described above.

In this way, in the case where the image data subject to display control is saved in the storage section, such as a DRAM, in the device that performs the display control, the encoding and the decoding according to the present technique can be performed to more effectively use the storage area of the storage section. In addition, an increase in the processing time, the cost, and the like can be suppressed, and furthermore, the reduction in the image quality can be suppressed.

Application Example 2 of the Present Technique: Image Encoding Apparatus

Figure 30:
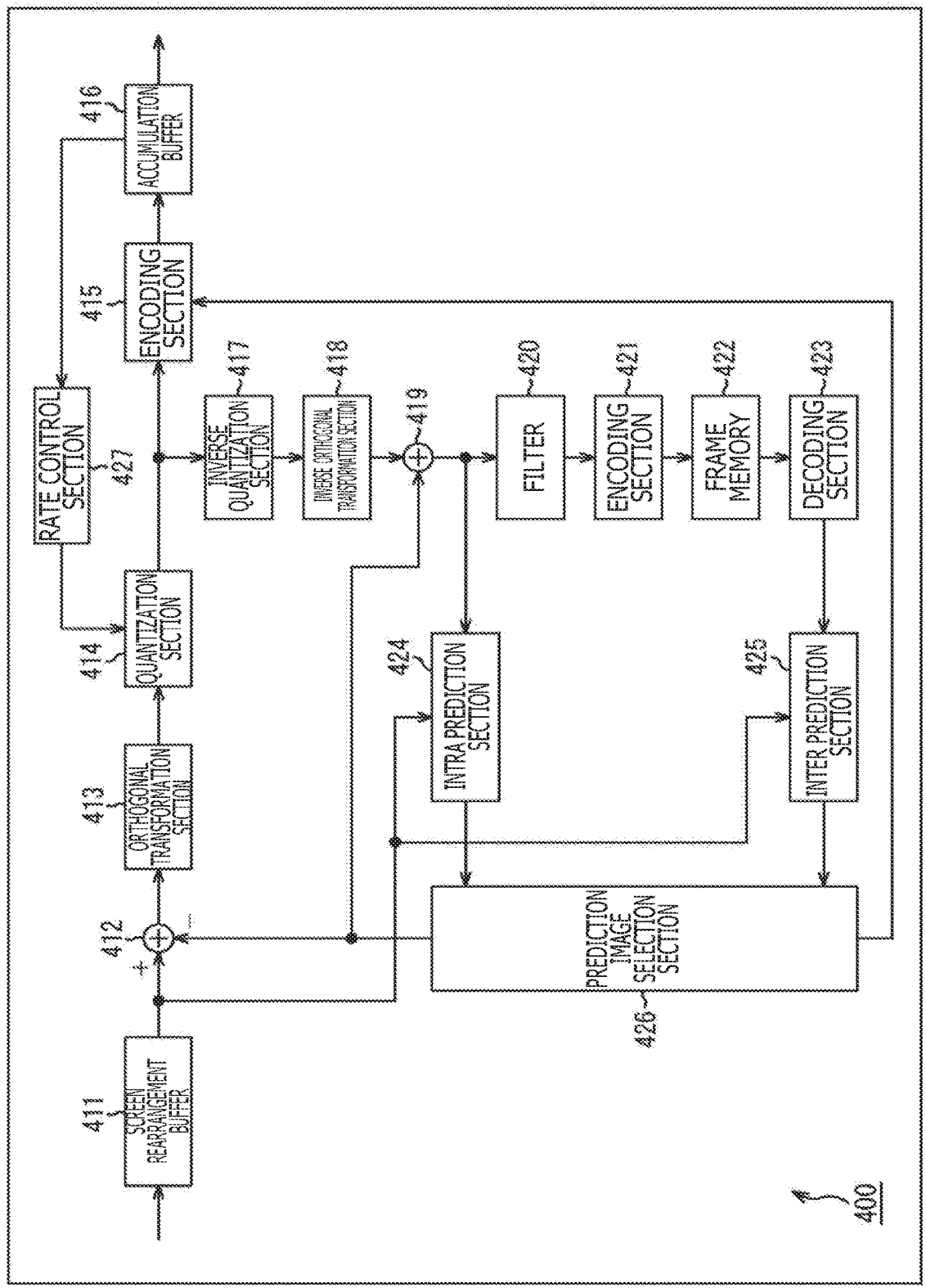
FIG. 30 is a block diagram illustrating a main configuration example of an image encoding apparatus.

In addition, as illustrated for example in FIG. 30, the present technique may be applied to an in-loop process of an image encoding apparatus. In FIG. 30, an image encoding apparatus 400 has a function of executing an in-loop process to perform prediction or the like and using the prediction to encode an image. As illustrated in FIG. 30, the image encoding apparatus 400 includes a screen rearrangement buffer 411, a computing section 412, an orthogonal transformation section 413, a quantization section 414, an encoding section 415, and an accumulation buffer 416. The image encoding apparatus 400 further includes an inverse quantization section 417, an inverse orthogonal transformation section 418, a computing section 419, a filter 420, an encoding section 421, a frame memory 422, a decoding section 423, an intra prediction section 424, an inter prediction section 425, a prediction image selection section 426, and a rate control section 427.

The screen rearrangement buffer 411 rearranges respective frames of input image data from a display order to an encoding order. The computing section 412 obtains residual information (also referred to as residual data) between an image read from the screen rearrangement buffer 411 and a predicated image. The orthogonal transformation section 413 uses a predetermined method to perform an orthogonal transformation of the residual data and obtains an orthogonal transformation coefficient. The quantization section 414 uses a predetermined method to quantize the orthogonal transformation coefficient and obtains quantization data. The encoding section 415 encodes information regarding the image, such as the quantization data and information regarding an optimal prediction mode, to generate encoded data. The accumulation buffer 416 temporarily holds the encoded data and outputs, for example, a bit stream or the like of the encoded data to the outside of the image encoding apparatus 400 at a predetermined timing.

The inverse quantization section 417 uses a method corresponding to the quantization by the quantization section 414 to perform inverse quantization of the quantization data obtained by the quantization and restores the orthogonal transformation coefficient. The inverse orthogonal transformation section 418 uses a method corresponding to the orthogonal transformation process by the orthogonal transformation section 413 to perform an inverse orthogonal transformation of the restored orthogonal transformation coefficient and restores the residual data. The computing section 419 adds a prediction image to the restored residual data to obtain a locally reconstructed image (also referred to as reconstructed image). The filter 420 appropriately applies a filtering process, such as, for example, deblocking filter, to the reconstructed image to obtain a decoded image.

The encoding section 421 applies the simple encoding (simple compression) to the decoded image to obtain encoded data. The frame memory 422 stores the encoded data of the decoded image in a storage area of the frame memory 422. The frame memory 422 includes a DRAM or the like and has a high-capacity storage area. The frame memory 422 can store, for example, decoded images of a plurality of frames. The encoded data is appropriately read as a reference image or the like according to a request of the inter prediction section 425 or the like. The decoding section 423 applies the simple decoding (simple expansion) to the encoded data read from the frame memory 422 to obtain a decoded image.

The intra prediction section 424 uses pixel values in the picture to be processed that is the reconstructed image supplied as the reference image from the computing section 419, an input image supplied from the screen rearrangement buffer 411, or the like to perform intra prediction (prediction in screen) to generate a prediction image. The inter prediction section 425 uses an input image supplied from the screen rearrangement buffer 411, a reference image read from the frame memory 422 (decoded image obtained by decoding by the decoding section 423), or the like to execute an inter prediction process (motion prediction process and compensation process) to generate a prediction image. The prediction image selection section 426 selects an optimal prediction mode and supplies a prediction image of the selected mode to the computing section 412 and the computing section 419. The prediction image selection section 426 also supplies, to the encoding section 415, information regarding the optimal prediction mode including part or all of the information regarding the prediction result of the selected mode. On the basis of the code amount of the encoded data accumulated in the accumulation buffer 416, the rate control section 427 controls the rate of the quantization operation by the quantization section 414 to prevent generation of an overflow or an underflow.

In this way, the encoding section 421 and the decoding section 423 are provided with respect to the frame memory 422 of the in-loop of the image encoding apparatus 400, and the image data (decoded image) is encoded (compressed) and stored in the frame memory 422. As a result, the amount of data can be reduced, and the storage area of the frame memory 422 can be more effectively used. In addition, both the encoding section 421 and the decoding section 423 are provided, and the filter 420 and the inter prediction section 425 can handle the data in this case as in the case where uncompressed data is stored in the frame memory 422.

The present technique may be applied to the encoding section 421 and the decoding section 423 of the in-loop. The decoded image (encoded data) stored in the frame memory 422 is locally read as a reference image (as a partial image) by the inter prediction section 425. That is, there is no need to read all of the frames. In the case of the encoding and the decoding according to the present technique, the image data can be processed (encoded and decoded) on a block-by-block basis. That is, the present technique can be applied to suppress processing (such as reading and decoding) of data unnecessary for the inter prediction, and an increase in the load, the processing time, the cost, and the like can be suppressed. In addition, in the case of the present technique, the simple compression (simple encoding) and the simple expansion (simple decoding) are performed that allow fast processing with a low load. Therefore, the process can be executed faster than in a complicated encoding and decoding system, such as AVC and HEVC. That is, the present technique can be applied to write and read the image data from the frame memory 422 faster. Furthermore, the present technique can be applied to suppress the reduction in the image quality as described above.

Application Example 3 of the Present Technique: Image Decoding Apparatus

Figure 31:
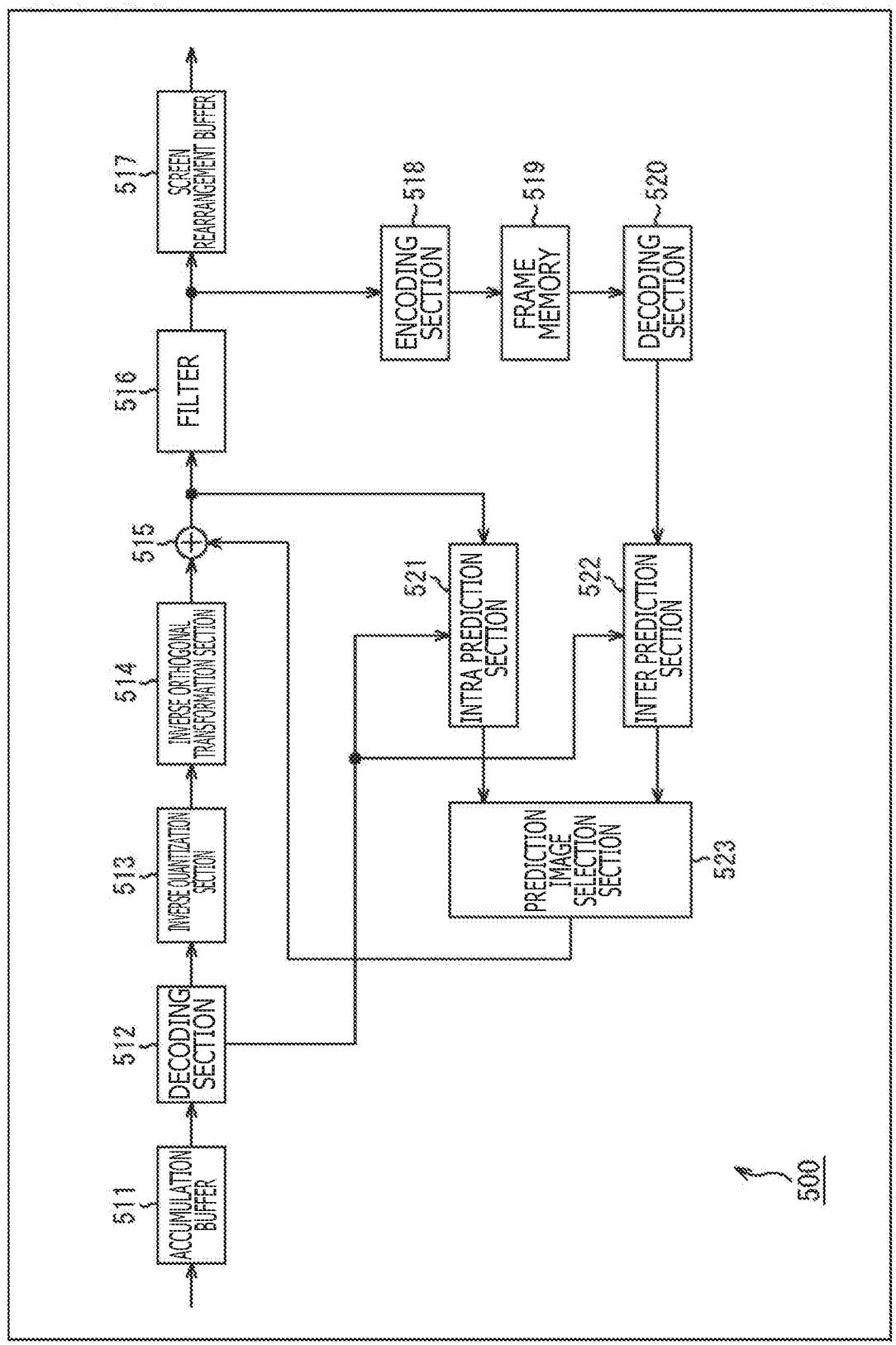
FIG. 31 is a block diagram illustrating a main configuration example of an image decoding apparatus.

Similarly, as illustrated for example in FIG. 31, the present technique may be applied to an in-loop process of an image decoding apparatus. In FIG. 31, an image decoding apparatus 500 has a function of executing an in-loop process to perform prediction or the like and using the prediction to decode encoded data of an image. As illustrated in FIG. 31, the image decoding apparatus 500 includes an accumulation buffer 511, a decoding section 512, an inverse quantization section 513, an inverse orthogonal transformation section 514, a computing section 515, a filter 516, and a screen rearrangement buffer 517. The image decoding apparatus 500 further includes an encoding section 518, a frame memory 519, a decoding section 520, an intra prediction section 521, an inter prediction section 522, and a prediction image selection section 523.

The accumulation buffer 511 accumulates encoded data generated by, for example, the image encoding apparatus 400 or the like. The decoding section 512 uses a system (operation mode) corresponding to the encoding system of the encoding section 415 of FIG. 30 to decode the encoded data read from the accumulation buffer 511 and obtains quantization data, information regarding an optimal prediction mode, and the like. The inverse quantization section 513 uses a system corresponding to the quantization system of the quantization section 414 of FIG. 30 (that is, a system similar to the inverse quantization section 417) to perform inverse quantization of the quantization data and restores the orthogonal transformation coefficient. The inverse orthogonal transformation section 514 uses a system corresponding to the orthogonal transformation system of the orthogonal transformation section 413 of FIG. 30 (that is, a system similar to the inverse orthogonal transformation section 418) to apply an inverse orthogonal transformation of the orthogonal transformation coefficient and restores the residual data. The computing section 515 adds a prediction image to the restored residual data to obtain a reconstructed image. The filter 516 executes a filtering process (for example, deblocking filter or the like) similar to the filtering process executed by the filter 420 of FIG. 30 to obtain a decoded image. The screen rearrangement buffer 517 rearranges the frames of the decoded image from the encoding order to the display order and outputs the decoded image to the outside of the image decoding apparatus 500.

The encoding section 518 applies the simple encoding (simple compression) to the decoded image to obtain encoded data. The frame memory 519 stores the encoded data of the decoded image in the storage area of the frame memory 519. The frame memory 519 includes a DRAM or the like and has a high-capacity storage area. The frame memory 519 can, for example, store decoded images of a plurality of frames. The encoded data is appropriately read as a reference image or the like according to a request of the inter prediction section 522 or the like. The decoding section 520 applies the simple decoding (simple expansion) to the encoded data read from the frame memory 519 and obtains a decoded image.

The intra prediction section 521 uses the information regarding the prediction result of the optimal intra prediction mode supplied from the decoding section 512 and the reconstructed image supplied from the computing section 515 to perform intra prediction and generates a prediction image. The inter prediction section 522 uses the information regarding the prediction result of the optimal inter prediction mode supplied from the decoding section 512 and the reference image read from the frame memory 519 (decoded image obtained by decoding by the decoding section 520) to perform inter prediction and generates a prediction image. The prediction image selection section 523 supplies the prediction image supplied from the intra prediction section 521 or the inter prediction section 522 to the computing section 515.

In this way, the encoding section 518 and the decoding section 520 are provided with respect to the frame memory 519 of the in-loop of the image decoding apparatus 500, and the image data (decoded image) is encoded (compressed) and stored in the frame memory 519. As a result, the amount of data can be reduced, and the storage area of the frame memory 519 can be more effectively used. In addition, both the encoding section 518 and the decoding section 520 are provided, and the filter 516 and the inter prediction section 522 can handle the data in this case as in the case where uncompressed data is stored in the frame memory 519.

The present technique may be applied to the encoding section 518 and the decoding section 520 of the in-loop. The decoded image (encoded data) stored in the frame memory 519 is locally read as a reference image (as a partial image) by the inter prediction section 522. That is, there is no need to read all of the frames. In the case of the encoding and the decoding according to the present technique, the image data can be processed (encoded and decoded) on a block-by-block basis. That is, the present technique can be applied to suppress processing (such as reading and decoding) of data unnecessary for the inter prediction, and an increase in the load, the processing time, the cost, and the like can be suppressed. In addition, in the case of the present technique, the simple compression (simple encoding) and the simple expansion (simple decoding) are performed that allow fast processing with a low load. Therefore, the process can be executed faster than in a complicated encoding and decoding system, such as AVC and HEVC. That is, the present technique can be applied to write and read the image data from the frame memory 519 faster. Furthermore, the present technique can be applied to suppress the reduction in the image quality.

Application Example 3 of the Present Technique: Imaging Element

Figure 32:
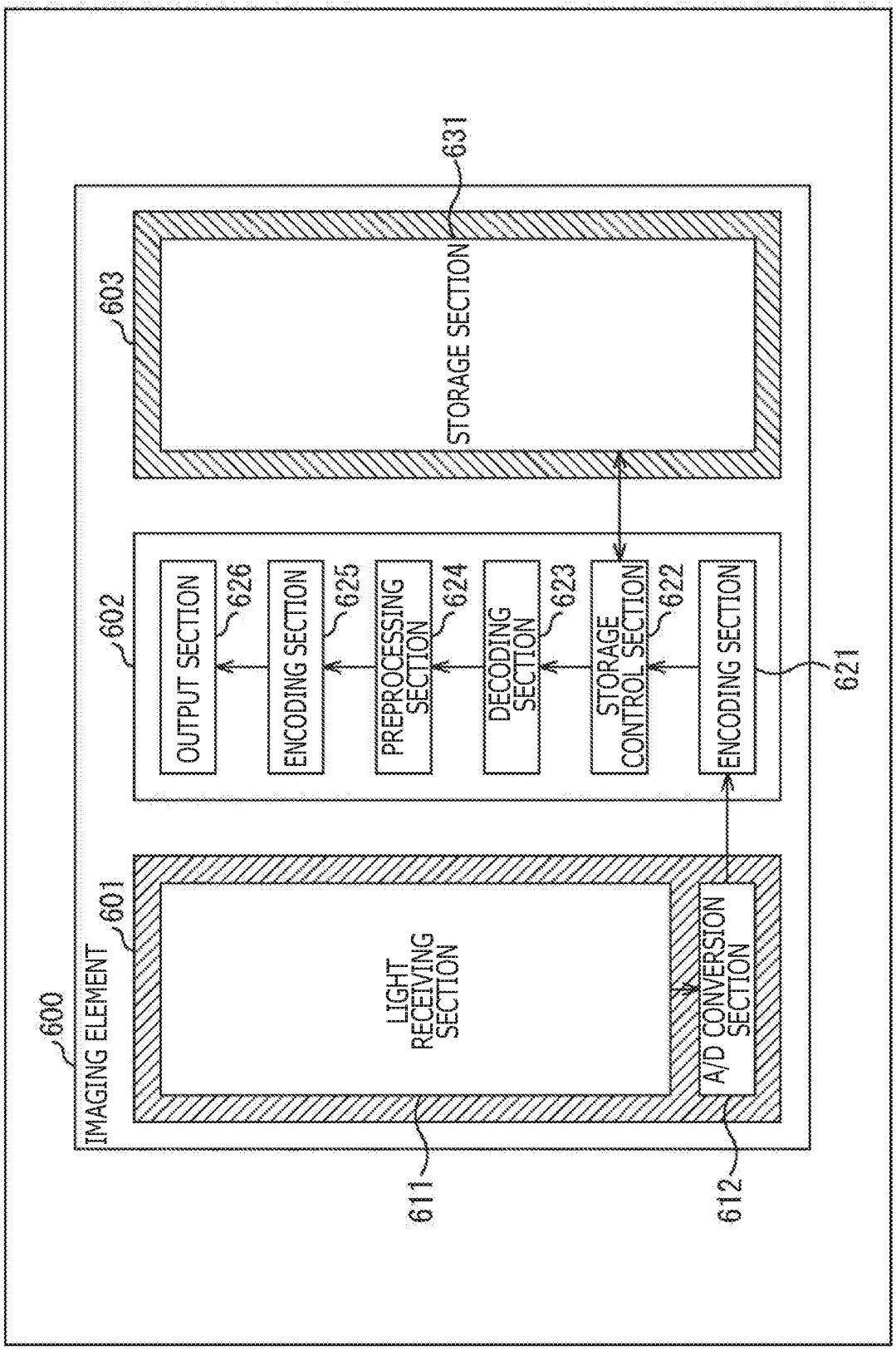
FIG. 32 is a block diagram illustrating a main configuration example of an imaging element.

In addition, as illustrated for example in FIG. 32, the present technique may be applied to an imaging element. In FIG. 32, an imaging element 600 is an image sensor that images a subject to obtain digital data (image data) of a captured image and that outputs the image data. The imaging element 600 is an arbitrary image sensor and may be, for example, an image sensor using CMOS (Complementary Metal Oxide Semiconductor), CCD (Charge Coupled Device), or the like.

The imaging element 600 includes a semiconductor substrate 601, a semiconductor substrate 602, and a semiconductor substrate 603 forming a laminated structure. A light receiving section 611 and an A/D conversion section 612 are formed on the semiconductor substrate 601. In addition, an encoding section 621, a storage control section 622, a decoding section 623, a preprocessing section 624, an encoding section 625, and an output section 626 are formed on the semiconductor substrate 602. Furthermore, a storage section 631 is formed on the semiconductor substrate 603.

Light received by the light receiving section 611 of the semiconductor substrate 601 is photoelectrically converted in each unit pixel. An electrical signal (pixel signal) of the light is supplied to the A/D conversion section 612, and A/D conversion is applied. A set of pixel data of each unit pixel generated in this way is supplied as image data to the encoding section 621 of the semiconductor substrate 602.

The encoding section 621 applies the simple encoding (simple compression) to the image data (RAW data) supplied from the A/D conversion section 612 to generate encoded data. The storage control section 622 supplies and stores, in the storage section 631 of the semiconductor substrate 603, the encoded data supplied from the encoding section 621 or reads the encoded data from the storage section 631. The storage section 631 stores the encoded data. The storage section 631 includes, for example, a DRAM or the like and has a high-capacity storage area. The storage section 631 can store, for example, image data (encoded data) equivalent to one picture. The decoding section 623 applies the simple decoding (simple expansion) to the encoded data read by the storage control section 622 from the storage section 631 and restores the image data (RAW data).

The preprocessing section 624 applies predetermined signal processing as preprocessing to the restored image data (RAW data). The encoding section 625 applies the simple encoding (simple compression) to the preprocessed image data to generate encoded data. The output section 626 outputs the encoded data to the outside of the imaging element 600.

In this way, the encoding section 621 and the decoding section 623 are provided with respect to the storage control section 622 (storage section 631), and the image data is encoded (compressed) and stored in the storage section 631. Therefore, the amount of data can be reduced, and the storage area of the storage section 631 can be more effectively used. In addition, the use efficiency of the memory bus can be improved without increasing the cost, and the data can be input and output from the storage section 631 faster. Furthermore, both the encoding section 621 and the decoding section 623 are provided, and the A/D conversion section 612 and the preprocessing section 624 can handle the data in this case as in the case where uncompressed data is stored in the storage section 631.

The present technique may be applied to the encoding section 621 and the decoding section 623 in the imaging element 600. In the case of the present technique, the simple compression (simple encoding) and the simple expansion (simple decoding) are performed that allow fast processing with a low load. Therefore, the process can be executed faster than in a complicated encoding and decoding system, such as AVC and HEVC. That is, the present technique can be applied to write and read the image data from the storage section 631 faster. Furthermore, the present technique can be applied to suppress the reduction in the image quality as described above.

In addition, the encoding section 625 applies the simple encoding to the image data to reduce the amount of data and then outputs the image data to the outside of the imaging element 600 as described above. This reduces the band necessary for transmitting the image data (encoded data) in the bus connected to the imaging element 600. Therefore, the imaging element 600 can more quickly output data with a higher capacity without changing the bandwidth of the bus. That is, the imaging element 600 can more quickly output data with a higher capacity without increasing the number of I/O cells or I/O pins of the output section 626, that is, without increasing the cost. In other words, the imaging element 600 can suppress the effect of the band limitation of the bus and can improve the imaging performance, such as an increase in the resolution of image, an increase in the speed of the process from imaging to recording of still images, an improvement in the number of times of continuous shooting and the speed of continuous shooting, an increase in the speed of the frame rate of moving images, and capturing of moving images and still images, without increasing the cost (without increasing the number of I/O cells or I/O pins of the output section 626).

The present technique may be applied to the encoding section 625 in the imaging element 600. In the case of the present technique, the simple compression (simple encoding) and the simple expansion (simple decoding) are performed that allow fast processing with a low load. Therefore, the process can be executed faster than in a complicated encoding and decoding system, such as AVC and HEVC. That is, the present technique can be applied to output the image data (encoded data) faster. Furthermore, the present technique can be applied to suppress the reduction in the image quality as described above.

<Field of Application of the Present Technique>

The systems, the apparatuses, the processing sections, and the like according to the present technique can be used in arbitrary fields, such as, for example, traffic, medical care, crime prevention, agriculture, livestock industry, mining industry, cosmetics, factories, home appliances, weather, and natural surveillance.

For example, the present technique can also be applied to a system or a device that projects and captures an image to be viewed. The present technique can also be applied to, for example, a system or a device used for traffic. Furthermore, the present technique can be applied to, for example, a system or a device used for security. The present technique can also be applied to, for example, a system or a device used for sports. Furthermore, the present technique can be applied to, for example, a system or a device used for agriculture. The present technique can also be applied to, for example, a system or a device used for livestock industry. Furthermore, the present technique can be applied to, for example, a system or a device that monitors the state of the nature, such as volcanos, forests, and oceans. The present technique can also be applied to a weather observation system or a weather observation apparatus that observes, for example, the weather, temperature, humidity, wind velocity, sunshine hours, and the like. Furthermore, the present technique can be applied to, for example, a system or a device that observes ecology of the wild life, such as birds, fish, reptiles, amphibians, mammals, insects, and plants.

<Computer>

The series of processes described above can be executed by hardware or can be executed by software. In the case where the series of processes are executed by software, a program included in the software is installed on a computer. Here, examples of the computer include a computer incorporated into dedicated hardware and a general-purpose personal computer or the like that can execute various functions by installing various programs.

Figure 33:
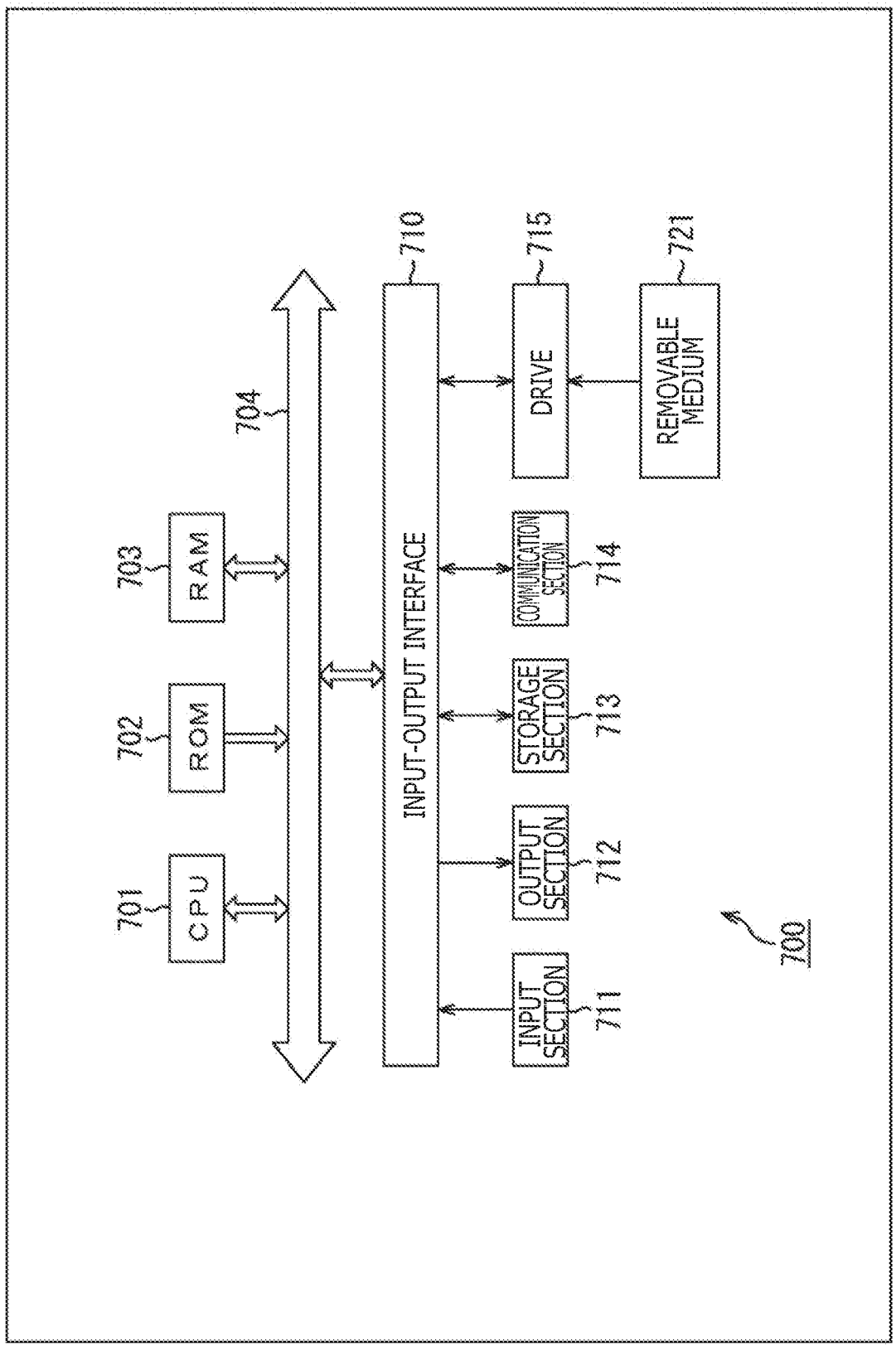
FIG. 33 is a block diagram illustrating a main configuration example of a computer.

FIG. 33 is a block diagram illustrating a configuration example of the hardware of the computer that uses a program to execute the series of processes.

In a computer 700 illustrated in FIG. 33, a CPU (Central Processing Unit) 701, a ROM (Read Only Memory) 702, and a RAM (Random Access Memory) 703 are connected to each other through a bus 704.

An input-output interface 710 is also connected to the bus 704. An input section 711, an output section 712, a storage section 713, a communication section 714, and a drive 715 are connected to the input-output interface 710.

The input section 711 includes, for example, a keyboard, a mouse, a microphone, a touch panel, an input terminal, and the like. The output section 712 includes, for example, a display, a speaker, an output terminal, and the like. The storage section 713 includes, for example, a hard disk, a RAM disk, a non-volatile memory, and the like. The communication section 714 includes, for example, a network interface. The drive 715 drives a removable medium 721, such as a magnetic disk, an optical disk, a magneto-optical disk, and a semiconductor memory.

In the computer 700 configured in this way, the CPU 701 loads, for example, a program stored in the storage section 713 to the RAM 703 through the input-output interface 710 and the bus 704 to execute the program to thereby execute the series of processes. Data and the like necessary for the CPU 701 to execute various processes are also appropriately stored in the RAM 703.

The program executed by the computer 700 can be applied by, for example, recording the program in the removable medium 721 as a package medium or the like. In that case, the removable medium 721 can be mounted on the drive 715 to install the program on the storage section 713 through the input-output interface 710.

The program can also be provided through a wired or wireless transmission medium, such as a local area network, the Internet, and digital satellite broadcasting. In that case, the program can be received by the communication section 714 and installed on the storage section 713.

In addition, the program can also be installed in advance in the ROM 702 or the storage section 713.

<Modifications>

Note that although various types of information are multiplexed into encoded data (bit streams) and transmitted from the encoding side to the decoding side in the example described in the present specification, the method of transmitting the information is not limited to the example. For example, the information may not be multiplexed into encoded data, and the information may be transmitted or recorded as separate data associated with the encoded data. Here, the term "associated" means, for example, that the image (may be part of the image, such as a slice or a block) included in the encoded data and the information corresponding to the image can be linked at the decoding. That is, the information associated with the encoded data (image) may be transmitted on a transmission path different from the encoded data (image). In addition, the information associated with the encoded data (image) may be recorded in a recording medium separate from the encoded data (image) (or in a separate recording area of the same recording medium). Furthermore, the image and the information corresponding to the image may be associated with each other in an arbitrary unit, such as, for example, a plurality of frames, one frame, and part of the frame.

In addition, as described above, the terms, such as "combine," "multiplex," "add," "integrate," "include," "store," "put in," "place into," and "insert," in the present specification denote grouping of a plurality of things, such as grouping of the encoded data and the metadata into one piece of data, and each term denotes one method of "associating" described above.

In addition, the embodiments of the present technique are not limited to the embodiments described above, and various changes can be made without departing from the scope of the present technique.

For example, the system in the present specification denotes a set of a plurality of constituent elements (apparatuses, modules (components), and the like), and whether or not all of the constituent elements are in the same housing does not matter. Therefore, a plurality of apparatuses stored in separate housings and connected through a network and one apparatus storing a plurality of modules in one housing are both systems.

Furthermore, for example, the configuration of one apparatus (or processing section) described above may be divided to provide a plurality of apparatuses (or processing sections). Conversely, the configurations of a plurality of apparatuses (or processing sections) described above may be put together to provide one apparatus (or processing section). In addition, configurations other than the configurations described above may be obviously added to the configuration of each apparatus (or each processing section). Furthermore, part of the configuration of an apparatus (or processing section) may be included in the configuration of another apparatus (or another processing section) as long as the configuration and the operation of the entire system are substantially the same.

In addition, the present technique can be provided as, for example, cloud computing in which a plurality of apparatuses share one function and cooperate to execute a process through a network.

In addition, the program described above can be executed by, for example, an arbitrary apparatus. In that case, the apparatus can have necessary functions (such as functional blocks) and obtain necessary information.

In addition, for example, one apparatus can execute each step described in the flow charts described above, or a plurality of apparatuses can take charge and execute each step. Furthermore, in the case where one step includes a plurality of processes, one apparatus can execute the plurality of processes included in one step, or a plurality of apparatuses can take charge and execute the processes.

Note that the program executed by the computer may be a program in which the processes of the steps describing the program are executed in chronological order described in the present specification, or the program may be a program for executing the processes in parallel or for executing the processes separately at a necessary timing such as when the processes are invoked. That is, the processes of the steps may be executed in an order different from the order described above as long as there is no contradiction. Furthermore, the processes of the steps describing the program may be executed in parallel with processes of other programs or may be executed in combination with processes of other programs.

Note that the plurality of present techniques described in the present specification can be independently and separately carried out as long as there is no contradiction. Obviously, a plurality of arbitrary present techniques can be combined and carried out. For example, the present technique described in one of the embodiments can also be carried out in combination with the present technique described in another embodiment. In addition, an arbitrary present technique described above can also be carried out in combination with another technique not described above.

Note that the present technique can also be configured as follows.

(1)

An image processing apparatus including:

an addition order setting section configured to set, on a block-by-block basis, an addition order of candidate data that is a candidate for additional data to be added to encoded data including encoded image data in blocks in order to set the encoded data to a fixed length.

(2)

The image processing apparatus according to (1), in which the addition order setting section uses pseudo-random numbers to set the addition order of the candidate data.

(3)

The image processing apparatus according to (1) or (2), in which the addition order setting section acquires seed information and uses the acquired seed information to generate the pseudo-random numbers.

(4)

The image processing apparatus according to any one of (1) to (3), in which the addition order setting section acquires the pseudo-random numbers and uses the acquired pseudo-random numbers to set the addition order of the candidate data.

(5)

The image processing apparatus according to any one of (1) to (4), in which the addition order setting section uses table information indicating the addition order of the candidate data to set the addition order of the candidate data.

(6)

The image processing apparatus according to any one of (1) to (5), in which the addition order setting section acquires table designation information for designating the table information and uses the table information designated in the acquired table designation information to set the addition order of the candidate data.

(7)

The image processing apparatus according to any one of (1) to (6), in which the addition order setting section randomly selects the table information and uses the selected table information to set the addition order of the candidate data.

(8)

The image processing apparatus according to any one of (1) to (7), in which the addition order setting section selects the table information in a predetermined order and uses the selected table information to set the addition order of the candidate data.

(9)

The image processing apparatus according to any one of (1) to (8), further including:

a storage section configured to store the table information, in which the addition order setting section selects desired table information from the table information stored in the storage section and uses the selected table information to set the addition order of the candidate data.

(10)

The image processing apparatus according to any one of (1) to (9), in which the addition order setting section acquires the table information and uses the acquired table information to set the addition order of the candidate data.

(11)

The image processing apparatus according to any one of (1) to (10), further including:

a fixed length encoded data generation section configured to generate encoded data at a fixed length including the encoded data and the additional data to be added in the addition order set by the addition order setting section.

(12)

The image processing apparatus according to any one of (1) to (11), in which the fixed length encoded data generation section generates the encoded data at the fixed length further including information regarding the addition order.

(13)

The image processing apparatus according to any one of (1) to (12), in which the information regarding the addition order includes the table designation information that is used to set the addition order of the candidate data and that designates the table information indicating the addition order of the candidate data.

(14)

The image processing apparatus according to any one of (1) to (13), in which the information regarding the addition order includes the table information that is used to set the addition order of the candidate data and that indicates the addition order of the candidate data.

(15)

The image processing apparatus according to any one of (1) to (14), in which the information regarding the addition order includes the seed information used to generate the pseudo-random numbers used to set the addition order of the candidate data.

(16)

The image processing apparatus according to any one of (1) to (15), in which the information regarding the addition order includes the pseudo-random numbers used to set the addition order of the candidate data.

(17)

The image processing apparatus according to any one of (1) to (16), further including:

an additional data generation section configured to generate additional data to be added to the encoded data on the basis of the addition order set by the addition order setting section, in which the fixed length encoded data generation section is configured to generate the encoded data at the fixed length including the additional data generated by the additional data generation section.

(18)

The image processing apparatus according to any one of (1) to (17), further including:

an encoding section configured to encode the image data on a block-by-block basis to generate the encoded data, in which the fixed length encoded data generation section is configured to generate the encoded data at the fixed length including the encoded data generated by the encoding section and the additional data generated by the additional data generation section.

(19)

The image processing apparatus according to any one of (1) to (18), in which the encoding section encodes upper bits of each piece of pixel data included in the image data in blocks to generate the encoded data, and the additional data generation section selects lower bits of each piece of pixel data included in the image data in blocks in the addition order set by the addition order setting section to generate the additional data.

(20)

The image processing apparatus according to any one of (1) to (19), in which the encoding section obtains a difference in the upper bits between pixels to generate the encoded data.

(21)

The image processing apparatus according to any one of (1) to (20), further including:

an extraction section configured to extract the additional data from the encoded data at the fixed length; and a decoded image data generation section configured to align the additional data extracted by the extraction section according to the addition order set by the addition order setting section to generate part of decoded image data in blocks.

(22)

The image processing apparatus according to any one of (1) to (21), in which the extraction section further extracts information regarding the addition order from the encoded data at the fixed length.

(23)

The image processing apparatus according to any one of (1) to (22), in which the information regarding the addition order includes the table designation information for designating table information indicating the addition order of the candidate data, and the addition order setting section uses the table information designated by the table designation information extracted by the extraction section to set the addition order of the candidate data.

(24)

The image processing apparatus according to any one of (1) to (23), in which the information regarding the addition order includes the table information indicating the addition order of the candidate data, and the addition order setting section uses the table information extracted by the extraction section to set the addition order of the candidate data.

(25)

The image processing apparatus according to any one of (1) to (24), in which the information regarding the addition order includes the seed information used to generate the pseudo-random numbers used to set the addition order of the candidate data, and the addition order setting section uses the seed information extracted by the extraction section to generate the pseudo-random numbers and uses the generated pseudo-random numbers to set the addition order of the candidate data.

(26)

The image processing apparatus according to any one of (1) to (25), in which the information regarding the addition order includes the pseudo-random numbers used to set the addition order of the candidate data, and the addition order setting section uses the pseudo-random numbers extracted by the extraction section to set the addition order of the candidate data.

(27)

The image processing apparatus according to any one of (1) to (26), in which the extraction section is configured to further extract the encoded data from the encoded data at the fixed length, and the image processing apparatus further includes:

a decoding section configured to decode the encoded data extracted by the extraction section from the encoded data at the fixed length to generate other part of the decoded image data in blocks; and a combination section configured to combine the other part of the decoded image data in blocks generated by the decoding section and the part of the decoded image data in blocks.

(28)

The image processing apparatus according to any one of (1) to (27), in which the decoding section generates upper bits of each piece of pixel data included in the decoded image data in blocks, and the decoded image data generation section generates lower bits of each piece of pixel data included in the decoded image data in blocks.

(29)

The image processing apparatus according to any one of (1) to (28), in which the decoding section adds the upper bits of one piece of pixel data to a difference value of the upper bits between pixels to generate the upper bits of another piece of pixel data and performs the addition for each difference value to generate the upper bits of each piece of pixel data included in the decoded image data in blocks.

(30)

An image processing method including:
setting, on a block-by-block basis, an addition order of candidate data that is a candidate for additional data to be added to encoded data including encoded image data in blocks in order to set the encoded data to a fixed length.

REFERENCE SIGNS LIST

100 Image processing apparatus, 101 Control section, 102 Encoding section, 103 Decoding section, 111 Addition order setting section, 112 Separation section, 113 Upper bit encoding section, 114 Refinement section, 115 Encoded data generation section, 131 Addition order setting section, 132 Extraction section, 133 Upper bit decoding section, 134 Lower bit generation section, 135 Combination section, 150 Image processing apparatus, 151 Control section, 152 Encoding section, 153 Decoding section, 161 Table storage section, 162 Addition order setting section, 181 Table storage section, 182 Addition order setting section, 200 Image processing apparatus, 201 Encoding section, 202 Decoding section, 211 Addition order setting section, 212 Encoded data generation section, 250 Image processing apparatus, 251 Encoding section, 252 Decoding section, 261 Addition order setting section, 281 Addition order setting section, 300 Image projection apparatus, 321 Encoding section, 322 Decoding section, 331 Encoding section, 332 Decoding section, 400 Image encoding apparatus, 421 Encoding section, 423 Decoding section, 500 Image decoding apparatus, 518 Encoding section, 520 Decoding section, 600 Imaging element, 621 Encoding section, 623 Decoding section, 625 Encoding section, 700 Computer

The invention claimed is:

1. An image processing apparatus, comprising:
a first processor configured to:
select table information that indicates an addition order of candidate data; and
set, on a block-by-block basis, the addition order of the candidate data based on the selected table information, wherein
the candidate data is a candidate for additional data,
the additional data is added to first encoded data to set the first encoded data to a fixed length, and
the first encoded data includes encoded image data in blocks.

2. The image processing apparatus according to claim 1, wherein
the first processor is further configured to set the addition order of the candidate data based on pseudo-random numbers.

3. The image processing apparatus according to claim 2, wherein the first processor is further configured to:
acquire seed information; and
generate the pseudo-random numbers based on the acquired seed information.

4. The image processing apparatus according to claim 1, wherein the first processor is further configured to:
acquire table designation information; and
select the table information based on the acquired table designation information.

5. The image processing apparatus according to claim 1, wherein the first processor is further configured to
select the table information in a specific order.

6. The image processing apparatus according to claim 1, wherein
the first processor is further configured to generate second encoded data at the fixed length based on the first encoded data and the additional data.

7. The image processing apparatus according to claim 6, wherein
the second encoded data includes information regarding the addition order.

8. The image processing apparatus according to claim 7, wherein
the information regarding the addition order includes the table information.

9. The image processing apparatus according to claim 6, wherein the first processor is further configured to
generate the additional data based on the set addition order.

10. The image processing apparatus according to claim 9, wherein the first processor is further configured to:
encode image data on a block-by-block basis; and
generate the first encoded data based on the encoded image data on the block-by-block basis.

11. The image processing apparatus according to claim 10, wherein the first processor is further configured to:
encode upper bits of each piece of pixel data of the image data, wherein the upper bits of the each piece of pixel data of the image data is encoded in blocks;
generate the first encoded data based on the encoded upper bits of the each piece of pixel data of the image data;
select lower bits of the each piece of pixel data of in the image data in the set addition order, wherein the lower bits of the each piece of pixel data of the image data is selected in blocks; and
generate the additional data based on the selected lower bits of the each piece of pixel data of the image data.

12. The image processing apparatus according to claim 10, wherein the first processor is further configured to:
obtain a difference in upper bits between pixels of the image data; and
generate the first encoded data based on the obtained difference.

13. The image processing apparatus according to claim 1, further comprising
a second processor configured to:
extract the additional data from the first encoded data set to the fixed length;
align the additional data based on the addition order; and
generate a first part of decoded image data in blocks based on the aligned additional data.

14. The image processing apparatus according to claim 13, wherein
the second processor is further configured to extract information from the first encoded data set to the fixed length, and
the information is associated with the addition order.

15. The image processing apparatus according to claim 14, wherein
the information includes the table information indicating the addition order of the candidate data, and
the second processor is further configured to set the addition order of the candidate data based on the table information.

16. The image processing apparatus according to claim 13, wherein the second processor is further configured to:
extract second encoded data from the first encoded data set to the fixed length;
decode the second encoded data;
generate a second part of the decoded image data in blocks; and
combine the second part of the decoded image data and the first part of the decoded image data.

17. The image processing apparatus according to claim 16, wherein
the decoded image data includes a plurality of pieces of pixel data, and
the second processor is further configured to:
generate upper bits of each piece of pixel data of the plurality of pieces of pixel data; and
generate lower bits of each piece of pixel data of the plurality of pieces of pixel data.

18. An image processing method, comprising:
selecting table information that indicates an addition order of candidate data;
setting, on a block-by-block basis, the addition order of the candidate data based on the selected table information, wherein
the candidate data is a candidate for additional data,
the additional data is added to encoded data to set the encoded data to a fixed length, and
the encoded data includes encoded image data in blocks.

19. An image processing apparatus, comprising:
a processor configured to:
set, on a block-by-block basis, an addition order of candidate data based on table information, wherein the candidate data is a candidate for additional data; and
generate first encoded data at a fixed length based on second encoded data and additional data, wherein
the second encoded data includes encoded image data in blocks,
the first encoded data includes information regarding the addition order of candidate data, and
the information regarding the addition order includes the table information.

20. An image processing apparatus, comprising:
a processor configured to:
encode upper bits of each piece of pixel data of image data, wherein the upper bits of the each piece of pixel data of the image data is encoded in blocks;
generate, on a block-by-block basis, first encoded data based on the encoded upper bits of the each piece of pixel data of the image data;
set, on a block-by-block basis, an addition order of candidate data;
select lower bits of the each piece of pixel data of the image data in the set addition order, wherein the lower bits of the each piece of pixel data of the image data is selected in blocks;
generate additional data based on the selected lower bits of the each piece of pixel data of the image data, wherein
the candidate data is a candidate for additional data, and
the additional data is added to first encoded data to set the first encoded data to a fixed length; and
generate second encoded data at the fixed length based on the first encoded data and the generated additional data.

21. An image processing apparatus, comprising:
a processor configured to:
encode image data on a block-by-block basis;
obtain a difference in upper bits between pixels of the image data;
generate first encoded data based on the obtained difference;
set, on a block-by-block basis, an addition order of candidate data;
generate additional data based on the set addition order, wherein
the candidate data is a candidate for the additional data, and
the additional data is added to first encoded data to set the first encoded data to a fixed length; and
generate second encoded data at the fixed length based on the first encoded data and the additional data.

22. An image processing apparatus, comprising:
a first processor configured to:
set, on a block-by-block basis, an addition order of candidate data, wherein
the candidate data is a candidate for additional data,
the additional data is added to encoded data to set the encoded data to a fixed length, and
the encoded data includes encoded image data in blocks; and
a second processor configured to:
extract table information from the encoded data set to the fixed length, wherein the table information indicates the addition order of the candidate data;
set the addition order of the candidate data based on the extracted table information;
extract the additional data from the encoded data set to the fixed length;
align the additional data based on the addition order; and
generate a part of decoded image data in blocks based on the aligned additional data.

23. An image processing apparatus, comprising:
a first processor configured to:
set, on a block-by-block basis, an addition order of candidate data, wherein
the candidate data is a candidate for additional data,
the additional data is added to first encoded data to set the first encoded data to a fixed length, and
the first encoded data includes encoded image data in blocks; and
a second processor configured to:
extract additional data from the first encoded data set to the fixed length;
align the additional data based on the addition order;
generate a first part of decoded image data in blocks based on the aligned additional data;
extract second encoded data from the first encoded data set to the fixed length;
decode the second encoded data;
generate a second part of the decoded image data in blocks;
combine the second part of the decoded image data and the first part of the decoded image data, wherein the decoded image data includes a plurality of pieces of pixel data;
generate upper bits of each piece of pixel data of the plurality of pieces of pixel data; and generate lower bits of each piece of pixel data of the plurality of pieces of pixel data.

* * * * *